(12) United States Patent
Tagg et al.

(10) Patent No.: US 10,771,990 B2
(45) Date of Patent: Sep. 8, 2020

(54) NETWORK TESTING FOR TELECOMMUNICATIONS

(71) Applicant: TRUPHONE LIMITED, London (GB)

(72) Inventors: James Peter Tagg, London (GB);
Alistair James Campbell, London (GB); Igor Borisoglebski, London (GB); Miguel Deus, London (GB);
Edward Thomas Guy, Chatham, NJ (US)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/518,101

(22) PCT Filed: Oct. 9, 2015

(86) PCT No.: PCT/GB2015/052973
§ 371 (c)(1),
(2) Date: Apr. 10, 2017

(87) PCT Pub. No.: WO2016/055811
PCT Pub. Date: Apr. 14, 2016

(65) Prior Publication Data
US 2017/0245163 A1     Aug. 24, 2017

(30) Foreign Application Priority Data
Oct. 10, 2014  (GB) .................................. 1418003.8

(51) Int. Cl.
*H04W 24/00*     (2009.01)
*H04W 24/06*     (2009.01)
(Continued)

(52) U.S. Cl.
CPC .......... *H04W 24/06* (2013.01); *H04W 24/08* (2013.01); *H04W 88/02* (2013.01)

(58) Field of Classification Search
CPC ..... H04W 60/06; H04W 60/005; H04W 8/04; H04W 8/18; H04W 8/245; H04W 36/0022; H04W 36/0072; H04W 52/0216; H04W 76/022; H04W 84/042; H04W 84/12; H04W 8/02; H04W 24/06; H04W 48/18; H04W 4/02; H04W 16/18; H04W 24/00; H04W 24/04; H04W 4/60; H04W 88/02;
(Continued)

(56) References Cited

U.S. PATENT DOCUMENTS 6,363,053 B1 * 3/2002 Schuster ............. H04L 41/5003
370/230
7,024,161 B1   4/2006 LaMedica
(Continued)

FOREIGN PATENT DOCUMENTS

JP    2009-504027      1/2009
WO   WO2005057972    6/2005

*Primary Examiner* — Nathan S Taylor

(57) ABSTRACT

According to aspects of the invention there is provided a remote unit comprising a processor and one or more terminal interfaces, the processor being connected to the one or more terminal interfaces, the terminal interfaces configured for coupling with a set of terminals, wherein the processor is configured to perform quality of service network testing using one or more of the set of terminals over one or more communication networks.

16 Claims, 7 Drawing Sheets

(51) Int. Cl.
*H04W 24/08* (2009.01)
*H04W 88/02* (2009.01)

(58) Field of Classification Search
CPC ..... H04L 43/08; H04L 43/50; H04L 12/2856; H04L 12/4633; H04L 63/029; H04L 65/40; H04L 67/141; H04L 67/42; Y02B 60/50
USPC ........... 455/432.1, 433, 435.1, 423; 370/329, 370/331, 401, 252
See application file for complete search history.

(56) References Cited

U.S. PATENT DOCUMENTS

| | | | |
|---|---|---|---|
| 7,656,796 B1* | 2/2010 | Ciavattone | H04L 47/10 370/230 |
| 7,843,843 B1* | 11/2010 | Papp, III | H04L 41/5009 370/252 |
| 7,925,740 B2 | 4/2011 | Nath et al. | |
| 2003/0156549 A1* | 8/2003 | Binder | H04L 43/50 370/252 |
| 2004/0058652 A1* | 3/2004 | McGregor | H04W 24/00 455/67.13 |
| 2004/0105392 A1* | 6/2004 | Charcranoon | H04L 41/5003 370/252 |
| 2004/0151117 A1* | 8/2004 | Charcranoon | H04L 41/5003 370/235 |
| 2005/0128947 A1* | 6/2005 | Silverman | H04L 41/5009 370/232 |
| 2006/0067237 A1* | 3/2006 | Burns | H04L 43/50 370/241 |
| 2008/0014883 A1* | 1/2008 | Topaltzas | H04M 3/2236 455/187.1 |
| 2008/0214186 A1* | 9/2008 | Bizzarri | H04W 24/00 455/425 |
| 2008/0295175 A1* | 11/2008 | Ansari | H04L 63/1416 726/23 |
| 2013/0088977 A1* | 4/2013 | Baillargeon | H04L 43/0811 370/251 |
| 2014/0066052 A1* | 3/2014 | Chang | H04L 43/08 455/423 |
| 2014/0119221 A1* | 5/2014 | Park | H04L 43/16 370/252 |
| 2015/0289176 A1* | 10/2015 | Liu | H04W 24/02 370/331 |
| 2015/0350938 A1* | 12/2015 | Heikkila | H04L 43/50 370/252 |

* cited by examiner

NETWORK TESTING FOR TELECOMMUNICATIONS

TECHNICAL FIELD

The present invention generally relates to systems and methods for evaluating communication terminals and communication networks, and more particularly to systems and methods for evaluating the performance of mobile network services and terminals using a plurality of geographically remote units deployed under control of a control unit for scheduling network tests of the networks, gathering test results and analysing the test results.

BACKGROUND

Mobile terminals such as mobile telephone devices have become ubiquitous in our society. Unlike conventional landline telephony services, which typically operate in a home or office and are delivered via a wire or cable and enjoy a highly consistent transmission quality, mobile terminals are subject to be used over mobile communication networks under varying radio environments, which results in highly varying transmission quality and highly varying speech and data service performance for the end user. One of the challenges to designing and deploying mobile communication networks and services is the monitoring and collection of reliable and quality data for determining real-world network and terminal performance. Further, network operators need to be able to identify faults, failures and abnormalities that may occur during the operation of their network. They need to do this quickly so that they can quickly apply rectification strategies so the users are provided with as reliable a service as possible.

There are, however, a wide variety of factors affecting the perceived quality of service from the view point of a user. These factors cover all aspects of the design of mobile service provision, such as radio towers, connections from towers to backbone networks, hardware devices such as switches and routers, software services controlling authentication, routing, charging and all services running on the networks, interconnection with other network providers and/or operators and so on. While it is possible to monitor some of these aspects specifically, it is a challenge to monitor the 'real' end user experience continuously from many locations. As network operators expand their operations to many countries, potentially globally, it becomes almost impossible to rely on human testers and reports to monitor and report any issues that may arise.

As the mobile telephone networks have developed, various digital communication services have been introduced, including data communications, digital voice communications, video services and mobile TV to name a few. Along with the conventional voice services provided in the past, it is becoming a more complex task to test new deployments as well as monitor live services. A challenge to mobile telephone network operators and providers is how to monitor, evaluate and provide real-time reports of realistic real-world network and terminal performance of all of the services provided both within the operator's/provider's network and to and from other interconnected operators/providers and their associated networks.

Further problems with existing network testing systems include:

The requirement for differing and overlapping monitoring and testing strategies, particularly for Mobile Virtual Network Operators (MVNOs) and/or for telecoms networks having multiple operators;

The need for specialist proprietary terminal hardware;

An inability to support and/or test handsets having Multiple IMSI (MI) or Subscriber Identity Module (SIM) apps and/or basic (non-smart) handsets having non-smart SIM;

An inability or inefficiency in providing continuous global monitoring required for verification of end user services;

An inflexibility to provide ad-hoc tests and/or modification of scripted tests and/or subsequent test schedules required for targeted and strategic fault analysis;

Lack of flexibility to mix continuous monitoring with targeted and deployment cycle Design Verification Test (DVT);

In ability to update SIMs Over-The-Air (OTA) with new settings and features for feature testing and production updates; and In ability to test Quality of Service of an ever increasing number of services including: Voice, SMS, VoIP, Data, Messaging, Streaming etc.

Therefore, there is a need for a reliable system for monitoring, evaluating and providing real-time reports and realistic real-world network and terminal performance for one or more services provided both within an operator's network and to and from other interconnected operator's networks, particularly a system which supports 'real' SIMs and SIM applications.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one aspect of the invention, there is disclosed a remote unit comprising a processor and one or more terminal interfaces, the processor being connected to the one or more terminal interfaces, the terminal interfaces configured for coupling with a set of terminals, wherein the processor is configured to perform quality of service network testing using one or more of the set of terminals over one or more communication networks.

The processor may be configured to perform comparative quality of service testing over a first and a second communication network using a first and second terminal of the set of terminals, the first terminal associated with the first network and the second terminal associated with the second network. Additionally or alternatively, the processor may be configured to perform end-to-end quality of service testing over one or more communication networks using at least two terminals of the set of terminals. Additionally or alternatively, the processor may be configured to perform quality of service testing over one or more communication networks using one of the terminals of the set of terminals. Additionally or alternatively, the processor may be further configured to perform an outgoing or incoming call quality of service testing over a communication network using a terminal of the set of terminals. Additionally or alternatively, the processor may be further configured to perform an outgoing or incoming text message and/or data message quality of service testing over a communication network using a terminal of the set of terminals.

The processor may be configured to perform one or more quality of service testing over a communication network using a terminal of the set of terminals. Additionally or alternatively, the processor may be further configured to perform two or more quality of service testing substantially concurrently over a communication network using a terminal of the set of terminals.

The substantially concurrent testing may include testing an outgoing or incoming call and a data message or session substantially concurrently. A data session may include uploading, downloading, messaging, browsing, accessing the internet streaming or similar. The remote unit may be located in a first geographic region and a second remote unit comprising interfaces for connecting to a second set of terminals may be located in a second geographic region, wherein the processor of the remote unit may be configured to conduct quality of service testing with the second remote unit using one or more of the set of terminals and one or more of the second set of terminals over one or more communication networks. The processor may be further configured to perform end-to-end quality of service testing over one or more communication networks using a first terminal of the set of terminals in communication with a second terminal of the second set of terminals. Additionally or alternatively, the remote unit may be located in a first geographic region and a second remote unit may be a virtual remote unit, wherein the processor of the first remote unit may be further configured to conduct quality of service testing with the virtual remote unit using one or more of the set of terminals over one or more communication networks.

The set of terminals may include at least one terminal from the group of: a handset; a mobile device; a mobile phone; a mobile station; a smartphone; a user equipment; original equipment manufacturer terminal; machine to machine embedded terminal; a tablet configured to communicate over the one or more communication networks; a laptop configured to communicate over the one or more communication networks; and/or any other computing device capable of communicating over the one or more communications networks. The set of terminals may be off-the-shelf or non-custom made, e.g. standardized, terminals provided by one or more network operators for use by consumers or subscribers of the one or more communication networks.

The remote unit may be configured to receive one or more network tests associated with quality of service testing of one or more of the communication networks. The quality of service testing may include any one or more of call set up delay, connect/disconnect delay, transmission delay, total failures, call drops, failure to progress, voice quality, video quality, conversation latency, echo, bit rate, error rate, bandwidth, jitter, delay, latency, packet loss, signal strength or similar.

The remote unit may be configured to send test results from the one or more terminals associated with the quality of service testing to one or more control units for comparing the quality of service performance of one or more of the communication networks or one or more terminals associated with said quality of service testing.

In a further aspect of the invention, there is disclosed a control unit for quality of service testing. The control unit may comprise a processor and a communications interface, the processor connectable to the communications interface, wherein when connected the processor and communications interface are configured to: receive one or more network tests associated with quality of service testing of one or more of the communication networks; control one or more remote units to perform quality of service testing over one or more of the communication networks based on the one or more network tests; retrieve test results associated with the one or more network tests from one or more of the remote units; and analyse the received test results for comparing the quality of service performance of one or more of the communication networks or one or more terminals associated with said network tests.

In a further aspect of the invention, there is disclosed a terminal comprising a processor, a memory unit and a communications interface, the processor is connected to the memory unit and the communications interface, wherein the processor, memory unit and communications interface are configured to: communicate with a remote unit for performing quality of service testing over a communications network.

In a further aspect of the invention, there is disclosed a network testing system comprising: one or more remote units; one or more controller units; and one or more terminals.

In a further aspect of the invention, there is disclosed a computer-implemented method for controlling a network testing system, the network testing system comprising one or more control units and a plurality of remote units, each remote unit comprising one or more terminals, wherein the one or more terminals are configured to communicate over one or more communication networks, the method, performed by the control unit, comprising: receiving an input to perform one or more network tests associated with one or more of the communication networks; generating a list of tests based on the input network tests; sending the list of tests to one or more of the remote units for use in configuring one or more terminals to perform the corresponding network tests and generate test results associated with the corresponding network tests; receiving test results associated with the one or more network tests from one or more of the remote units; and analysing the test results associated with the one or more network tests for determining the quality of service performance of one or more of the communication networks or one or more terminals associated with said network tests.

In a further aspect of the invention, there is disclosed a computer implemented method for performing network testing in a network testing system, the network testing system comprising a control unit and a plurality of remote units, each remote unit comprising one or more terminals, wherein the one or more terminals are configured to communicate over one or more communication networks, the method, performed by a remote unit, comprising: receiving a list of tests based on one or more network tests associated with one or more of the communication networks; configuring one or more of the terminals of the remote unit to operate in the one or more communication networks in accordance with the list or tests, wherein the one or more terminals are further configured to generate test results associated with the list of tests; receiving test results from the one or more terminals of the remote unit; sending test results associated with the one or more network tests towards the control unit for determining the quality of service performance of one or more of the communication networks or one or more terminals associated with said network tests.

In a further aspect of the invention, there is disclosed a computer implemented method for performing network testing in a network testing system, the network testing system comprising a control unit and a plurality of remote units, each remote unit comprising one or more terminals, wherein the one or more terminals are configured to communicate over one or more communication networks, the method, performed by a terminal, comprising: receiving configuration data representative of a list of tests based on one or more network tests associated with one or more of the communication networks; configuring the terminal to operate in the one or more communication networks in accordance with the configuration data; generating test results associated with the list of tests based on operating the terminal in the one or more communication networks in accordance with the configuration data; and sending the test results towards the control unit for determining the quality of service performance of one or more of the communication networks or one or more terminals associated with said network tests.

In a further aspect of the invention, there is disclosed a computer readable medium comprising program code stored thereon which, when executed on a processor, causes the processor to perform a method described herein.

In a further aspect of the invention, there is disclosed a remote unit comprising a processor and one or more terminals, the processor being operatively connectable to the one or more terminals, wherein the processor is configured to perform quality of service network testing using the one or more of the set of terminals over one or more communication networks.

In a further aspect of the invention, there is disclosed a control unit connectable to one or more remote units comprising one or more terminals, the control unit operable to conduct quality of service testing in respect the one or more terminals over one or more communication networks.

In a further aspect of the invention, there is disclosed a computer-implemented method of quality of service testing, the method comprising: deploying one or more remote units comprising one or more terminals, wherein the one or more terminals are connectable to one or more communication networks; conducting quality of service testing in respect of the one or more terminals.

The features of each of the above aspects and/or embodiments may be combined as appropriate, as would be apparent to the skilled person, and may be combined with any of the aspects of the invention. Indeed, the order of the embodiments and the ordering and location of the preferable features is indicative only and has no bearing on the features themselves. It is intended for each of the preferable and/or optional features to be interchangeable and/or combinable with not only all of the aspect and embodiments, but also each of preferable features.

BRIEF DESCRIPTION OF THE DRAWINGS

For better understanding of the aspects and/or embodiments described herein and to show how the same may be carried into effect, reference will now be made, by way of example only, to the accompanying figures, in which.

Figure 1:
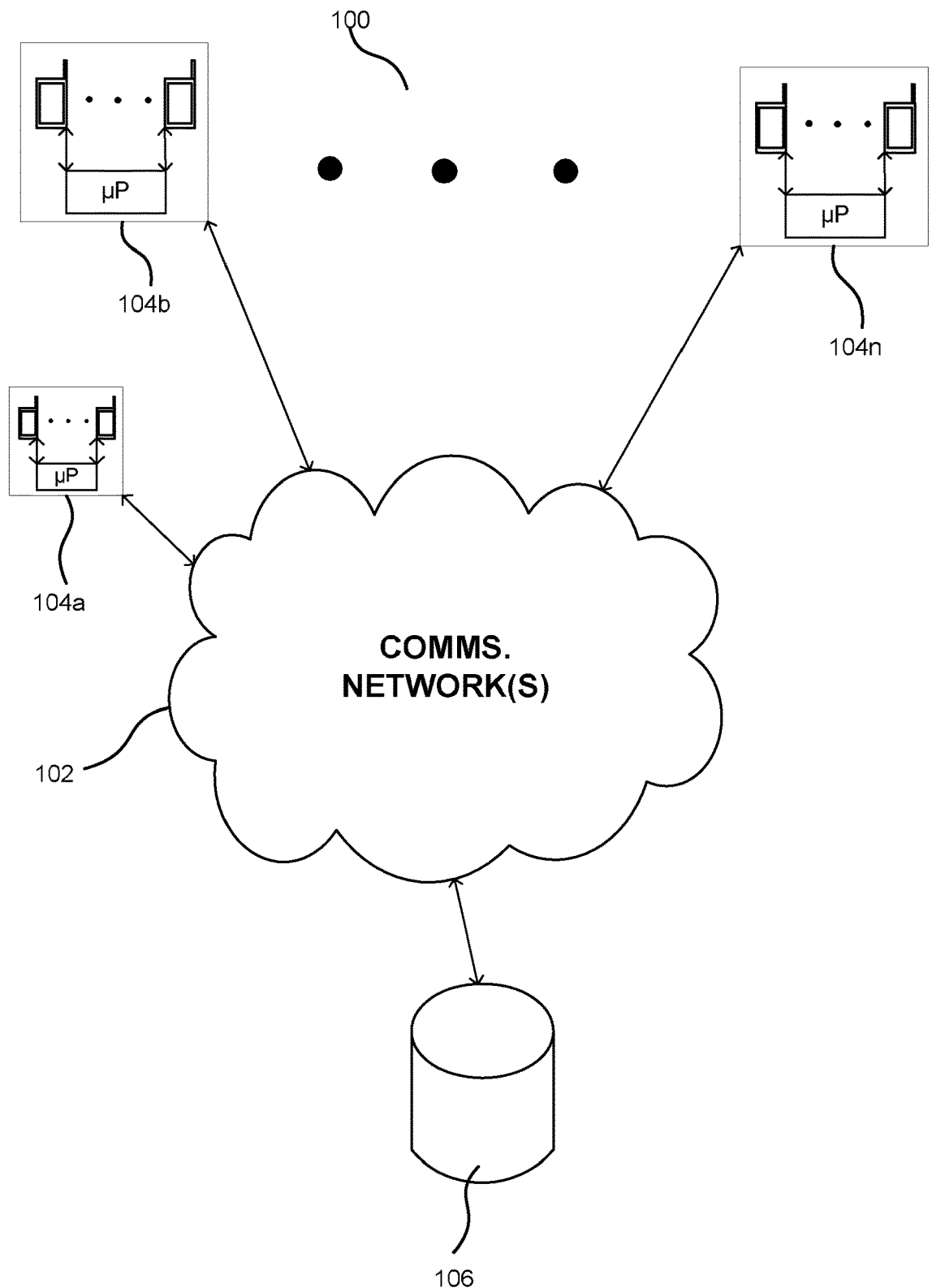
FIG. 1 is a schematic diagram of a system for network testing according to one embodiment.

It will also be appreciated that although features from each of the embodiments may be identified by different reference numerals in the figures and throughout the description, similar features including the properties and functionality attributed thereto, from one embodiment may be interchangeable with those of another embodiment.

DETAILED DESCRIPTION

References will now be made in detail to the various aspects and/or embodiments, examples of which are illustrated in the accompanying figures. In the following detailed description, numerous specific details are set forth in order to provide a thorough understanding of the invention. However, it will be apparent to one of ordinary skill in the art that the invention may be practiced without these specific details.

The embodiments described here provide many solutions to the aforementioned problems. For example, some of the embodiments address one or more of the following:

Provision of a cost effective testing system;
Improved control of the tests and/or lists of tests;
The ability to test the network using 'Real' SIM cards, including terminals having Multi-IMSI functionality, advanced Applets and supporting SIM-based databases, etc.;
Ability to efficiently upgrade the system (for example, to upgrade to LTE testing etc. by upgrading or replacing terminals with newer models);
To provide flexible test scheduling;
To provide continuous monitoring;
Capability to mix ad-hoc and scripted tests;
To provide distributed processing;
The ability to provide scripting of multiple step (sequenced) tests;
The ability to provide multiple test types in the same schedule;
Capability of Machine to Machine (M2M) SIM testing;
Possibility of distributing scripts over multiple remote units;
Ability to provide a reactive test schedule modification based on results;
Support new inserted tests while still running existing schedules;
Provision of off line testing;
Provision of self-monitoring with automatic recovery of terminals/handsets and all other system elements;
Reduction in site visits and down-time;
Provision of self-configuration and setup of remote units and associated terminal devices (phones, data dongles, etc.);
Deployment of remote units, new terminal hardware and SIMs by unskilled operators;
Ability to be closely integrated into GSM/LTE (telecoms) cores and networks;
Ability to integrate with self-healing telecoms network; and
Ability to generate alerts based on network conditions that can be used to trigger automatic case information to network providers.

For example, in one exemplary embodiment there is provided a system for testing of a network using standard or customised mobile terminals (which may include conventional 'wired' and/or 'land line' or Plain Old Telephone Service (POTS) network or Private Automatic Branch Exchange (PABX) systems) from one arbitrary location to another arbitrary location, wherein both 'ends' of the test call may be monitored by local and/or central servers such that data for (many) complete end-to-end transaction(s) can be collected and analysed, producing reports, alerts or automated corrective responses on/off network.

Overview of Architecture

FIG. 1 is a schematic diagram of a system 100 for performing network tests over one or more communication network(s) 102. The system 100 includes one or more communication network(s) 102 over which one or more remote units 104, more specifically 104a-104n, are configured to communicate via a set of one or more terminals with terminals of the same remote unit 104a and/or terminals of one or more other remote units 104b-104n. The remote units 104 may also communicate over one or more of the communication network(s) 102 with a control unit 106. The one or more remote units 104 may each include a processor connected to a set of one or more terminals, which can be configured to perform one or more network test(s) over selected ones of the communication network(s) 102 that the corresponding terminals are configured to use for communications and/or access.

Although references herein are to a control unit 106, it will be appreciated that more than one control unit 106 may be provided. For example, a plurality of control units or multiple control units may be provided that communicate or control one or more of the same and/or different remote unit(s). In some preferred embodiments, the system 100 comprises more than one remote unit 104. Although the term remote unit 104 is used throughout, the units may be remote to each other and/or may be remote to control unit 106 and/or one or more remote units 104 need not be remote and may be local to each other and/or local to the control unit 106.

A user may use the control unit 106 to configure one or more network test(s) to be performed by one or more of the remote units 104 over the one or more communication network(s) 102. In response to, for example, a user input, the control unit 106 may generate a list of test(s) (also known as a sequence of test(s) and/or a schedule or protocol of test(s)) associated with one or more network test(s). The list of test(s) may be sent over the one or more of the communication network(s) 102, which may be a backhaul communication network such as, by way of example but not limited to, a wired network (e.g. the Internet or Public Telephone Switch Network) or a wireless network such as a telecommunications network, to a selected one or more remote unit(s) for performing network tests over one or more of the communication network(s) 102. For example, the selected one or more remote unit(s) may be configured to perform a network test over communication networks 102 over which the terminals in the one or more remote unit(s) operate over. In some embodiments, the control unit 106 may be automatically configured to generate the list or lists of test(s).

The remote units 104, on receiving the list of tests, may automatically set up and configure their associated terminals to perform the network tests over one or more of the communication network 102 based on the list of tests. For example, each of the remote units 104 may include a processor configured to perform quality of service network testing using one or more of the set of terminals over the one or more communication network(s) 102.

The control unit 106 may include one or more servers or other computing devices or hardware that may be configured to control the one or more remote units 104. Additionally or alternatively, the control unit 106 or any other control unit may be implemented using cloud computing techniques that access a shared pool of computing resources such as one or more servers. The control unit 106 may be implemented as a cloud service that is centralised and/or distributed to operate within the Cloud.

Although one control unit 106 is shown in FIG. 1, it is to be appreciated by the skilled person that one or more control units may be deployed for controlling one or more of the remote units 104 when network tests are performed over the one or more communications network(s) 102.

The one or more communications network(s) 102 may comprise or represent one or more networks operated by one or more network operators. For example, the one or more networks may include, but are not limited to, packet switched network(s) and/or circuit-switched network(s), wired backhaul network(s) such as the Internet and/or Public Switched Telephone Network (PSTN), wireless network(s) such as Wi-Fi networks or telecommunications networks, for example, $2^{nd}$ generation, $3^{rd}$ generation and $4^{th}$ generation and beyond type telecommunication networks such as, by way of example but not limited to, code division multiple access (CDMA) systems, Advanced Mobile Phone System (AMPS), Global System for Mobile Communications (GSM), Railways-GSM (R-GSM), Long Term Evolution (LTE) and/or LTE-Advanced type networks and/or any other network used for wireless and/or wired communications including specialist variations of the above network types, such as Emergency service networks etc.

In this example, each of the remote units 104 may include a processor connected to a set of one or more terminals. Typically, the processor may be connected to a plurality of terminals or multiple terminals. A terminal may comprise or represent any wireless device capable of communicating over the communications network 102. For example, a terminal may include, by way of example only but is not limited to, any wireless device, handset, mobile device, mobile phone, mobile station, smartphone, user equipment, tablet, laptop, original equipment manufacturer terminal, machine-to-machine (M2M) embedded terminal, off-the-shelf terminals or devices, non-custom made terminals or devices, consumer terminals or devices, or any other computing device capable of communicating over the one or more communications network 102.

For example, one or more communication networks 102 may be operated by one or more network operators in which the set of terminals are standard, off-the-shelf, standardized, or non-custom made terminals that are provided by one or more network operators or provided by OEM terminal manufacturers for use by consumers or subscribers over the one or more communication networks 102.

As an example, the system 100 includes one or more remote units 104, each a so-called "Parachute Box" (PB), with one or more control units that provides a distributed telecommunications testing system that is able to continuously monitor a network of the one or more communication networks 102 through a list of test(s) comprising, by way of example only but is not limited to, a mixture of scripting, ad-hoc tests, and/or quality of service network tests for network testing. Although the terms "remote units" and "Parachute Box" are used herein, the terms are intended to be interchangeable.

The remote units 104 may be "parachuted" or placed in the field in geographic locations for performing network tests over the one or more communications network 102. Each of the remote units 104 may include a set of one or more terminals or multiple terminals for performing tests based on the list of test(s) over the one or more communication network(s) 102. For example, the remote unit 104, i.e. the PB, may work with terminals such as user equipment or smartphones with standard SIM cards or terminals as defined above. This permits the remote unit 104 to run SIM card applications in the field allowing the system 100 to fully test the latest SIM cards. It will be appreciated that the user equipment or smartphones (terminals) need not use basic standard SIM cards or modules, but may comprise Multiple IMSI (MI) or Subscriber Identity Module (SIM) apps/applets and/or other SIM-based enhanced functions.

As another example, a remote unit 104 may include standard off-the-shelf (or standardized and/or non-customized) Personal Computer (PC) hardware and standard off-the-shelf smartphone or user equipment hardware within a robust case design. The smartphone or user equipment may be interfaced to the PC over interfaces such as Universal Serial Bus interfaces that allow easy field upgrade to the latest models of smartphones or user equipment that may include new band plans, network services and/or radio frequency units. In some embodiments, the one or more terminals can be housed within compartments or be provided with other securing means in or on the remote unit 104 which may offer protection and security.

One or more of the remote units 104 are configured to receive the list of test(s) generated by the control unit 106. The list of test(s) may be sent over a backhaul network or over one or more other networks that make up the one or more communication network(s) 102. According to the list of tests, the processor of a remote unit 104 may configure the one or more terminals to communicate with one or more of the communication network(s) 102 and/or other terminals in one or more of the communication network(s) 102, servers, content sources, network elements or nodes or any other network entity or element. End-to-end network tests can be performed when the terminal of a remote unit 104 is configured to communicate with another terminal of the remote unit 104 or another terminal of one or more other remote units 104.

It will be appreciated that the aforementioned architecture does not exclude single-ended tests to be performed such as browsing, streaming and other data services. Indeed, in some embodiments, the network test(s) executed on one or more of the terminals of the remote unit(s) 104 are not end-to-end tests, but may involve a network test between one or more terminals of one or more remote units and a virtual remote unit (provided in the cloud or in the communications network 102 or elsewhere) and/or the control unit 106.

In operation, the system 100 may be used for testing mobile network services over the communication network 102. The remote units 104 may be each deployed to one or more geographical region(s), which may include but are not limited to, one or more cells of a network, one or more regions of a country, one or more countries, or any other geographical region for locating a remote unit 104 for performing a list of tests associated with one or more of the communication network(s) 102. The terminals in each of the remote units 104 may be provisioned with a selection of on-network and/or off-network Subscriber Identity Module (SIM) cards. For example, an on-network SIM is a SIM that operates on a particular network operator's network while an off-network SIM is a SIM that operates on a different network operator's network. For example, the SIM cards may include, by way of example but are not limited to, standard SIMs, mini SIMS, nano-SIMS, embedded SIMS, multiple International Mobile Subscriber Identity (IMSI) SIMs and any other SIM or any other equivalent chip or module used by a terminal for use over communications network 102. This means that the performance of different networks may be tested concurrently by multiple terminals.

Each list of test(s) may select terminals for example based on the location of each of the remote units 104 and also on the network(s) and/or network service(s) available or expected to be available in each geographic region.

For each of the remote units 104 that receive a list of tests, the corresponding one or more terminals are configured according to the list of tests to send and receive test calls, test text messages, test emails, test data sessions and all other services that the respective terminals are capable of testing under the supervision of the processor of the corresponding remote unit(s) 104. During each test, each of the scheduled one or more terminals may be used to monitor the corresponding communication network of the communication network(s) 102 over which it operates and generates test result(s) based on, but not limited to, network parameters and/or quality of service associated with the list of tests.

Each test in the list of tests may configure one or more terminals in a remote unit 104 to perform, for example, a test call to or from other terminals in the same remote unit 104a, or to and/or from any other one or more of the terminals in any of the other remote units 104b-104n. The list of tests can be downloaded to one or more of the remote units 104 from the control unit 106. The corresponding test results of the list of tests may be collected from the terminals by the processors of the remote units 104. Each of the remote units 104 that received the list of tests may send or upload the test results to the control unit 106. The received test results of both the calling terminals and receiving terminals can be correlated and/or analysed.

For example, the processor of a remote unit 104a may be further configured to perform comparative quality of service testing or other network testing over a first of the communication network(s) 102 and a second of the communication network(s) 102 using a first terminal and second terminal, respectively, of the set of terminals. The first terminal associated with the first of the communication network(s) and the second terminal associated with the second of the communication network(s). The processor of the remote unit 104a may be further configured to perform end-to-end quality of service network testing over one or more of the communication networks 102 using at least two terminals of the set of terminals of the remote unit 104a. Alternatively, the processor of the remote unit 104a may be further configured to perform single ended testing or quality of service network testing over one or more of the communication networks 102 using a terminal of the set of terminals of the remote unit 104a. In another example, the processor of the remote unit 104a may be further configured to perform an outgoing or incoming call quality of service testing over one of the communication network(s) 102 using a terminal of the set of terminals.

In another example, the remote unit 104a may be located in a first geographic region and a second remote unit 104n comprising a second set of terminals may be located in a second geographic region. The processor of the remote unit 104a may be further configured to conduct quality of service testing and/or other network testing with the second remote unit 104n using one or more of the set of terminals of the remote unit 104a and one or more of the second set of terminals over the one or more communication networks 102. The processor of the remote unit 104a may be further configured to perform end-to-end quality of service testing over one or more of the communication network(s) 102 using a first terminal of the set of terminals of the remote unit 104*a* in communication with a second terminal of the second set of terminals of the second remote unit 104*a*.

In another example, a remote unit may be implemented in the cloud as a virtual remote unit comprising a set of one or more virtual terminal(s), where at least one virtual terminal may emulate a content source for video streaming or other type of network service or data connection. The remote unit 104*a* may thus perform network testing over one or more communication network(s) 102 in which the terminals of the remote unit 104*a* communicate, during the network testing, with the virtual terminals of the virtual remote unit.

Although in the above exemplary embodiment the processor(s) of the remote units 104 collect the test result(s) and send to the control unit 106 for analysis, in additional or alternative embodiments, analysis of the test result(s) may be performed locally on the remote units 104.

Remote Unit

Figure 2:
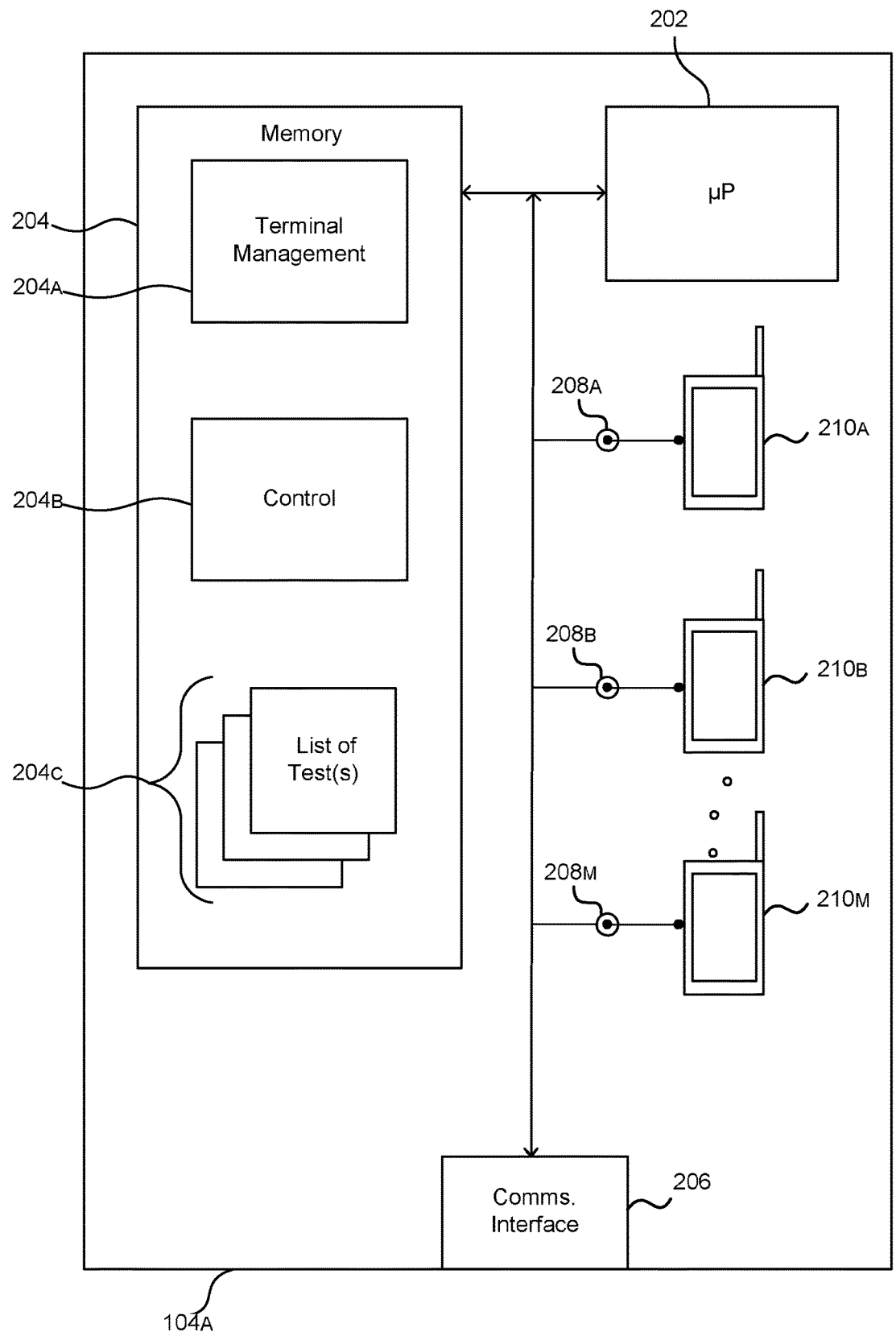
FIG. 2 is a schematic diagram indicating exemplary modules of a remote unit of FIG. 1.

FIG. 2 is a schematic diagram of an example remote unit 104*a* with exemplary hardware/software modules. The remote unit 104*a* in this embodiment includes hardware modules comprising a processor unit 202, memory unit 204, communications interface 206 and a plurality of terminal interface points or ports 208*a*-208*m* for coupling to corresponding plurality of terminals 210*a*-201*m*, in which the processor unit 202 is connected to the memory unit 204, the communications interface 206 and the plurality of terminal interface points or ports 208*a*-208*m*.

The memory unit 204 may comprise one or more software module(s) or computer readable medium(s) (e.g. solid-state or flash memory, random access memory, read only memory, hard-disk drive, optical disc) for use in storing program instructions associated with a terminal management application 204*a*, control logic 204*b*, and one or more lists of tests 204*c*, which when executed by the processor unit 202, configures the remote unit 104*a* to perform network test(s) based on the one or more lists of tests 204*c* associated with terminals 210*a*-210*m*. The list of test(s) may comprise or represent, by way of example only but is not limited to, a mixture of scripting and ad-hoc network tests for use by the processor unit 202 to configure and operate one or more terminals 210*a*-210*m* to perform one or more network tests associated with the list of tests 204*c*. The memory unit 204 may be configured to store and/or analyse one or more test results generated by one or more terminals 210*a*-210*m* during one or more network test(s) associated with the one or more lists of tests 204*c*.

Each of the one or more terminals 210*a*-210*m* may include one or more applications for use in performing the network tests. The one or more applications, when executed on a processor of the terminal, may configure the terminal to perform one or more network tests, monitor and generate test results associated with the one or more network tests. For example, one of the applications installed or pre-installed on the terminal 210*a* may be a "helper" application that configures the terminal 210*a* to perform one or more list of test(s) associated with one or more network test(s). The remote unit 104*a* may be configured to install the one or more applications onto the one or more terminals 210*a*-210*m* when or after the terminals 210*a*-210*m* are connected/coupled via terminal interface points or ports 208*a*-208*m*. Alternatively or additionally, the one or more terminals 210*a*-210*m* may be pre-installed with the one or more applications prior to being connected and/or coupled via terminal interface points or ports 208*a*-208*m* to the remote unit 104*a*. Alternatively or additionally, the one or more applications may be downloaded to the one or more terminals 210*a*-210*m*, which may be configured to install the one or more applications. In any event, the terminals 210*a*-210*m* may include the functionality to receive one or more list of test(s) and to be configured to operate according to the tests and generate or record test results associated with the one or more list to test(s) for sending to a control unit 106 for analysis.

It is to be appreciated that one or more of the remote units 104, more specifically remote units 104*a*-104*n*, may be configured to be deployed and/or installed at a geographic location and turned on by non-technical personnel. This is because when the remote units 104 have been deployed and/or turned on and powered up, they can communicate via one or more of the communication network(s) 102, for example via a backhaul network such as a wired or wireless network with the control unit 106, which may control and configure the remote units 104 to perform network tests according to a test schedule. Once each of the remote units 104 have been deployed, each remote unit 104 may be configured to self-configure and contact (e.g. call home) the control unit 106 of the system 100 to notify the control unit 106 and/or users of the system 100 that it is ready for service and may be controlled remotely by the control unit 106.

The remote units 104 may be configured to monitor themselves and/or the terminals connected to the remote units 104. Should one or more terminals become faulty (e.g. losing power, software not working or responding i.e. the terminal is "frozen", the terminal is not connecting to the communication network 102, etc.), the remote unit 104 may either be configured to rectify and/or troubleshoot the situation (e.g. power down/up the terminal via the terminal interface; re-install the one or more applications associated with the terminal performing, monitoring and generating test results). Alternatively, should the fault persist for the terminal, the remote unit 104 may be configured to use another terminal for any associated network tests and report to the control unit 106 the fault and any further information it can provide in relation to the faulty terminal. The control unit 106 may then modify the network test(s) to take into account the faulty terminal, and/or notify service personnel to replace the faulty terminal at the remote unit 104.

Referring to FIG. 2 and, by way of example and for simplicity, remote unit 104*a*, the plurality of terminal interface points or ports 208*a*-208*m* may comprise or represent any suitable connection for connecting the one or more terminals 210*a*-210*m* to the remote unit 104*a* for configuration by the processing unit 202 when executing the software modules(s) 204*a*, 204*b* and/or 204*c*. The plurality of terminal interface points 208*a*-208*m* may be configured to provide each of the corresponding plurality of terminals 210*a*-210*m* with a power source as well as the necessary data lines for use by the processor unit 202 in configuring one or more of the terminals 210*a*-210*m* to perform network tests (e.g. call testing) and for receiving test results from the corresponding one or more terminals 210*a*-210*m*. For example, the terminal interface points or ports 208*a*-208*m* may include, by way of example but are not limited to, at least one from the group of one or more USB interfaces, USB hub interfaces, or any connection for connecting to the one or more terminals 210*a*-210*m*. The terminal interface points or ports 208*a*-208*m* enable the processing unit 202 to configure one or more terminals 210*a*-210*m* to operate according to one or more of the lists of tests 204*c* received from the control unit 106 for performing a network test over one or more of the communication network(s) 102. In additional or alternative embodiments, a supplementary power source may be provided.

The communications interface 206 may be configured to communicate with the control unit 106 over one or more of the communications network(s) 102, which may be a backhaul network or a network operated by a network operator and used by one or more terminals, for receiving the one or more lists of tests 204c from the control unit 106 and for sending test results from the one or more terminals 210a-210m associated with the one or more lists of tests 204c. The communications interface 206 may comprise or represent a transmitter and a receiver and/or a transceiver unit. Alternatively or additionally, the communications interface 206 may be configured to connect with at least one of the terminals 210a-210m for use in receiving the one or more lists of tests 204c from the control unit 106 for performing one or more network tests over one or more of the communication network(s) 102. Alternatively or additionally, the communications interface 206 may be configured to connect with at least one of the terminals 210a-210m to send test results associated with the one or more lists of tests 204c to the control unit 106 for analysis.

As another example, the remote unit 104a may include standard off-the-shelf components such as PC hardware in which the terminals 210a-210m are standard off-the-shelf terminals such as smartphones or user equipment that are connected together in a robust case design. The smartphone or user equipment is interfaced to the PC over terminal interface points or ports 208a-208m such as Universal Serial Bus (USB) interfaces that allow easy field upgrade to the latest models of smartphones or user equipment that may include new band plans, network services and/or radio frequency units.

Network System

Figure 3:
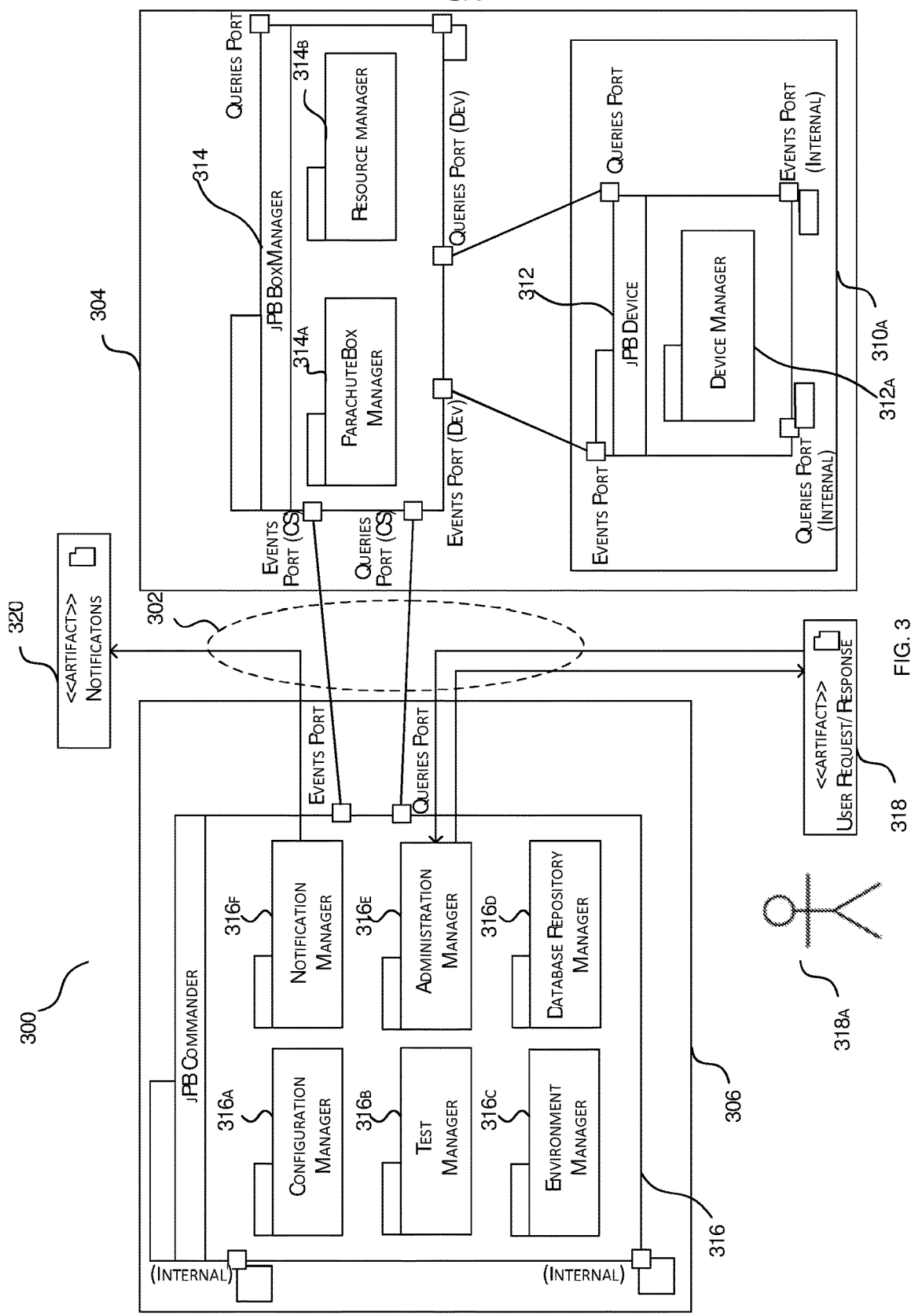
FIG. 3 is a schematic diagram depicting exemplary modules of each of the component parts of the system for network of FIG. 1.

FIG. 3 is a schematic diagram depicting exemplary hardware/software modules of each of the component parts of the system 100 of FIG. 1, which will be referred to as system 300. The system 300 includes a remote unit 304, also referred to as a so-called "Parachute Box" (PB), which may be in communication with a control unit 306. For simplicity, only one remote unit 304 and one control unit 306 is illustrated in FIG. 3, however, it is to be appreciated by the skilled person that the system 300 may include a plurality of remote units and a plurality of control units that may be connected to each other physically, or even connected to each other over the communications network 302, which may be a backhaul communications network.

The system 300 provides a distributed telecommunications testing system that is able to continuously monitor one or more communication network(s) (not shown) through various network test(s). A network test may comprise or be represented by a list of test(s) comprising, by way of example only but is not limited to, a mixture of scripting, ad-hoc tests, quality of service network tests or other network service tests etc. The remote unit 304 may be "parachuted" or placed in the field at a geographic location for performing one or more network tests over one or more communication network(s). The remote unit 304 may include or be connected to one or more terminals or multiple terminals, e.g. terminal 310a, for performing one or more network test(s) based on the list of test(s) over the one or more communication network(s) that the terminal(s) are capable of communicating over and for generating and sending test results associated with the list of test(s) to the control unit 304 for analysis and further actioning based on the analysis.

For example, the remote unit 304 (e.g. a PB) may operate with terminals such as user equipment or smartphones with standard SIM cards/modules. This permits the remote unit 304 (e.g. a PB) to run SIM card/module applications in the field allowing the system 300 to fully test the latest SIM modules/cards etc. As another example, a remote unit 304 (e.g. a PB) may include standard off-the-shelf PC hardware and standard off-the-shelf smartphone or user equipment hardware within a robust case design. The smartphone or user equipment is interfaced to the PC over interfaces such as USB interfaces, points and/or ports and the like that allow easy field upgrade to the latest models of smartphones or user equipment that may include new band plans, network services and/or radio frequency units.

Referring to FIG. 3, the system 300 includes the control unit 306 that may be configured to be connected to the remote unit 304 either directly or via communications network 302 or even via one or more communication networks that may be under test (e.g. one or more of the communication network(s) 102 of FIG. 1). The control unit 306 includes hardware and software functionality for performing various command and control tasks associated with performing one or more network test(s) using the terminals over the corresponding one or more communication network(s). These tasks may include at least one of, by way of example only, but are not limited to: receiving user input in relation to performing a network test or one or more network test(s); configuring the network test(s) and generating corresponding list of test(s); sending the list of test(s) to one or more remote units for initiating the one or more network test(s) for performing tests over one or more communication network(s); receiving test results from the one or more remote units in relation to tests performed over the one or more communication network(s); maintaining, collating, and/or analysing the test results in relation to the associated network test(s); and/or performing one or more actions in relation to the results of the analysis of the network tests.

The control unit 306 may include one or more software module(s) or computer readable medium(s) for use in storing program instructions, which when executed on a processor unit of the control unit 306, performs the functions associated or assigned to the control unit 306 for performing one or more network test(s) over one or more communication networks via remote unit 304. The control unit 306 may be configured to be the overall system controller, and there may typically be one per system 300, however, there may be more control units (e.g. a plurality of control units) in system 300 for, by way of example, but not limited to, fault tolerance, controlling and performing concurrent network tests etc.

The control unit 306 includes a command module 316 (also referred to as a "jPB Commander") that is configured to be the overall system controller. The command module 316 includes, by way of example, but is not limited to, one or more further modules such as configuration manager 316a, test manager 316b, environment manager 316c, database repository manager 316d, administration manager 316e, notification manager 316f and any other module or manager configured to perform the functions of the control unit 306.

The configuration manager 316a may be configured to receive input from user or system interface 318 and user(s) 318a (e.g. staff and/or operators) and/or other systems. Users 318a may input network test(s) and/or lists of test(s) representing network test(s) via the user interface 318, which may then be distributed from controller 306. The user request/response interface 318 may be configured to, by way of example only but is not limited to, provide a programming interface to the control unit 306; provide one or more test results screens to human operators; provide an interface for monitoring programming; provide new features Design Verification Test (DVT) and functional testing; provide strategic targeted reactionary testing of the one or more communication network(s) that are to be tested or are under test.

Test manager 316b may be used by users to select one or more network test(s) to be performed on one or more communication network(s), input test parameters, terminal and/or network operator information associated with one or more network test(s), input new network test(s), and/or may be used to generate and configure network test(s) based on user inputs and generate one or more list of test(s) associated with the network test(s) to be performed. Test manager 316b may also be configured to receive test results from remote units and associate the received test results with the corresponding network test(s) and/or list(s) of tests. The test manager 316b may also be configured to analyse the test result(s) received from the corresponding network test(s) that have been performed over the one or more communication network(s).

Environment manager 316c is an optional component or module may be used to, but it not limited to: manage the operating environment of the control unit 306; manage the network connections between the control unit 306, one or more other control units (not shown), remote unit 304, and/or one or more of the same and/or different remote units; configures hardware/software components of the system 300 or other such functions affecting the environment that the control unit 306 operates in or under and the like.

Database repository manager 316d may be configured to store one or more network test(s) and associated list of test(s) and, when available, one or more corresponding test result(s) received based on one or more network test(s). The database repository manager 316d may also be configured to store one or more analysis results based on the analysis of corresponding test results for one or more network test(s) that have been performed. Administration manager 316e may administer the user inputs and queries from the user interface 318 and send to the corresponding software modules.

Notifications manager 316f may be configured to send notifications 320 and/or alerts in relation to the network test(s) being performed, test result(s) being received in relation to each network test. Notifications 320 may be generated from test results of network tests. The notifications manager 316f may be used to notify the users and/or network operators of the results of the analysis of test results corresponding to network tests. The notification manager 316f may also notify other network elements and/or network nodes of the one or more communication network(s) associated with the network testing. The notifications 320 may be sent via communications network 302 and/or may be based on the analysis of the test results in relation to one or more network test(s) that have been performed on the one or more communication network(s). This may be used to optimise network resources.

For example, the notifications manager 316f may produce or generate output from the system 300 in the form of notifications 320 based on the test results and the associated network test(s), and/or results of analysing the test results. The notifications 320 may include data representative of, by way of example only, but not limited to, one or more of: human readable 'Dashboard' Alerts for the user 318a; controls and/or control information for sending and/or controlling other network elements and/or nodes of the networks associated with the network test(s); controls to other network elements; data or further statistical information for use with statistical systems; and/or customer information.

The remote unit 304 (e.g. 'Parachute Box'), may include one or more software module(s) or computer readable medium(s) for use in storing program instructions, which when executed on a processor unit of the remote unit 304, performs the functions associated or assigned to the remote unit 304 when the control unit 306 initiates one or more network test(s) to be performed on one or more communication network(s) using remote unit 304. The remote unit 304 may be located at various points or geographical locations of interest for performing network test(s) over the one or more communication network(s). For example, the points of interest or geographical locations may be related to target markets and/or network locations, current markets, network locations associated with a network operator and their corresponding communication network(s), and/or network locations associated with other network operators and their corresponding communication network(s).

The remote unit 304 includes a management module 314 (e.g. "jPB Box manager") which is configured to receive network test(s), network test schedules and/or the list of test(s) in relation to a network test from the command module 316 of the control unit 306 via the communication network 302, which may be a backhaul communication network that connects the control unit 306 with remote unit 304. The remote unit 304 controls many terminals that may be connected to the remote unit 304. For example, FIG. 3 illustrates a terminal 310a that is connected to the remote unit 304 via the management module 314. The management module 314 of the remote unit 304 includes a remote unit manager (e.g. "Parachute Box Manager") 314a and a resource manager 314b, which may be configured to control and manage the terminals connected to the remote unit 304.

The remote unit 304 may include a set of one or more terminals or an array of terminals that are connected or coupled to the management module 314 of remote unit 304. The set of one or more terminals may be connected or coupled to the management module 314 via terminal interfaces or points. The one or more terminals may comprise an array of terminals or devices that are used for communicating over the one or more communication network(s) that may be tested. For simplicity, FIG. 3 illustrates a terminal 310a of the array or plurality of terminals. Although the following description describes terminal 310a, it is to be appreciated by the person skilled in the art that the one or more terminals, the array of terminals 310 or the plurality of terminals may include the functionality of the terminal 310a.

The terminal 310a may include one or more software module(s) or computer readable medium(s) for use in storing program instructions, which when executed on a processor unit of the terminal 310a, performs the functions associated or assigned to the terminal 310a for performing one or more network test(s) over a communication network that the terminal 310a is capable of communicating over and/or accessing. The terminal 310a includes a device module 312 (e.g. "jPB Device") with a device manager 312a, for example via the helper application, for managing the terminal 310a.

As described above, the remote unit 304 may include one or more terminals, (e.g. an array of devices), which may be standard production terminals or devices, such as but not limited to: smartphones, tablets, data modems ('dongles'), machine-to-machine (M2M) terminals, Wi-Fi-only terminals; and any other device or terminal that may be used to communicate over one or more of the communication network(s) that may be tested. The terminal 310a and/or each terminal of the array of terminals may be loaded with a device manger 312a, which may be configured to be a 'helper' application that accepts commands from and returns test results to the management module 314 of the remote unit 304. The device manager 312a (e.g. 'helper' application) may be controlled by the remote unit 304 to configure the terminal 310a to operate in accordance with the list of test(s) and/or network test(s) the remote unit 304 received from the control unit 306, and to generate or retrieve test results when the network test(s) are performed by the terminal(s) and other remote units on the one or more communication network(s).

The remote unit 304 via the management module 314 is configured to receive the list of test(s) over communication network 302 from the control unit 306 for performing one or more network test(s) on the one or more communication network(s) scheduled for testing. The remote unit 304 may receive the list of test(s) from the control unit 306 via a receiver or transceiver unit that may connect to the communications network 302, which may be a wired or wireless network and/or one or more of the communication networks that may be tested. Alternatively or additionally, the remote unit 304 may be configured to use at least one of the terminals to receive the list of test(s) from the control unit 306 via at least one of the communication network(s) that may be tested. Alternatively or additionally, the remote unit 304 may be configured to enable a user to manually upload the list of test(s) to the remote unit 304 via a user interface, a data interface or port (e.g. via USB or personal area network e.g. BlueTooth®), and/or from another computing device or terminal (e.g. a mobile device, tablet, laptop, PC, or any other device).

The management module 314, on receiving the list of test(s) associated with a network test, may be configured to send commands to the device module and/or device manager 312a of the terminal 310a for configuring the terminal 310a for performing the network test on one or more communication network(s) associated with the list of test(s) at an appropriate or scheduled time. The list of test(s) may perform one or more network test(s) on one or more communication network(s) that may include, by way of example, one or more end-to-end network test(s) over the one or more communication network(s) with another one or more terminal(s) of the remote unit 304, another one or more terminal(s) of other remote units located within system 300, or other network test(s) over one or more other communication network(s) with other network nodes, elements and the like.

In the terminal 310a, the device module 312 and/or the device manager 312a may use one or more SIMs, which may be fitted to the terminal 310a. The one or more SIMs may include, but are not limited to off-the-shelf customer production SIMs, MI SIMs, or any other type of SIM module/card or module or hardware that may perform one or more functions of a SIM. The terminal 310a may also be from any network operator or manufacturer, or system owners that own the communication network.

Although the remote unit 304 has been described as receiving network test(s) and/or list of test(s) associated with network test(s) from the control unit 306 over the communication network 302 and/or sending test result(s) to the control unit 306 based on corresponding network test(s) over the communication network 302, it is to be appreciated by the person skilled in the art that the remote unit 304 may be configured to receive and/or send network test(s) and/or test results and the like in an off-line or stand-alone mode. The off-line or stand-alone mode may be required when there is no wired or wireless infrastructure (e.g. no wired Internet, no network signal or network resources) or signals etc., such that the remote unit 304 does not have a communications network 302 so it may perform its functions.

In off-line/stand-alone mode, the remote unit 304 may be configured to receive and store network test(s) and/or list of test(s) at a configuration location different to the geographical location in which the remote unit 304 is to be deployed. At this point, the remote unit 304 is pre-loaded with the network test(s) and/or list of test(s) for performing at the geographic location. Alternatively or additionally, the remote unit 304 may also be configured in the field to receive network test(s) and/or a list of test(s) associated with a network test from a user interface or other data interface or port that connects with another computing device for uploading the network test(s) and/or list of test(s) for storage on the remote unit 304. The remote device 304 may then be deployed at the geographical location assigned to it and be configured to proceed to perform the uploaded network test(s) and/or list of test(s).

Should the remote unit 304 not have access to a wired or wireless network such as communications network 302, the remote unit 304 may also be configured to store test results associated with the network test(s) and/or list of test(s). The test result(s) associated with the network test(s) and/or list of test(s) may be retrieved form the remote unit 304 when it is returned from the field to a location that has access to a network or communication network 302 etc. Alternatively or additionally, the remote unit 304 may include a user interface and/or a data interface or port for connecting with another computing device for downloading the test results associated with the network test(s) and/or list of test(s) that were stored in the remote unit 304 and which the remote unit 304 was configured to perform when deployed. The test results may then be uploaded or stored by the control unit 306 for analysis and actioning etc.

Thus, the remote unit 304 may include remote storage of test results until such data can be loaded to the control unit 306. Network test(s) and/or an associated list of test(s) (e.g. sequences of test(s) and/or test schedules for the network test(s)) can be downloaded to the remote unit 304 at a depot or location with a wired or wireless communication network (e.g. the Internet), after which the remote unit 304 may be taken to a destination location (e.g. the geographical location to which it is to be deployed) that may not have wired or wireless communication access to an appropriate network (e.g. an Internet service). The remote units 304 are then primed to perform the network test(s) and associated list of test(s). Test result data may also be collected from the remote unit 304, and then returned to control unit 306 over one or more test terminal data services from a remote site or by wired/wireless Internet after remote unit 304 is recovered from remote site.

The remote unit 304 may include a power source that may include a battery or other portable power source, and/or it may be configured to be connected to a power source such as line power, battery power, and/or a generator. Full off-line or stand-alone may be possible or necessary for specific locations and problems using pre-configured schedules.

Exemplary Processes

Figure 4:
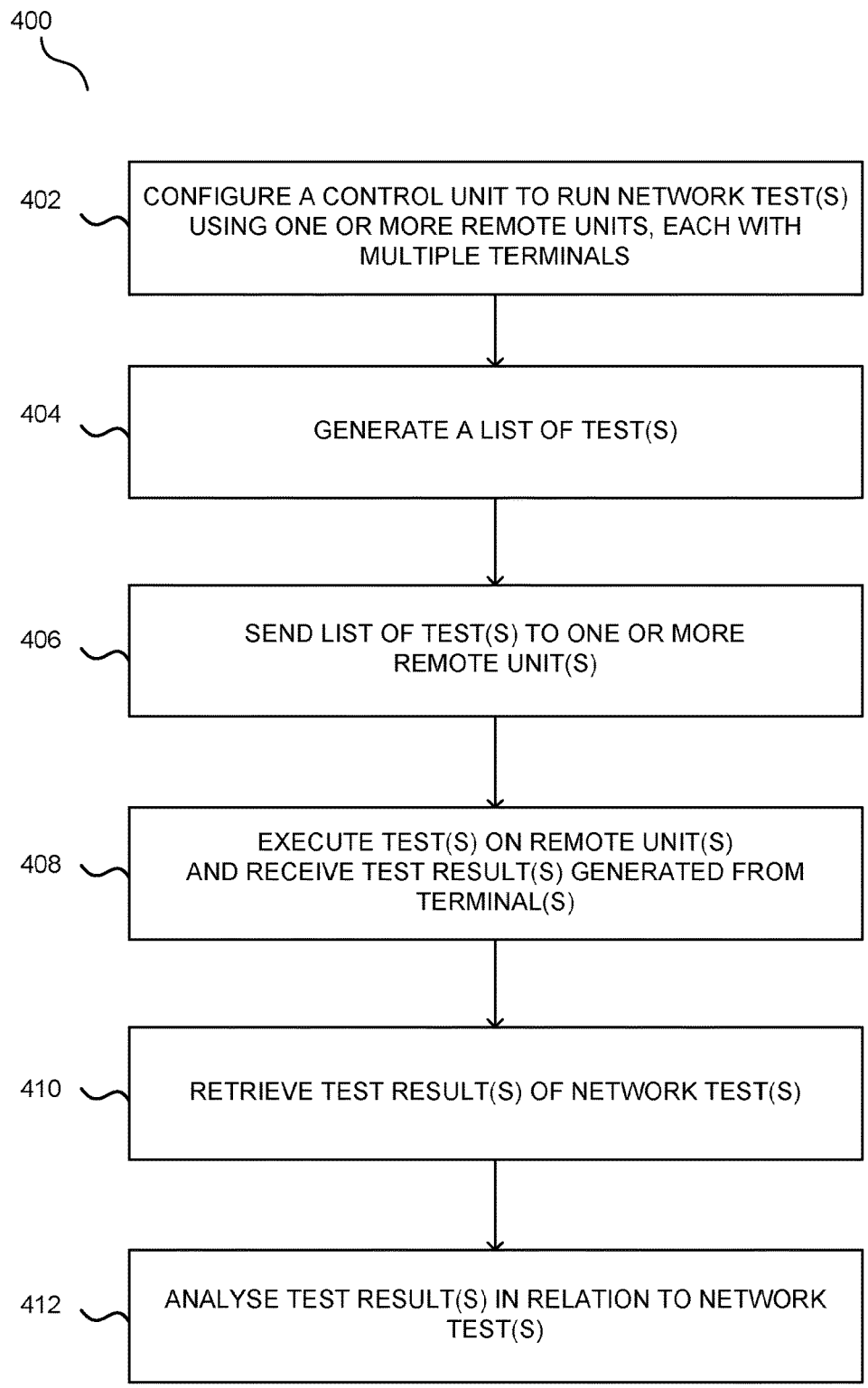
FIG. 4 is a flow diagram of an exemplary process of the system according to one embodiment.

FIG. 4 depicts an exemplary flow diagram illustrating an exemplary process 400 of the network system and components of FIGS. 1 to 3. The system 100, 300 may be configured to conduct any one or more of the following steps:

Step 402: Configure a control unit to run network test(s) using one or more remote units, each remote unit connected with one or more terminals (e.g. mobile devices, handsets etc.). For example, the remote unit may be coupled to multiple off the shelf terminals. The network test(s) may be configured to test one or more networks in a communication network.

Step 404: Generate a list of test(s) based on the network test(s).

Step 406: Send the list of test(s) to one or more of the remote unit(s). Each remote unit may be deployed to test one or more communication networks that may cover a geographical location.

Step 408: Execute test(s) on remote unit(s) based on the list of test(s) and receive test results from terminals of each of the remote unit(s). The remote unit(s) may store the test results and/or may send the test results associated with a network test to the control unit.

Step 410: Retrieve test result(s) of the network tests from remote unit(s) and/or terminals(s). The test result(s) associated with a network test(s) may be uploaded to the control unit from each of the remote unit(s) associated with the network test.

Step 412: Analyse test results in relation to the network test(s). The control unit, once it has received the test result(s) for each network test or even from one or more network test(s) may analyse the test results and output notifications and/or results of the analysis.

The output notifications may be, by way of example only but not limited to, sent or displayed to users of the system, provided to operators for use in fault finding and rectification, provided to customers and/or used by help-line staff when dealing with customers issues, used by other network elements and nodes to optimise or perform self-service of one or more networks that have been tested.

Figure 5:
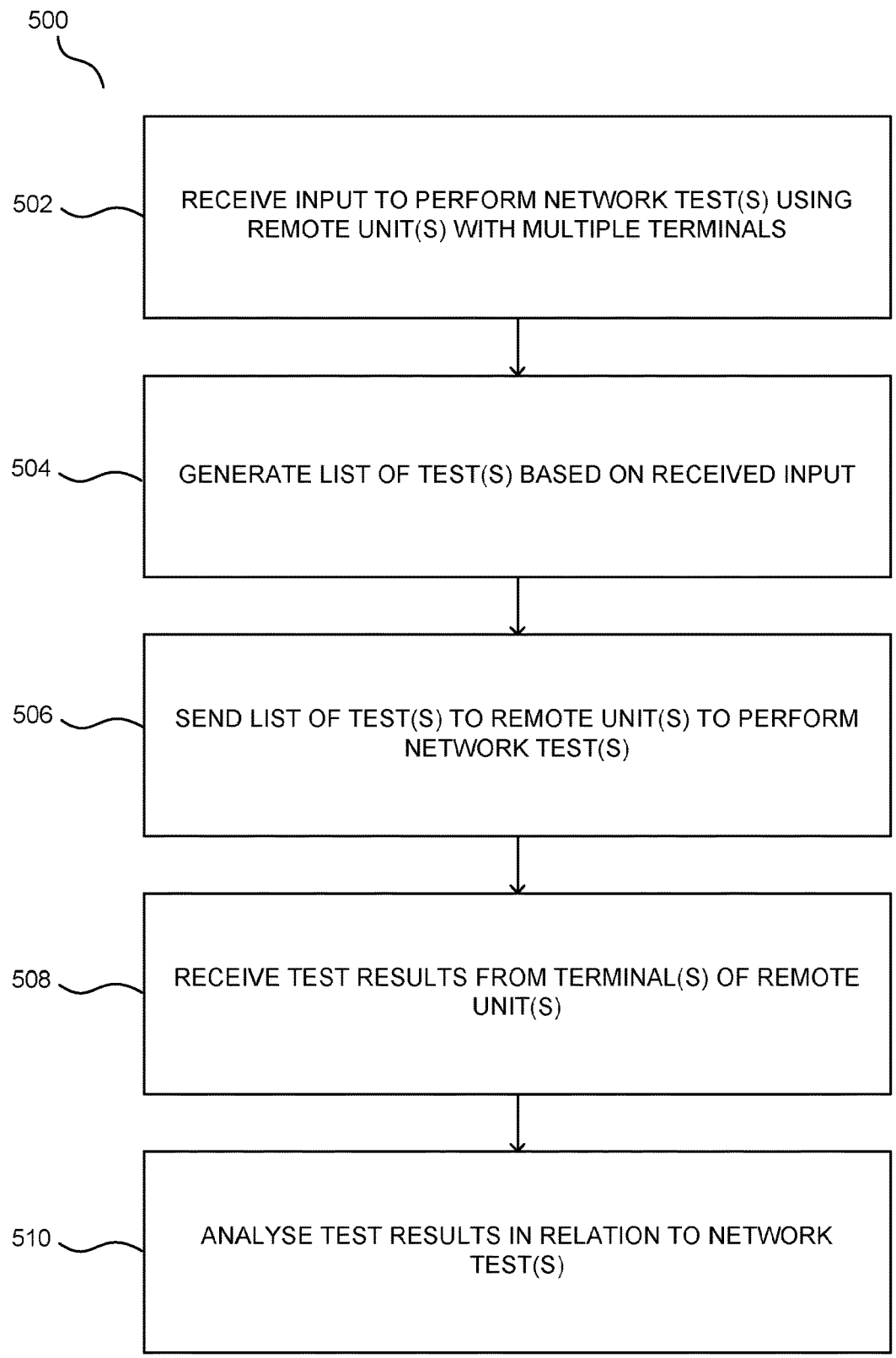
FIG. 5 is a flow diagram of an exemplary process of the controller unit according to one embodiment.

FIG. 5 is a flow diagram of an exemplary process 500 of a control unit of the network system and components of FIGS. 1 to 3. The control unit 106, 306 may be configured to conduct any one or more of the following steps Step 502: Receive input to perform network test(s) using remote unit(s) with multiple terminals. The received input may be from users of the network system via computer terminals that may be connected to the control unit. The input may define one or more network test(s) and/or may select one or more network test(s) that have already been defined for testing one or more networks. The input may define the one or more network test(s) at the user or human level, e.g. a high level of abstraction.

Step 504: Generate list of test(s) based on received input. The control unit may automatically select one or more remote units and the corresponding terminals and networks to test based on the network test(s) and thus generate a corresponding list of test(s) that may be used to configure the remote units and/or the terminals accordingly to perform the network test(s). The control unit may include a schedule for use by the remote units for conducting the network test(s).

Step 506: Send list of test(s) to remote unit(s) to perform network test(s). Each remote unit may be deployed to test one or more networks that may cover a geographical location.

Step 508: Receive network test results from terminal(s) of remote unit(s). The test result(s) associated with a network test(s) may be uploaded to the control unit from each of the remote unit(s) associated with the network test.

Step 510: Analyse test results in relation to network tests. The control unit, once it has received the test result(s) for each network test or even from one or more network test(s), may analyse the test results and output notifications and/or results of the analysis.

Figure 6:
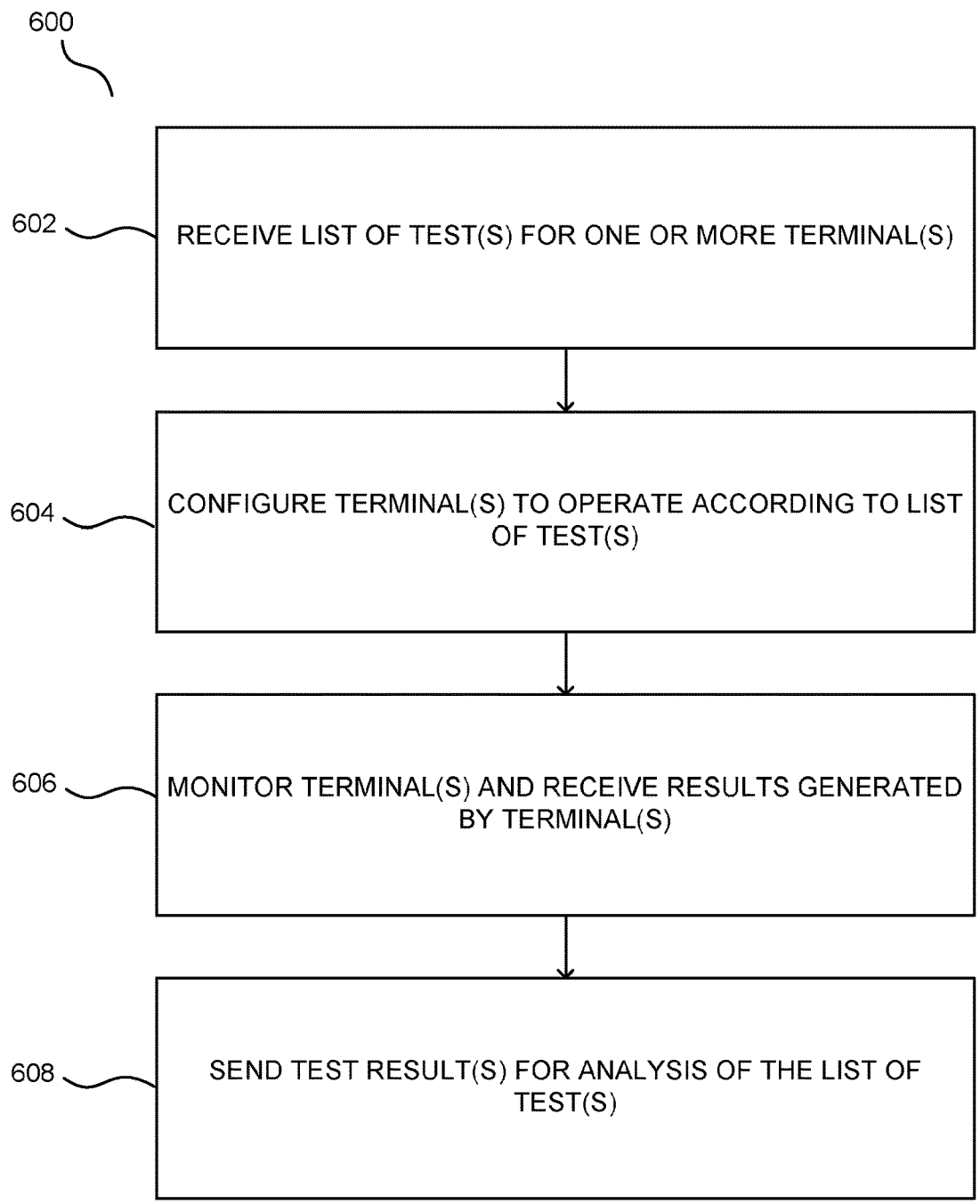
FIG. 6 is a flow diagram of an exemplary process of the remote units according to one embodiment.

FIG. 6 is a flow diagram of an exemplary process of the remote units of any of FIGS. 1 to 3 according to one embodiment and The remote units 104 may be configured to conduct any one or more of the following steps:

Step 602: Receive list of test(s) for one or more terminals (e.g. mobile devices, handsets etc.). Each remote unit may be deployed to test one or more communication networks that may cover a geographical location. Each remote unit may be deployed to test one or more networks that may cover a geographical location.

Step 604: Configure terminals(s) to operate according to the list of test(s). One or more terminals in the remote units may be configured to conduct the tests.

Step 606: Monitor terminal(s) and receive results generated by terminal(s). The result(s) may be stored and/or compiled on the remote unit(s). In some embodiments, the remote unit(s) may conduct analysis or the result(s).

Step 608: Send test result(s) for analysis of the list of test(s). The remote units may send the control unit the test result(s) for each network test or even from one or more network test(s) to analyse the test results and output notifications and/or results of the analysis.

Testing

Figure 7:
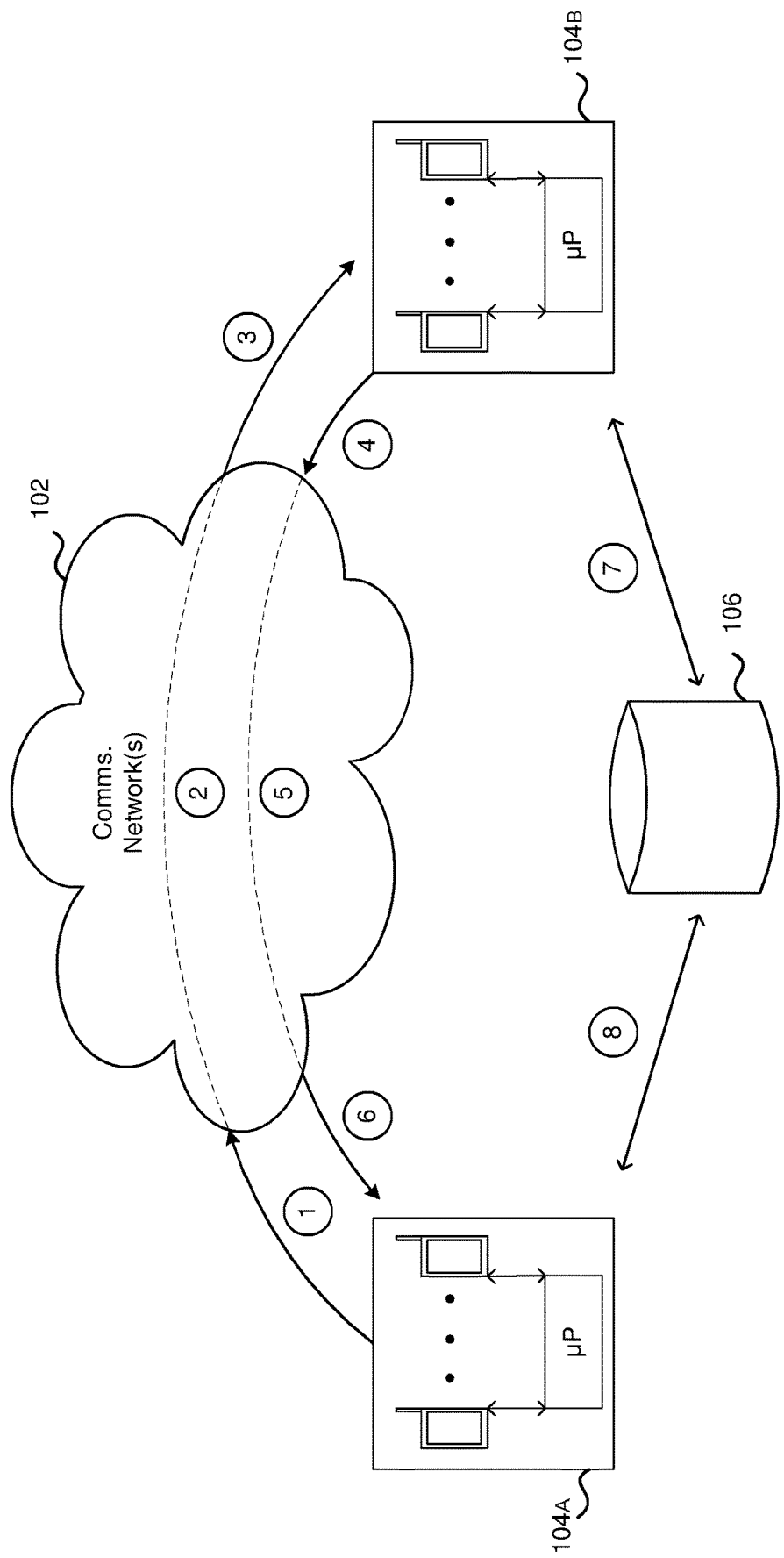
FIG. 7 is a schematic diagram depicting the exemplary flow of data between components of FIG. 1 according to one embodiment.

FIG. 7 is a schematic diagram depicting the exemplary flow of data between components of FIGS. 1 to 3 according to one embodiment. In this example, the remote unit 104A has been scheduled to instigate a call with remote unit 104B, specifically, one of the terminals in remote unit 104A has been tasked with instigating a call to a specific one of the terminals of remote unit 104B; although it will be appreciated that in some embodiments, call need not be to a specific terminal, but may be to a virtual remote unit and/or the controller unit or otherwise.

Although in this example, the exemplified call has been scheduled in a list of tests specified by controller unit 106, the call could have been instigated by a manual action (e.g. user intervention) directly at one or more of the remote units 104. At step 1, a specified terminal in remote unit 104A instigates a call to a specified terminal in unit 104B. In this embodiment, the outgoing call (and incoming call respectively) has been scheduled on the list of tests at each of the specified terminals of the remote units 104A, 1048, respectively.

As described previously, the one or more communications network(s) 102 may include one or more networks that are to be used in the list of tests. Once the call has been placed by the terminal at remote unit 104A, the call through various known telephony protocols, as depicted at step 2, is routed through one or more of the communication network(s) 102. As mentioned above, it will be understood that the communication network(s) 102 can comprise one or more networks using one or more protocols.

Via the routing, the call is transmitted to the specified terminal in unit 104B per step 3, which in this example is expecting the incoming call. The specified terminal in unit 104B answers the call (step 4) and this data is routed through one or more of the communication network(s) 102 (step 5) to the instigating terminal in remote unit 104A (step 6). An active call session is therefore in place.

It will be appreciated that the terminals need not be located at different remote units 104, but rather both could be located in the same unit or only one or the terminals can be located in one of the remote units 104.

From the active session, a number of parameters at both ends of the call and the quality of service of the session itself can be monitored and tested, as will be specified in more detail below. For example, the test can monitor any one or more of the following quality of service parameters during the session: voice quality, video quality, conversation latency, echo, bit rate, error rate, bandwidth, jitter, delay, latency, packet loss, signal strength, etc.

Additionally, as the call is being conducted by two terminals forming part of the system, parameters specific to placing the outgoing call and/or receiving the incoming call can be monitored. For example, call set up delay, connect/disconnect delay, transmission delay, total failures, call drops, failure to progress, etc.

The results of any one or more of the aforementioned tests, or similar, can be transferred to the controller unit 106 (steps 7 and 8), for example for compilation and/or further analysis.

It will be understood that other parameters may also be specified for monitoring.

Herein, the term "call" is intended to include, but not limited to telephony sessions including Internet telephony sessions, for example, sessions made using voice over internet protocol (VoIP), video conferencing sessions and or any session which links the two specified terminals, including machine to machine or other automated communications devices, for a period of time. It will be appreciated that these calls can be machine controlled, for example for automated data collection etc.

Although in the above example testing has been conducted via a call placed by one of the terminals to another of the terminals, in additional or alternative tests, the test can be the transfer of a short message service (SMS), for example a text message, data message and/or multimedia message, including emails, instant messages etc. It will be appreciated that the message may use any known telephony or internet based protocol for transferring the messages to and/or between the terminals. It will also be understood that the aforementioned system is equally and/or additionally applicable to network testing and quality of service testing for internet based protocols including data upload, data download, streaming etc.

In additional or alternative embodiments, the test may be a composite test. For example, the test can require a terminal to receive an incoming call and SMS substantially concurrently. In this example, the parameters relating both the call and the SMS can be monitored to determine the impact of the concurrent events. Although in this example a call and SMS are being exemplified as being concurrently run, it will be appreciated that any combination of tests can be concurrently or substantially concurrently run; typically one concurrent voice call and data session.

Advantageously, as more than one terminal can be provided on the remote units 104, it will be appreciated that comparative tests can additionally be run. For example, two of terminals in the remote unit 104 may comprise SIMs of different network providers. Testing each of these terminals concurrently or substantially concurrently can provide test results relating the performance of the communications network 102 in respect of particular network providers. It will be appreciated that the tests need not be for different network providers, but may for different handset types and/or may be different types of tests and/or to or from different networks or locations etc. Although some types of tests are exemplified, it will be understood that this is not a comprehensive listing of the different types of tests.

Further Exemplary Embodiments and Related Tests

Further details of the types of test and example user interfaces are depicted in the Appendix. Indeed, it will be appreciated that one or more user interfaces can be provided which support one or more of the functionalities of the Parachute Box network testing system. The remote units 104 may be deployed in locations without requiring specialist knowledge for installation or deployment. For example, in some embodiments, the remote units 104 are sealed units and therefore a user need only connect the remote unit 104 with a power source and/or an internet connection. In some embodiments, the remote unit 104 will function entirely autonomously.

In additional or alternative embodiments, a user may be provided with varying degrees of access to the remote unit 104 (e.g. parachute box (PB)) and/or functionality therefore. For example, a user may be provided with read only access (this kind of user may have access to read functionalities except to some fields that may be hidden); with read and execute access (this kind of user will have access to the same functionalities as "Read only users", and can execute tests and scenarios); with read and schedule access (this kind of user will have same type of access as "Read and execute" and can schedule tests and scenarios) and/or with full access (this kind of users will have access to all functionalities and all type of operations). For example, where a user has only read access, they may be unable to schedule tests etc. but may be able to view the sequence of test being run.

In some embodiments, a user may be above to access a list of remote units and/or terminals in one or more of the remote units. In some embodiments, the list of remote units and/or terminals may only show terminals and/or remote units which are currently online. In additional or alternative embodiments, error messages may be displayed with regards to any one or more remote units and/or terminals where there is a problem or error with the terminals and/or remote units.

In some embodiments, the system provides a user with the functionality to reboot any one or more of the terminals and/or remote units. Although these embodiments are written as access being provided and/or tests being initiated by a user, it will be appreciated that each of these functionalities may be automatically performed.

In some exemplary embodiments, the system may provide specific details regarding one or more, or preferably each, terminal in one or more, or preferably, each remote unit. The specific details may be include one or more of the following pieces of information: name, radio provider, whether roaming is turned on, serial number, International Mobile Equipment Identity (IMEI) number, Access Data Bearer (ADB), for example General packet radio service (GPRS), Enhanced Data Rates for GSM Evolution (EDGE), 3G and/or 4G, etc. operating system details, operation system version, Integrated Circuit Card Identifier (ICCID), product type, Subscriber Identity Module (SIM) provider, radio provider, specification of the International Mobile Subscriber Identity (IMSI), and where more than one IMSI is available details of all IMSIs available and an indication of which IMSI is selected and/or in use, and Mobile Station Integrated Services Digital Network (MSISDN) (including country details and an indication of the MSISDN is primary), and any other relevant information for example access point/access point name (APN).

The details provided relevant to the box may including one or more of: the box ID, the location of the box, for example country and/or city.

Also provided can be details of the list of scheduled tests (test protocol) and/or tests being performed or cuing for performance as will be described in more detail below.

A user can provided with and/or a display can set out details regarding the list of test(s) including future, current and finished tests. For example, various tests can include one or more of: receiving an incoming call, conducting an outgoing call, receiving or sending a Short Message System (SMS) and or a scenario. A scenario may include streaming, accessing the internet, Voice over Internet Protocol (VOIP), video calls etc.

Each of these executions can be recorded and the results can be categorized. For example, the start of a call can be noted and a timer functionality can detail the amount of time it took for a call to connect to the intended recipient.

The type of information which can be accorded from the above can include one or more of: the type of execution, the result (for example, failure and success), the priority (for example, manual or automatic and/or a classification such as, but not limited to, high or low), the timing when the execution started and/or stopped, the destination MSISDN, the dialed MSISDN, the ringing MSISDN, a ringing timestamp, a dial timestamp, an answer timestamp, a ready answer timestamp, a disconnect timestamp of the originating mobile (MO), disconnect timestamp of the terminating mobile (MT), call setup time, disconnect delay, radio provider MO, radio provider MT, public land mobile network (PLMN) MO, mobile network (MN) MT, ready answer global system of mobile communications (GSM) bit error rate, ready answer GSM signal strength, dialed GSM bit error rate, dialed GSM signal strength, ringing GSM bit error rate, ringing GSM signal strength, answer GSM bit error rate, answer GSM signal strength, disconnect MO GSM bit error rate, disconnect MO GSM signal strength, disconnect MT GSM signal strength, MO (city, country, product type), MT (city, country, product type) and any other quality of service information. The above information in specific to GSM, however it will be appreciated that equivalents may be provide for any access technology. For example, the system can establish the bit error rate or the signal strength etc., it need not be a GSM bit error rate or GSM signal strength etc.

The above information can be advantageously accorded by virtue of having two or more terminals connected in a session. It will be appreciated that the two or more terminals may be provided in one or more remote units 104.

For example, where the test includes an "Outgoing call", the type of information which can be accorded from the above can include one or more of: the type of execution, the result (for example, failure and success), the priority (for example, manual or automatic and/or a classification such as, but not limited to, high or low), the timing when the execution started and/or stopped, the destination MSISDN, the dialed MSISDN, a disconnect timestamp of the originating mobile (MO), radio provider MO, public land mobile network (PLMN) MO, dialed GSM bit error rate, dialed GSM signal strength, disconnect GSM bit error rate, disconnect MO GSM signal strength as well as details regarding the MO (city, country, product type).

In this example where the test for execution relates to an SMS, it will be noted that some of the test criteria detailed above with regards to incoming and outgoing calls is different.

Although in this example, the information which is accorded requires only details from the originating mobile, it will be appreciated that this data can be gathered from the call session detailed above. However, it should also be noted that an end-to-end (e.g. terminal-to-terminal) call need to not be required for conducting this type of testing.

Similarly, testing can be conducted for incoming calls, wherein the following type of information can be accorded, including one or more of: the type of execution, the result (for example, failure and success), the priority (for example, manual or automatic and/or a classification such as, but not limited to, high or low), the timing when the execution started and/or stopped, the ringing MSISDN, the expected MSISDN, a ringing timestamp, an answer timestamp, a disconnect timestamp of the terminating mobile (MT), a ready answer timestamp, a public land mobile network (PLMN) MT, a radio provider MT, a ready answer global system of mobile communications (GSM) bit error rate, ready answer GSM signal strength, a ringing GSM bit error rate, ringing GSM signal strength, answer GSM bit error rate, answer GSM signal strength, disconnect MT GSM bit error rate, disconnect MT GSM signal strength, MT (city, country, product type) and any other quality of service information.

As with the outgoing call example, it will be appreciated that the information obtained from an incoming call can be obtained during a call session or can be obtained from a non-end-to-end call to the terminal (for example, via an emulated and/or simulated call thereto).

A similar architecture regarding the call scenario detailed above is relevant respect to the SMS scenario detailed below. Although test results can be obtained via individual handset(s) receiving or sending an SMS (or similar as described above), in a preferred embodiment, test result(s) are obtained during an SMS session between two or more terminals in one or more remote units 104.

For example, the type of information which can be accorded during SMS testing includes from the above can include one or more of: the type of execution, the result (for example, failure and success), the priority (for example, manual or automatic and/or a classification such as, but not limited to, high or low), the timing when the execution started and/or stopped, the destination MSISDN, the sent MSISDN, received MSISDN, the received timestamp, the sent timestamp, the sent intent timestamp, SMS MO delay, SMS MT delay, SMS MO MT delay (E2E), Not sent intent error, Not sent intent timestamp, parts, text, sent text, received text, radio provider MO, radio provider MT, public land mobile network (PLMN) MO, public land mobile network (PLMN) MT, mobile network (MN) MT, sent GSM bit error rate, the sent GSM signal strength, received GSM bit error rate, the received GSM signal strength, MO (city, country, product type), MT (city, country, product type).

It will be appreciated that the various pieces of information may be provided by the originating mobile (MO) and/or the terminating mobile (MT) respectively.

In some embodiments, the list of tests executed can be compiled at the remote unit, the helper module in the terminal and/or at the controller unit. The compiled information can include one or more of: name, the type of execution, execution ID, the priority (for example, manual or automatic and/or a classification such as, but not limited to, high or low), the timing when the execution started and/or stopped, the result (for example, failure and success), details regarding the tests table including, ID, name, type, status, MO (city, product type), MT (city, product type), Fallback (condition, test ID). In this context, fallback may refer to starting a call a particular access technology (such as 3G) and having handed off to another (such as 2G/GSM) or any other similar handoff.

Further, options may be provided allowing a user to (i) run/schedule a particular test and/or list of tests; (ii) unscheduled or stop a test and/or list of tests; and/or (iii) clone/duplicate a particular test and/or list of tests.

The test and/or list of tests can be defined by one or more of the following, including but not limited to: the test id, name, type, user, fallback condition, fallback test id. An export option can be provided. Such that a display of the test(s) and/or list of tests may detail on or more of the following: name, user, description, details relating the trigger (for example, description, timestamp, scheduled operation, for example via a time-based job scheduler, e.g. 'cron', result action table (for example, result, to, subject, detailed, message), tests (ID, name, type, status, MO (city, product type), MT (city, product type), Fallback (condition, test ID)).

Each of the tests can be varied and/or are individually adjustable. For example, during a call type test, any one or more of may be varied and/or specified including but not limited to: name, type, user, description, wait resources timeout, duration, max dialing delay, ringing time, max disconnect delay, MSISDN format, disconnect call MO, disconnect call MT, device selection MO, device selection MT, fallback (execute inexistent condition, result to meet condition, test ID), schedule, unscheduled, clone. It will be understood that the above specifies particular exemplary testing and/or test parameters, it will be understood that these could be referred to by different names and indeed that different parameters can be defined.

During an outgoing call type test, any one or more of following testing and/or test parameters may be varied and/or specified, including but not limited to: name, type, user, description, wait resources timeout, destination MSISDN, duration device selection MO, fallback (execute unexistent condition, result to meet condition, test ID), schedule, unscheduled, clone. During an incoming call type test, any one or more of may be varied and/or specified: name, type, user, description, wait resources timeout, disconnect call MT, duration, expected MO MSISDN, Max disconnection delay, wait ringing time, ringing time, MO MSISDN, Device selection MT, fallback (execute unexistent condition, result to meet condition, test ID), with various optional varying options including schedule, unscheduled and/or clone/duplicate. It will be understood that the above specifies exemplary testing parameters and/or testing types, it will be understood that these could be referred to by different names and indeed that different parameters can be selected and/or defined.

During a test involving transmission of an SMS, any one or more of may be varied and/or specified: name, type, user, description, wait resources timeout, maximum duration, late, MSISDN format, text, device selection MO, device selection MT, fallback (execute unexistent condition, result to meet condition, test ID), schedule, unscheduled, clone. During transmission of an outgoing SMS any one or more of may be varied and/or specified: name, type, user, description, wait resources timeout, maximum duration, destination MSISDN, text, device selection MO, fallback (execute unexistent condition, result to meet condition, test ID), schedule, unscheduled, clone. During a test relating receipt of an incoming SMS any one or more of may be varied and/or specified: name, type, user, description, wait resources timeout, maximum duration, late time, MO MSISDN, text, device selection MT, fallback (execute unexistent condition, result to meet condition, test ID), schedule, unscheduled, clone.

In some embodiments, a user can manually schedule a test and/or list of tests and/or vary a test and/or list of tests, including but not limited to reordering the lists.

For example, a user may be enabled to create a new test by selecting a particular test type from the list of predefined types of tests and selecting a particular handset and/or remote unit and/or network to test. For example, a user define they wish to conduct a test involving sending an message, for example an email, between a handset from one remote unit 104A to a handset of another remote unit 104B. To define the particular test to be conducted, one or more for the following criteria may be defined by any one or more of including but not limited to: tests table (id, name, type, MO (city, product type), MT (city, product type), fallback (condition, test id), fallback (condition, test ID), add, edit and/or remove.

The specific handset to be tested can be selected via one or more of, including but not limited to: ICCID, MSISDN, name, serial number, IMEI, and/or a search may be conducted. In additional or alternative embodiments, a handset to be tested can be selected by choosing one or more of: specific device selection (ICCID, IMEI, MSISDN to use, Name, Serial), Characteristics device selection (Location (city, country), Radio provider, SIM provider, product type, operation system, MSISDN (country code, primary).

In some embodiments, a user can define one or more triggers to instigate the one or more lists and/or list of tests.

In some embodiments, when user selects to export a list of tests or scenarios, the data may be compiled, for example via generation of a data file which may include one or more of the following: ID—According to the type, this ID will reference the execution on the corresponding type sheet, Name, Type—The type can be: Scenario, Call test, Outgoing call test, Incoming call test, SMS test, Outgoing SMS test, Incoming SMS test. It will be understood that the above specifies exemplary testing parameters and/or testing types, it will be understood that these could be referred to by different names and indeed that different parameters/tests can be selected and/or defined.

General

The systems and apparatus described above may be implemented at least in part in computer software. Those skilled in the art will appreciate that the apparatus described above may be implemented using general purpose computer equipment or using bespoke equipment. The different components of the systems may be provided by software modules executing on a computer.

The hardware elements, operating systems and programming languages of such computers are conventional in nature, and it is presumed that those skilled in the art are adequately familiar therewith. In an embodiment the server may be centrally located and the clients are distributed. In other embodiments, the server functions may be implemented in a distributed fashion on a number of similar platforms, to distribute the processing load. For example, there may be more than one controller units which may be talking to the same and/or different deployed set of remote units. It will be appreciated that remote processes can still be scheduled appropriately and/or clashes reported and/or modifications to optimise scheduling can be conducted.

Here, aspects of the methods and apparatuses described herein can be executed on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives, and the like, which may provide storage at any time for the software programming. All or portions of the software may at times be communicated through the internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

In particular, it will be understood that the benefits and advantages described above may relate to one embodiment or may relate to several embodiments. The embodiments are not limited to those that solve any or all of the stated problems or those that have any or all of the stated benefits and advantages. Additionally, any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

Furthermore, the steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

It will be appreciated that one or more of the remote units hereinbefore referred to may be deployed in any location. In some embodiments, one or more of the remote units may be mobile, for example they may be deployed in one or more vehicles, or similar.

APPENDIX

System Architecture Parachute Box System HLD

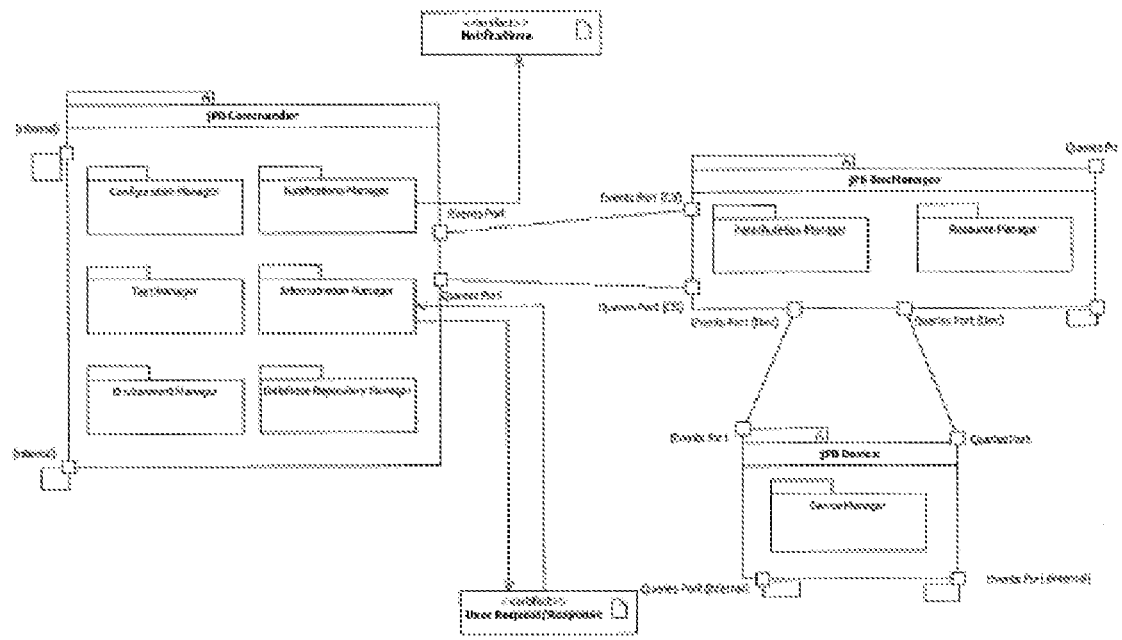

The Parachute Box (PB) provides a distributed telecoms testing system able to continuously monitor a network through a mixture of scripting and ad-hoc tests. PB works with user equipment, generally smartphones with standard SIM cards. This permits it to run SIM card applications in the field allowing it to fully test a modern SIM card. The system comprises standard PC hardware and standard smartphone hardware in a robust case design. User equipment is interfaced to the PC over interfaces such as USB allowing easy field upgrade to the latest models with new band plans and radio frequency units. The system is intelligently partitioned as follows.

jPB Commander

Typically one per system. Can be more for fault tolerance.

Overall system controller.
    Presents interfaces to staff and other systems.
    Test are entered and distributed from controller.
    Notifications generated from results of tests.

Runs many...

jPB Box manager. ('Parachute Box')

Located at points of interest in target markets
Receives test schedules from Commander.

Controls many...

JP8 device

Array of devices per 'Parachute' Box
Standard production devices such as but not limited to:
Smartphones, tablets, data modems ('dongles'), M2M terminals, WiFi-only
May be loaded with Device Manger 'helper' application – accepts commands from and returns results to Box manager.
Contains...

Test SIMs

Usually off-the-shelf customer production SIMs
Can be from any operator as well as the system owners own network Notifications Output from system
Generates: (examples, not limited to)
Human readable 'Dashboard' Alerts
Controls to other network elements
Statistical systems
Customer information User Request/Response interface Provides programming interface and results screens to human operators
Monitoring programming
New feature DVT and functional testing
Strategic targeted reactionary testing An description follows:

User Interface and Dashboards Parachute Box System

Introduction

The intent of this document is to describe the user interface that will support all functionalities of the Parachute Box (PB) first version.

Please note that the screens presented are illustrative, aimed at clarifying navigation, as well as fields and data.

Profiles

Users that have access to the Parachute Box module will have one of the following profiles:

- Read only: this kind of users will have access to read functionalities except to some fields that will be hidden (see more information in the functionalities described below);
- Read and execute: this kind of user will have access to the same functionalities as "Read only users", and can execute tests and scenarios;
- Read and schedule: this kind of user will have same type of access as "Read and execute" and can schedule tests and scenarios;
- Full access: this kind of users will have access to all functionalities and all type of operations.

PB Menu options
Access to Parachute Box menu options, will be determined by the user profile.
If logged user has "Read only" profile, the following menu will be displayed:
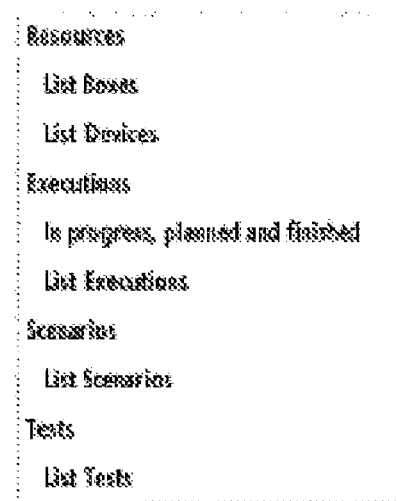
If the profile is "Full access", "Read and schedule" or "Read and execute" user the following menu:
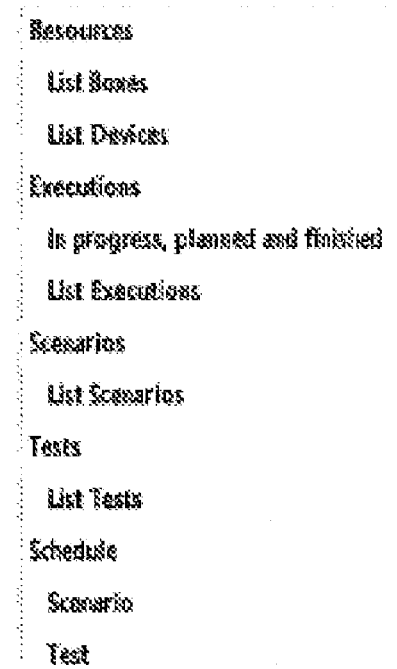

Resources
The "Resources" menu entry will encompass information about online boxes and devices.
List boxes
The "List boxes" view will list all online boxes and devices that are connected to each box.
The "List boxes" activity will follow the steps described in the flowchart below:
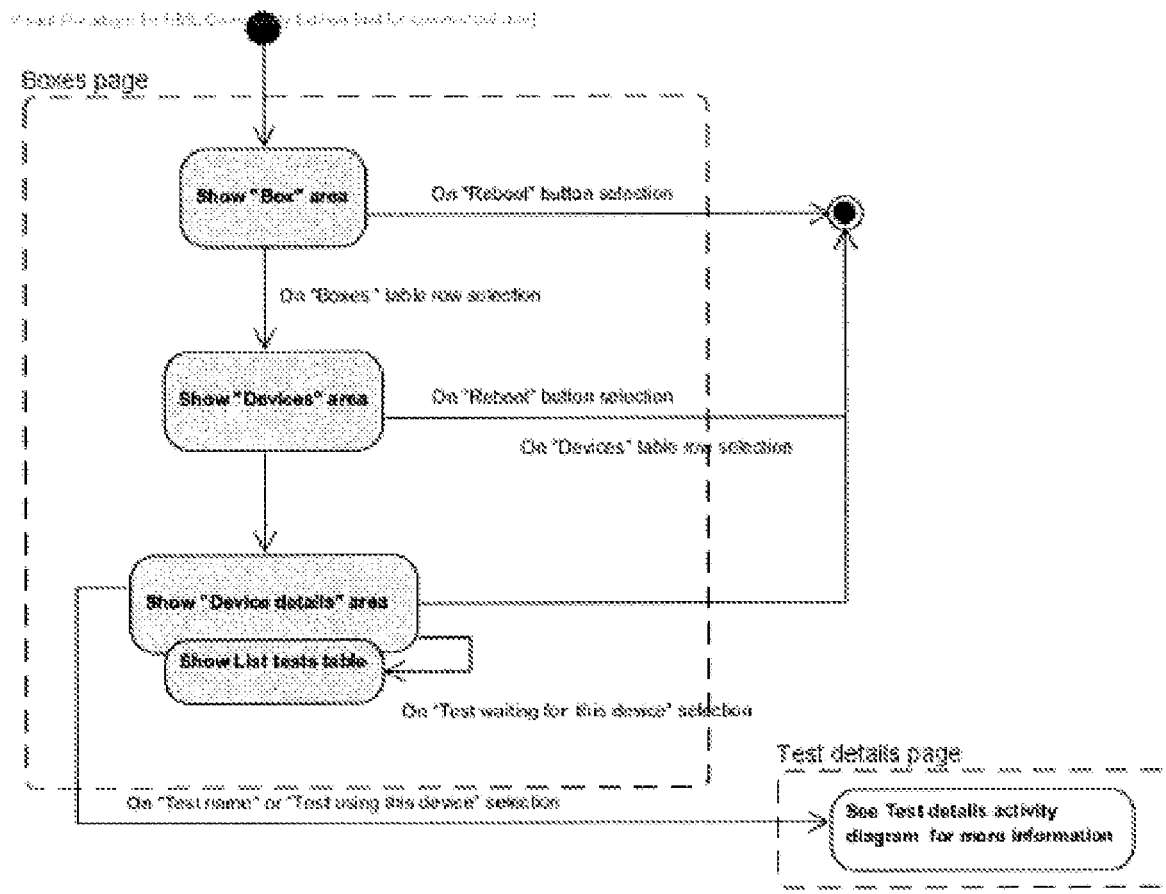
Diagram 1 – List boxes activity When user selects "Resources > List Boxes" menu entry, the list boxes service will be invoked. In case of error, an error message will be displayed warning the user. In case of success the following view will be displayed:

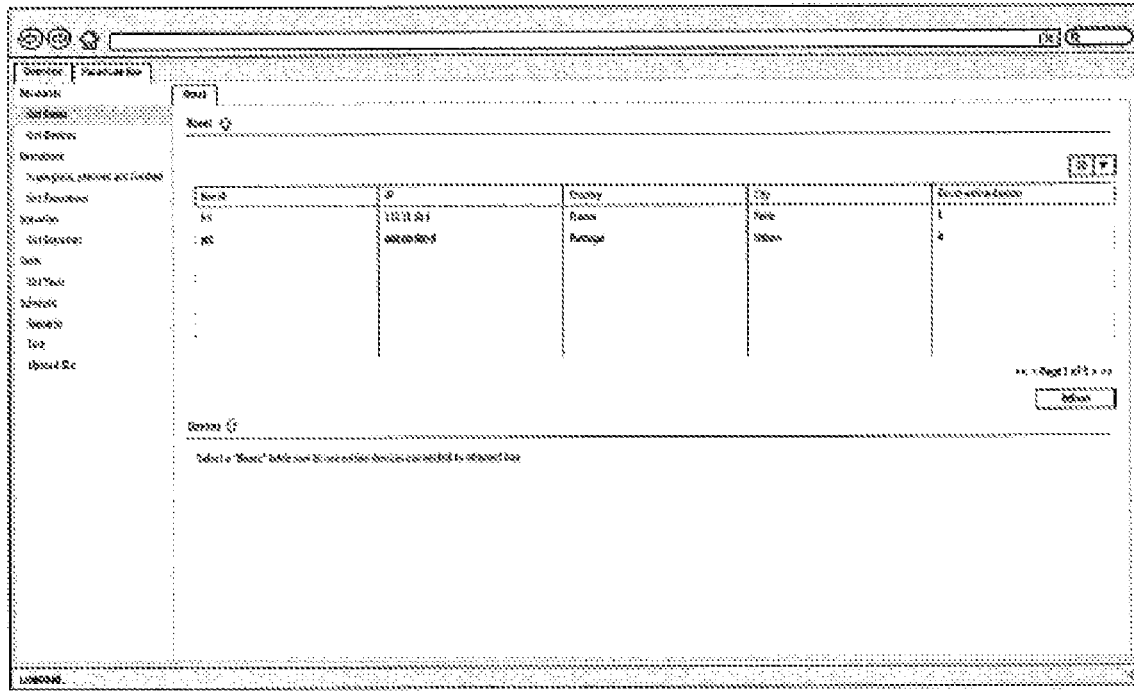

Fig. 1 - Boxes Page

The following table presents a description of all the information that the previous screen area will manage:

| "Boxes" area - in this area all boxes will be listed ||||||
|---|---|---|---|---|---|
| | Field Name | Field Type | Field Status | Visible | Action |
| Boxes table | Box id | Text | Read only | TRUE | On row selection, the "Devices" area will be refreshed |
| | Country | Text | Read only | TRUE | |
| | City | Text | Read only | TRUE | |
| | Count online devices | Text | Read only | TRUE | |
| | IP | Text | Read only | If is a "Full access" user | |
| Reboot | | Button | -- | If is a "Full access" user | The reboot service will be invoked and the return message (error or success) will be displayed |
| "Devices" area - in this area all online devices connected to the selected box will be listed ||||||
| See "List devices" view for more information ||||||

List devices
The "List devices" view will list all online devices and allows to see the detailed information of one selected device.
The List boxes activity will follow the steps described in the flowchart below:
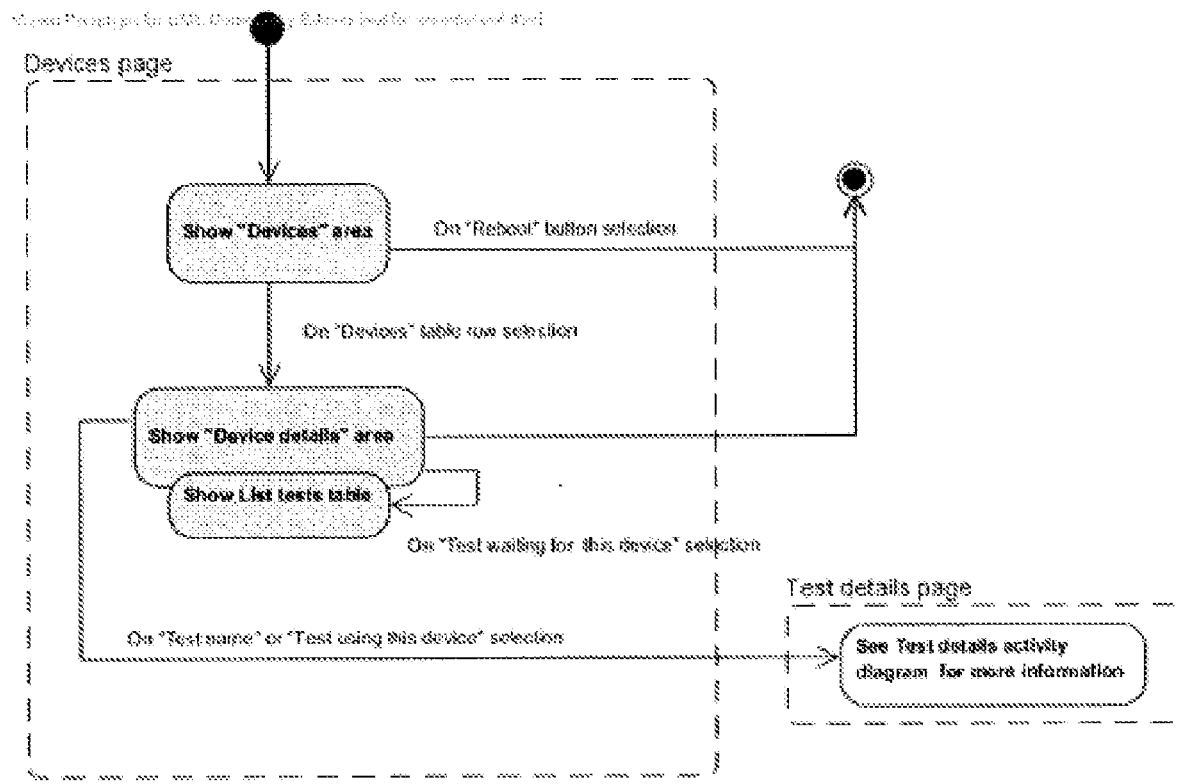
Diagram 2 – List devices activity When user selects "Resources > List Devices" menu entry, the list devices service will be invoked. In case of error, an error message will be displayed warning the user. In case of success the following view will be displayed:

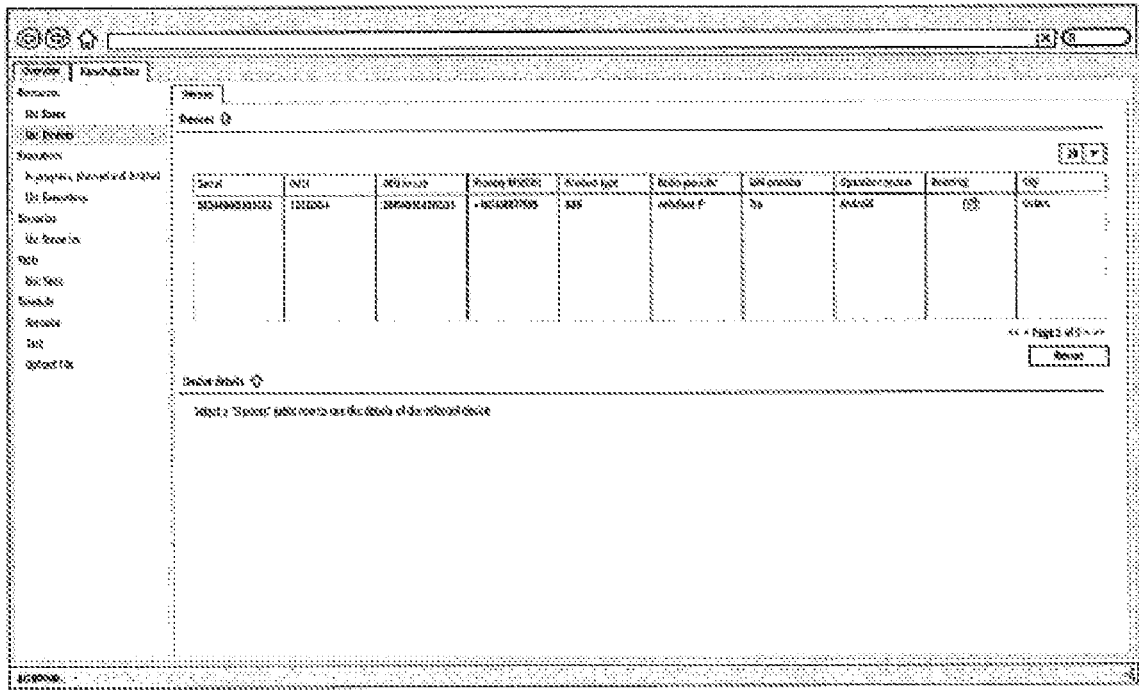

Fig. 2 – Devices page

The following table presents a description of all the information that the previous screen area will manage:

| "Devices" area – in this area all devices will be listed | | | | | |
|---|---|---|---|---|---|
| | Field Name | Field Type | Field Status | Visible | Action |
| Devices table | Serial | Text | Read only | TRUE | On row selection, the "Device details" area will be refreshed |
| | IMEI | Text | Read only | TRUE | |
| | IMSI in Use | Text | Read only | TRUE | |
| | Primary MSISDN | Text | Read only | TRUE | |
| | Product Type | Text | Read only | TRUE | |
| | Radio Provider | Text | Read only | TRUE | |
| | SIM Provider | Text | Read only | TRUE | |
| | Operation System | Text | Read only | TRUE | |
| | Roaming | Check box | Read only | TRUE | |
| | City | Text | Read only | TRUE | |
| Reboot | | Button | – | If is a OSS user | Reboot the selected Device |
| "Device details" area – in this area the details of the selected device will be presented | | | | | |

Device details
When user selects to see the details of a device, the following view will be displayed:
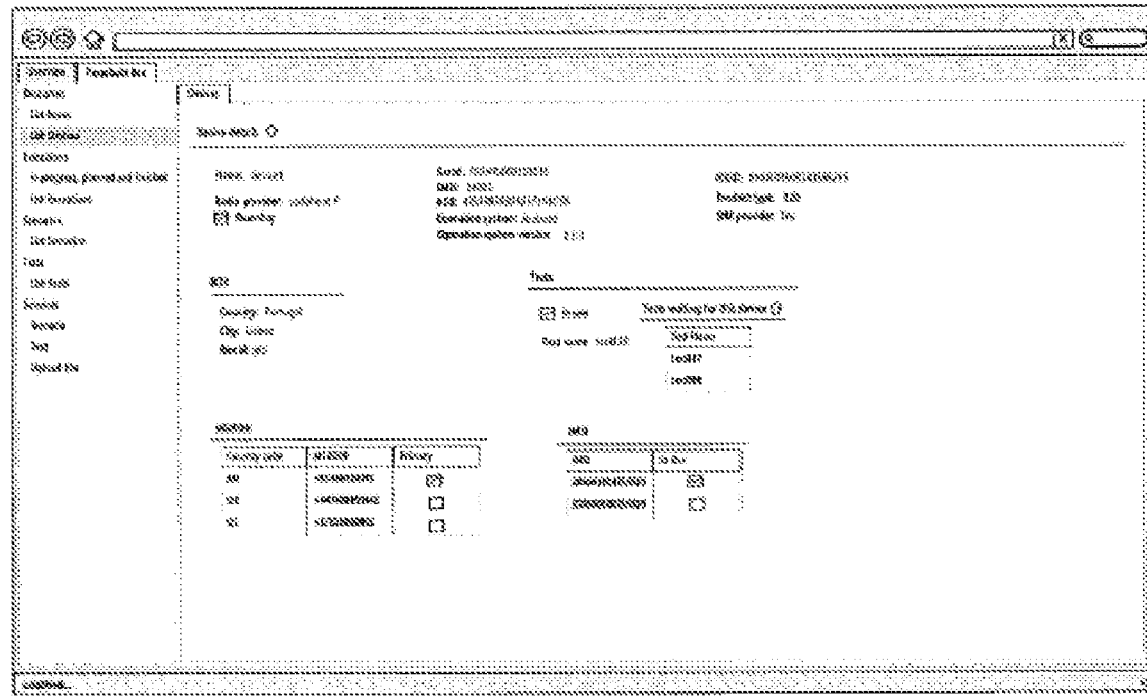
Fig. 3 – Device details page The following table presents a description of all the information that the previous screen area will manage:

| "Device details" area - in this area the details of the selected device will be presented ||||||
|---|---|---|---|---|---|
| Field Name || Field Type | Field Status | Visible | Action |
| Name || Text | Read only | TRUE | - |
| Radio provider || Text | Read only | TRUE | - |
| Roaming || Check Box | Read only | TRUE | - |
| Serial || Text | Read only | TRUE | - |
| IMEI || Text | Read only | TRUE | - |
| ADB || Text | Read only | If "Operation system" is Android | - |
| Operation system || Text | Read only | TRUE | - |
| Operation system version || Text | Read only | TRUE | - |
| ICCID || Text | Read only | TRUE | - |
| Product type || Text | Read only | TRUE | - |
| SIM provider || Text | Read only | TRUE | - |
| Box | Box Id | Text | Read only | TRUE | - |
| | Country | Text | Read only | TRUE | - |
| | City | Text | Read only | TRUE | - |
| IMSI table | IMSI | Text | Read only | TRUE | - |
| | In Use | Check Box | Read only | TRUE | - |
| MSISDN table | Country | Text | Read only | TRUE | - |
| | MSISDN | Text | Read only | TRUE | - |
| | Primary | Check Box | Read only | TRUE | - |
| Tests | In Use | Check Box | Read only | TRUE | - |
| | Test Name | Link | Read only | TRUE | The "Execution details" view will be opened in a new tab |
| | Tests waiting for this device table | Test name | Link | Read only | TRUE | The "Execution details" view will be opened in a new tab |

Executions

The "Executions" menu entry will encompass information about scenarios and test executions.

Executions overview

The "Executions overview" view will display three tables. The first table will list the next executions, the second one will list executions that are in progress, and the last table will list the last finished executions.

The "Executions overview" activity will follow the steps described in the flowchart below:

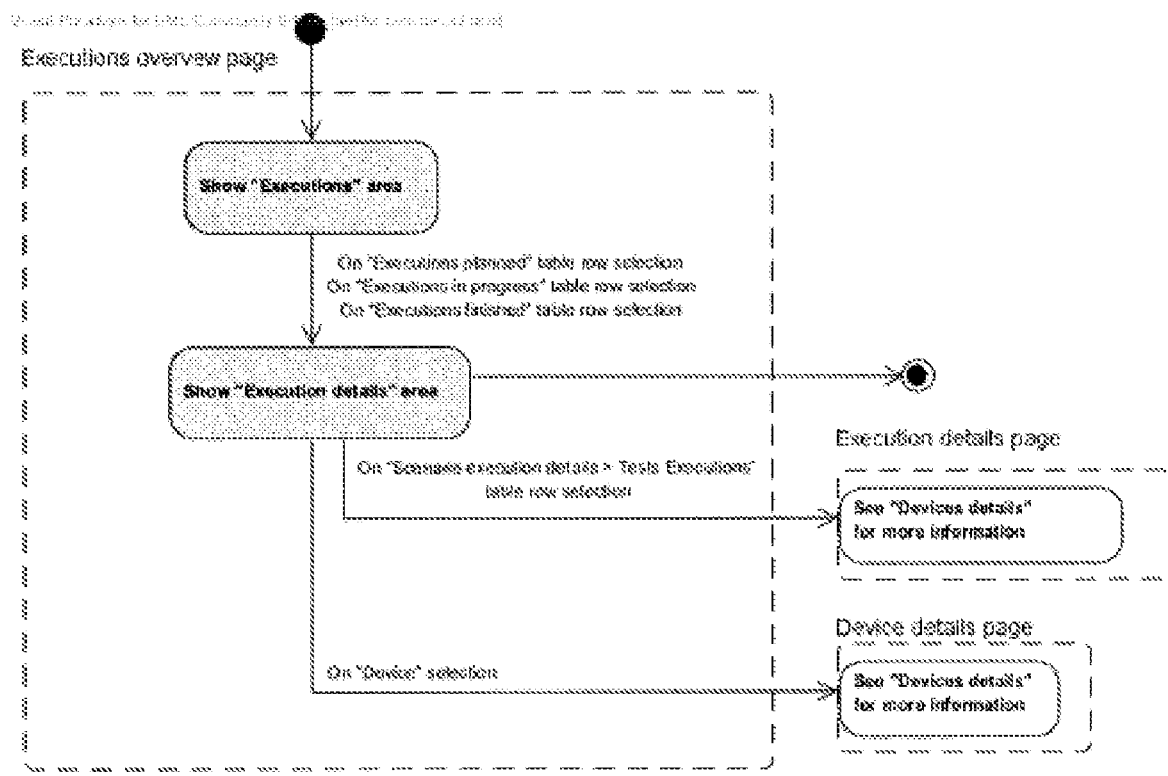

Diagram 3 – Executions overview activity

When user selects the "Executions > Overview", the following view will be displayed:
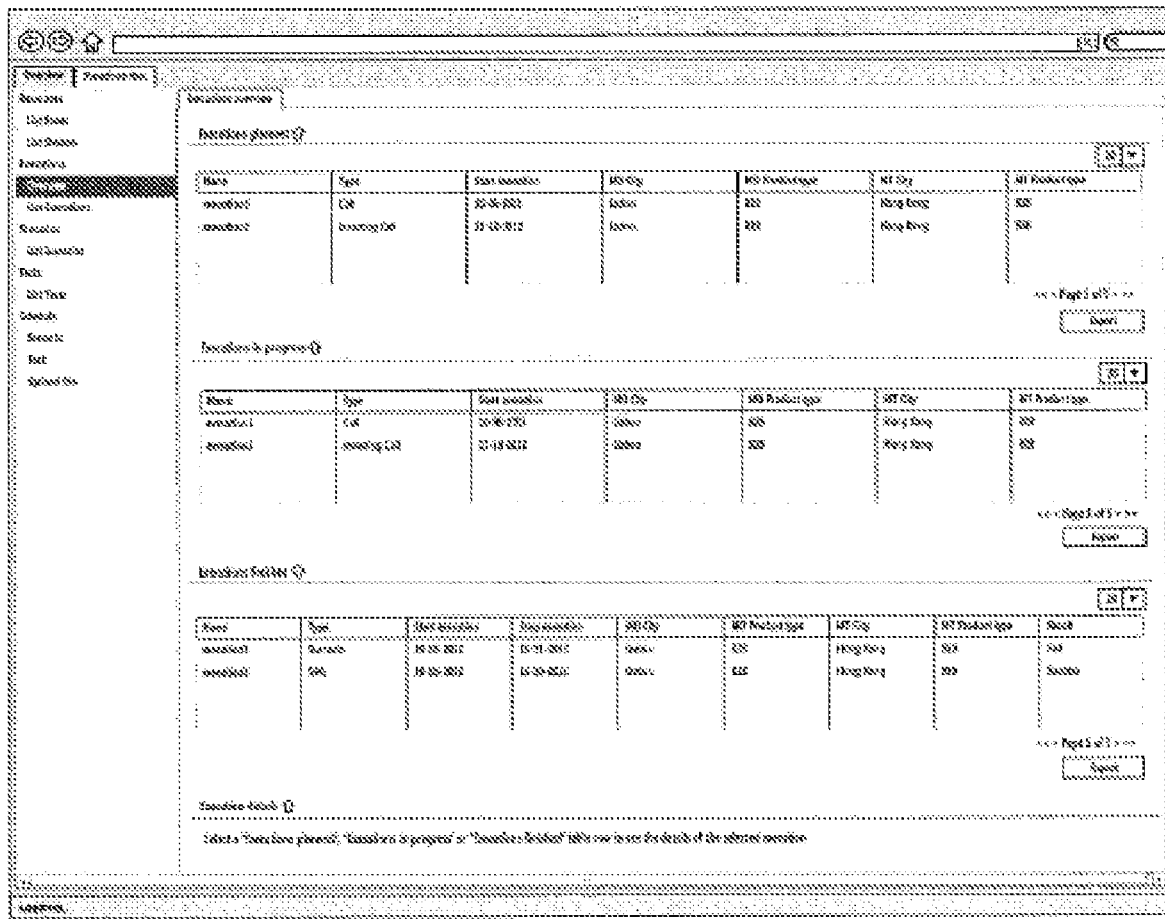
Fig. 4 – Executions overview page The following table presents a description of all the information that the previous screen area will manage:

| "Executions planned" area - in this area the executions planned to run in the next half hour will be listed. ||||||
|---|---|---|---|---|---|
| Field Name ||| Field Type | Field Status | Visible | Action |
| Executions planned table | Name || Text | RO | TRUE | On row selection, the "Scenario details" or "Test details" page will be opened in a new tab |
| | Type || Text | RO | TRUE | |
| | Start execution || Text | RO | TRUE | |
| | MO | City | Text | RO | TRUE | |
| | | Product type | Text | RO | TRUE | |
| | MT | City | Text | RO | TRUE | |
| | | Product type | Text | RO | TRUE | |
| Export ||| Button | - | TRUE | See "Executions file" for more information |
| "Executions in progress" area - in this area the executions in progress will be listed. ||||||
| Field Name ||| Field Type | Field Status | Visible | Action |
| Executions in progress table | Name || Text | RO | TRUE | On row selection, the "Execution details" area will be refreshed |
| | Type || Text | RO | TRUE | |
| | Start execution || Text | RO | TRUE | |
| | MO | City | Text | RO | TRUE | |
| | | Product type | Text | RO | TRUE | |
| | MT | City | Text | RO | TRUE | |
| | | Product type | Text | RO | TRUE | |
| Export ||| Button | - | TRUE | See "Executions file" for more information |
| "Executions finished" area - in this area the executions finished in the last half hour will be listed. ||||||
| Field Name ||| Field Type | Field Status | Visible | Action |
| Executions finished table | Name || Text | RO | TRUE | On row selection, the "Execution details" area will be refreshed |
| | Type || Text | RO | TRUE | |
| | Start execution || Text | RO | TRUE | |
| | Stop execution || Text | RO | TRUE | |
| | MO | City | Text | RO | TRUE | |
| | | Product type | Text | RO | TRUE | |
| | MT | City | Text | RO | TRUE | |
| | | Product type | Text | RO | TRUE | |
| | Result || Text | RO | TRUE | |
| Export ||| Button | - | TRUE | See "Executions file" for more information |
| "Execution details" area - in this area we will show the details for the selected execution ||||||
| See "Execution details" view for more information ||||||

List executions
The "List executions" view will display information about all executions, and user can view detailed information about the selected execution.
The "List executions" activity will follow the steps described in the flowchart below:
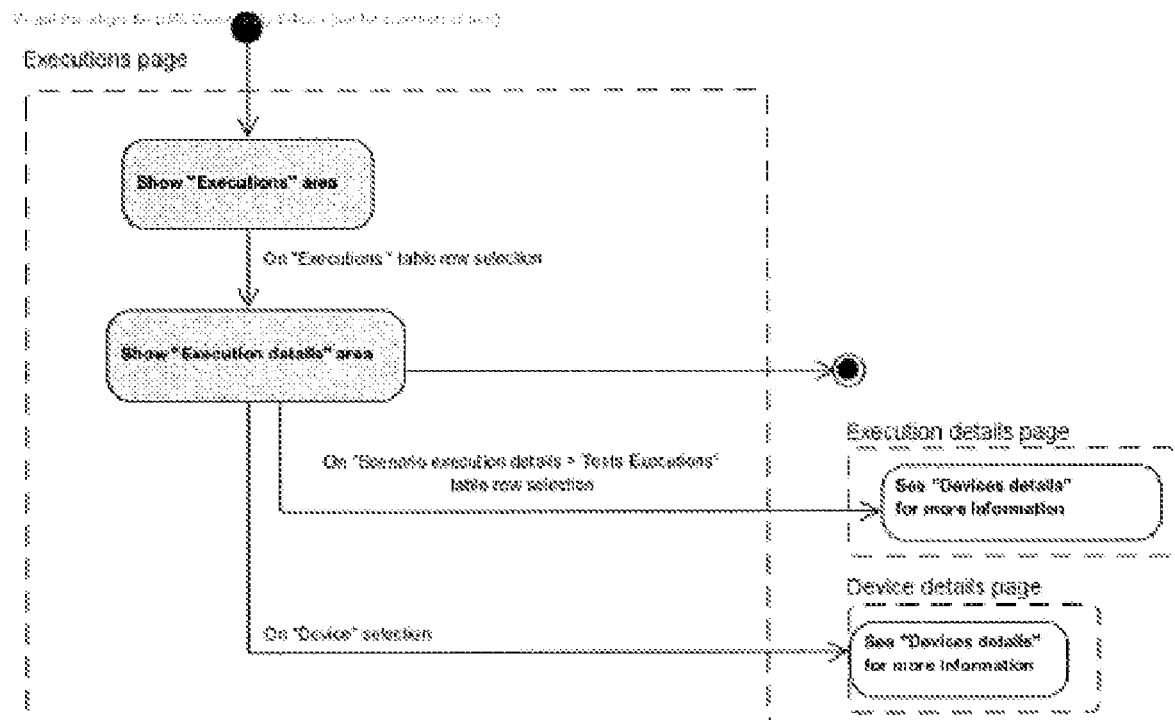
Diagram 4 – List executions activity When user selects the "Executions > List Executions" menu entry, the following view will be displayed:

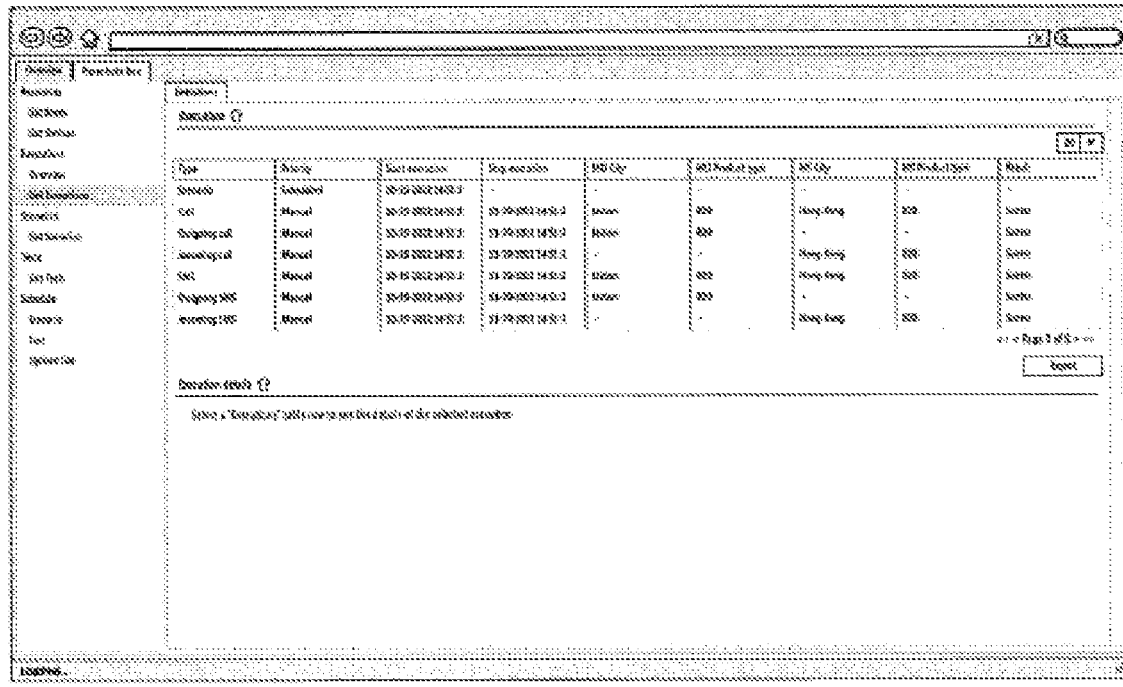

Fig. 5 - Executions page

The following table presents a description of all the information that the previous screen area will manage:

| "Executions" area - in this area we list all executions ||| Field Type | Field Status | Visible | Action |
|---|---|---|---|---|---|---|
| Executions table | Type || Text | Read only | TRUE | On row selection, the "Execution details" area will be refreshed |
| | Priority || Text | Read only | TRUE | |
| | Start Execution || Text | Read only | TRUE | |
| | Stop Execution || Text | Read only | TRUE | |
| | MO | City | Text | Read only | TRUE | |
| | | Product Type | Text | Read only | TRUE | |
| | MT | City | Text | Read only | TRUE | |
| | | Product Type | Text | Read only | TRUE | |
| | Result || Text | Read only | TRUE | |
| Export ||| Button | - | TRUE | See "Export executions" for more information |
| "Execution details" area - in this area the details for the selected execution will be displayed |||||||
| See "Execution details" for more information |||||||

Execution details
This view will display the details of an execution that was previously selected.
Call execution details
When user selects to see the details of an execution of type "Call" the following view will be displayed:
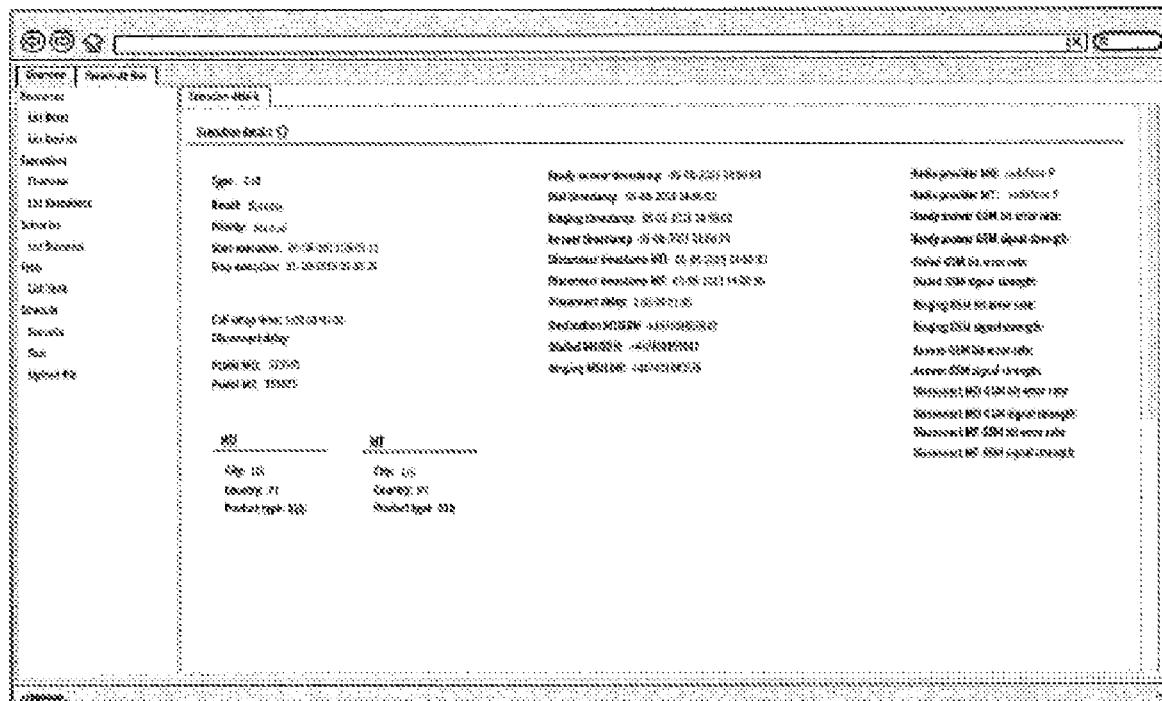
Fig. 6 - Call execution details page The following table presents a description of all the information that the previous screen area v manage:

| "Execution details" area - in this area the details of a "Call" execution will be displayed ||||| 
|---|---|---|---|---|
| Field name | Field type | Field status | Visible | Action |
| Type | Text | Read only | TRUE | - |
| Result | Text | Read only | TRUE | - |
| Priority | Text | Read only | TRUE | - |
| Start Execution | Text | Read only | TRUE | - |
| Stop Execution | Text | Read only | TRUE | - |
| Destination MSISDN | Text | Read only | TRUE | - |
| Dialed MSISDN | Text | Read only | TRUE | - |
| Ringing MSISDN | Text | Read only | TRUE | - |
| Ringing timestamp | Text | Read only | TRUE | - |
| Dial timestamp | Text | Read only | TRUE | - |
| Answer timestamp | Text | Read only | TRUE | - |
| Ready answer timestamp | Text | Read only | TRUE | - |
| Disconnect timestamp MO | Text | Read only | TRUE | - |
| Disconnect timestamp MT | Text | Read only | TRUE | - |
| Call setup time | Text | Read only | TRUE | - |
| Disconnect delay | Text | Read only | TRUE | - |
| Radio provider MO | Text | Read only | TRUE | - |
| Radio provider MT | Text | Read only | TRUE | - |
| PLMN MO | Text | Read only | TRUE | - |
| PLMN MT | Text | Read only | TRUE | - |
| Ready answer GSM bit error rate | Text | Read only | TRUE | - |
| Ready answer GSM signal strength | Text | Read only | TRUE | - |
| Dialed GSM bit error rate | Text | Read only | TRUE | - |
| Dialed GSM signal strength | Text | Read only | TRUE | - |
| Ringing GSM bit error rate | Text | Read only | TRUE | - |
| Ringing GSM signal strength | Text | Read only | TRUE | - |
| Answer GSM bit error rate | Text | Read only | TRUE | - |
| Answer GSM signal strength | Text | Read only | TRUE | - |
| Disconnect MO GSM bit error rate | Text | Read only | TRUE | - |
| Disconnect MO GSM signal strength | Text | Read only | TRUE | - |
| Disconnect MT GSM signal strength | Text | Read only | TRUE | - |
| MO | Link | Read only | TRUE | The "Device details" page will be opened in a new tab |
| City | Text | Read only | TRUE | - |
| Country | Text | Read only | TRUE | - |

| Product Type | Text | Read only | TRUE | - |
| MT | Link | Read only | TRUE | The "Device details" page will be opened in a new tab |
| City | Text | Read only | TRUE | - |
| Country | Text | Read only | TRUE | - |
| Product Type | Text | Read only | TRUE | - |

Outgoing call execution details

When user selects to see the details of an execution of type "Outgoing call" the following view will be displayed:

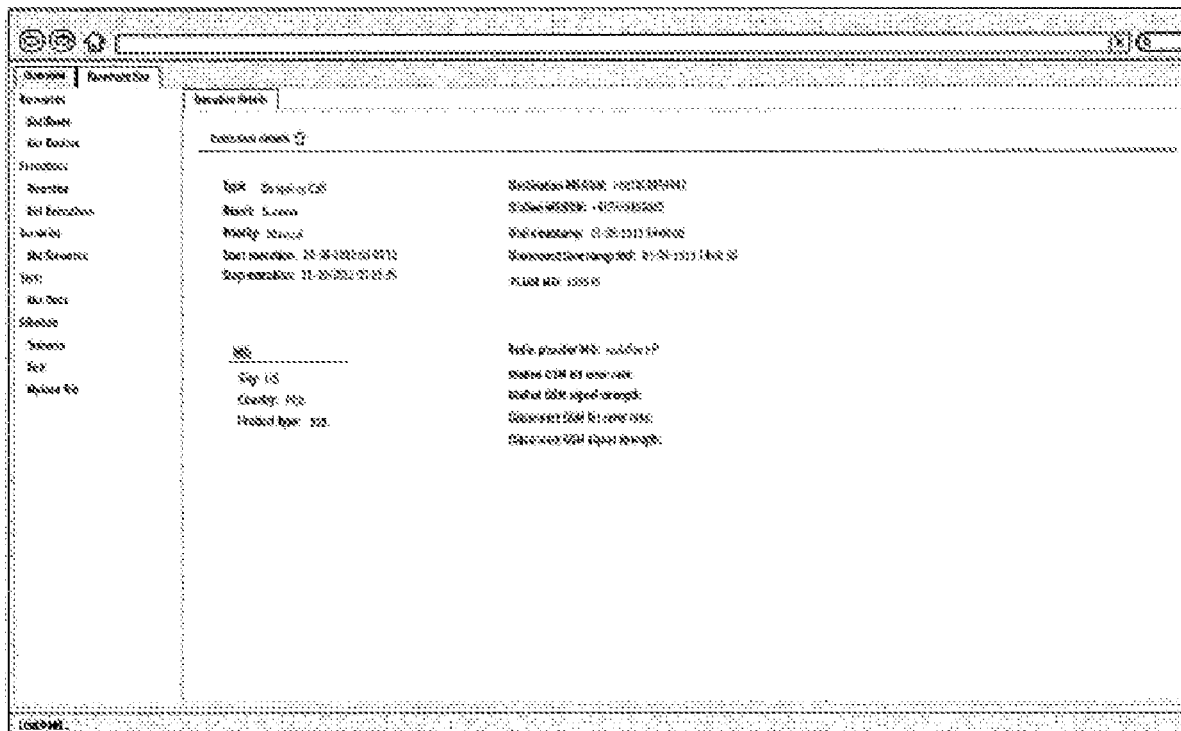

Fig. 7 - Outgoing call execution details page

The following table presents a description of all the information that the previous screen area will manage:

| "Execution details" area - in this area the details of a "Outgoing call" execution will be displayed ||||| 
|---|---|---|---|---|
| Field Name | Field Type | Field Status | Visible | Action |
| Type | Text | Read only | TRUE | - |
| Result | Text | Read only | TRUE | - |
| Priority | Text | Read only | TRUE | - |
| Start Execution | Text | Read only | TRUE | - |
| Stop Execution | Text | Read only | TRUE | - |
| Destination MSISDN | Text | Read only | TRUE | - |
| Dialed MSISDN | Text | Read only | TRUE | - |
| Dial timestamp | Text | Read only | TRUE | - |
| Disconnect timestamp MO | Text | Read only | TRUE | - |
| Radio provider MO | Text | Read only | TRUE | - |
| PLMN MO | Text | Read only | TRUE | - |
| Dialed GSM bit error rate | Text | Read only | TRUE | - |
| Dialed GSM signal strength | Text | Read only | TRUE | - |
| Disconnect GSM bit error rate | Text | Read only | TRUE | - |
| Disconnect GSM signal strength | Text | Read only | TRUE | - |
| MO | Link | Read only | TRUE | The "Device details" page will be opened in a new tab |
| City | Text | Read only | TRUE | - |
| Country | Text | Read only | TRUE | - |
| Product type | Text | Read only | TRUE | - |

Incoming call execution details

When user selects to see the details of an execution of type "Incoming call" the following view will be displayed:

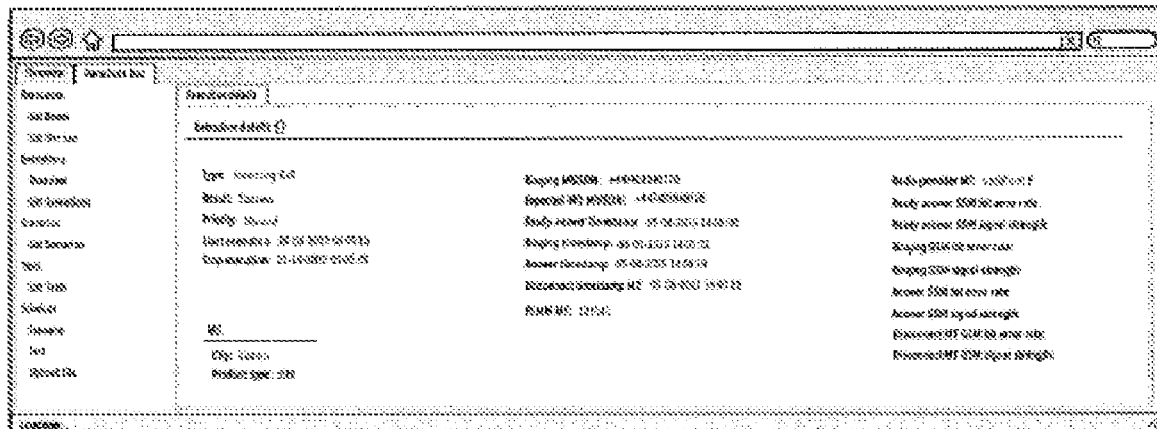

Fig. 8- Incoming call execution details page

The following table presents a description of all the information that the previous screen area will manage:

| "Execution details" area - in this area the details of a "Incoming call" execution will be displayed ||||| 
|---|---|---|---|---|
| Field name | Field type | Field status | Visible | Action |
| Type | Text | Read only | TRUE | - |
| Priority | Text | Read only | TRUE | - |
| Result | Text | Read only | TRUE | - |
| Start execution | Text | Read only | TRUE | - |
| Stop execution | Text | Read only | TRUE | - |
| Ringing MSISDN | Text | Read only | TRUE | - |
| Expected MO MSISDN | Text | Read only | TRUE | - |
| Ringing timestamp | Text | Read only | TRUE | - |
| Answer timestamp | Text | Read only | TRUE | - |
| Disconnect timestamp MT | Text | Read only | TRUE | - |
| Ready answer timestamp | Text | Read only | TRUE | - |
| PLMN MT | Text | Read only | TRUE | - |
| Radio provider MT | Text | Read only | TRUE | - |
| Ready answer GSM bit error rate | Text | Read only | TRUE | - |
| Ready answer GSM signal strength | Text | Read only | TRUE | - |
| Ringing GSM bit error rate | Text | Read only | TRUE | - |
| Ringing GSM signal strength | Text | Read only | TRUE | - |
| Answer GSM bit error rate | Text | Read only | TRUE | - |
| Answer GSM signal strength | Text | Read only | TRUE | - |
| Disconnect MT GSM bit error rate | Text | Read only | TRUE | - |
| Disconnect MT GSM signal strength | Text | Read only | TRUE | - |
| MT | Link | Read only | TRUE | The "Device details" page will be opened in a new tab |
| City | Text | Read only | TRUE | - |
| Country | Text | Read only | TRUE | - |
| Product type | Text | Read only | TRUE | - |

SMS execution details
When user selects to see the details of an execution of type "SMS" the following view will be displayed:
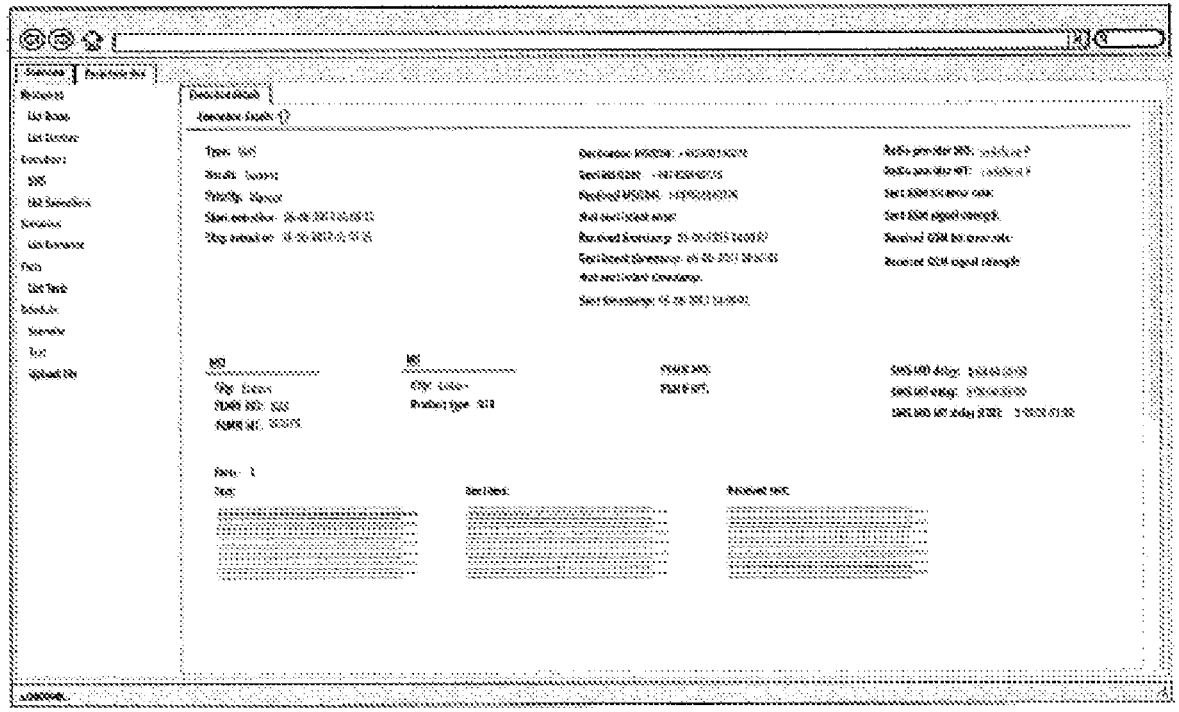
Fig. 9 - SMS execution details page The following table presents a description of all the information that the previous screen area will manage:

| "Execution details" area - in this area the details of a "SMS" execution will be displayed ||||||
|---|---|---|---|---|
| Field Name | Field Type | Field Status | Visible | Action |
| Type | Text | Read only | TRUE | - |
| Priority | Text | Read only | TRUE | - |
| Result | Text | Read only | TRUE | - |
| Start execution | Text | Read only | TRUE | - |
| Stop execution | Text | Read only | TRUE | - |
| Destination MSISDN | Text | Read only | TRUE | - |
| Sent MSISDN | Text | Read only | TRUE | - |
| Received MSISDN | Text | Read only | TRUE | - |
| Received timestamp | Text | Read only | TRUE | - |
| Sent timestamp | Text | Read only | TRUE | - |
| Sent intent timestamp | Text | Read only | TRUE | - |
| SMS MO delay | Text | Read only | TRUE | - |
| SMS MT delay | Text | Read only | TRUE | - |
| SMS MO-MT delay (E2E) | Text | Read only | TRUE | - |
| Parts | Text | Read only | TRUE | - |
| Text | Text | Read only | TRUE | - |
| Sent text | Text | Read only | TRUE | - |
| Received text | Text | Read only | TRUE | - |
| Radio provider MO | Text | Read only | TRUE | - |
| Radio provider MT | Text | Read only | TRUE | - |
| PLMN MO | Text | Read only | TRUE | - |
| PLMN MT | Text | Read only | TRUE | - |
| Not sent intent error | Text | Read only | TRUE | - |
| Not sent intent timestamp | Text | Read only | TRUE | - |
| Sent GSM bit error rate | Text | Read only | TRUE | - |
| Sent GSM signal strength | Text | Read only | TRUE | - |
| Received GSM bit error rate | Text | Read only | TRUE | - |
| Received GSM signal strength | Text | Read only | TRUE | - |
| MO | Link | Read only | TRUE | The "Device details" page will be opened in a new tab |
|    City | Text | Read only | TRUE | - |
|    Country | Text | Read only | TRUE | - |
|    Product type | Text | Read only | TRUE | - |
| MT | Link | Read only | TRUE | The "Device details" page will be opened in a new tab |
|    City | Text | Read only | TRUE | - |
|    Country | Text | Read only | TRUE | - |

| | Product type | Text | Read only | TRUE | - |
Outgoing SMS execution details
When user selects to see the details of an execution of type "Outgoing SMS" the following view will be displayed:
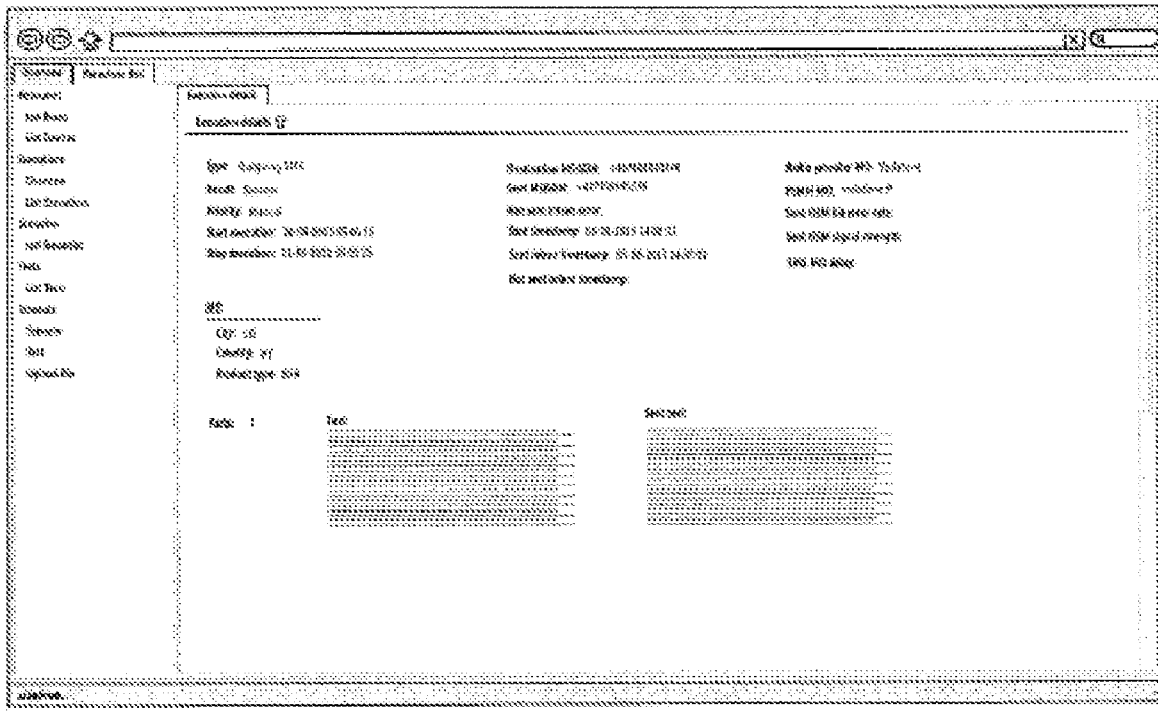
Fig. 10 - Outgoing SMS execution details page The following table presents a description of all the information that the previous screen area will manage:

| "Execution details" area - in this area the details of a "Outgoing SMS" execution will be displayed ||||| 
|---|---|---|---|---|
| Field Name | Field Type | Field Status | Visible | Action |
| Type | Text | Read only | TRUE | - |
| Execution result | Text | Read only | TRUE | - |
| Priority | Text | Read only | TRUE | - |
| Start execution | Text | Read only | TRUE | - |
| Stop execution | Text | Read only | TRUE | - |
| Destination MSISDN | Text | Read only | TRUE | - |
| Sent MSISDN | Text | Read only | TRUE | - |
| Sent timestamp | Text | Read only | TRUE | - |
| Sent intent timestamp | Text | Read only | TRUE | - |
| SMS MO delay | Text | Read only | TRUE | - |
| Not sent intent error | Text | Read only | TRUE | - |
| Not sent intent timestamp | Text | Read only | TRUE | - |
| Parts | Text | Read only | TRUE | - |
| Text | Text | Read only | TRUE | - |
| Sent text | Text | Read only | TRUE | - |
| Radio provider MO | Text | Read only | TRUE | - |
| PLMN MO | Text | Read only | TRUE | - |
| Sent GSM bit error rate | Text | Read only | TRUE | - |
| Sent GSM signal strength | Text | Read only | TRUE | - |
| MO | Link | Read only | TRUE | The "Device details" page will be opened in a new tab |
| City | Text | Read only | TRUE | - |
| Country | Text | Read only | TRUE | - |
| Product type | Text | Read only | TRUE | - |

Incoming SMS execution details

When user selects to see the details of an execution of type "Incoming SMS" the following view will be displayed:

Fig. 11 - Incoming SMS execution details page

The following table presents a description of all the information that the previous screen area will manage:

| "Execution details" area - in this area the details of a "Incoming SMS" execution will be displayed ||||| 
|---|---|---|---|---|
| Field Name | Field Type | Field Status | Visible | Action |
| Type | Text | Read only | TRUE | - |
| Priority | Text | Read only | TRUE | - |
| Start execution | Text | Read only | TRUE | - |
| Stop execution | Text | Read only | TRUE | - |
| Result | Text | Read only | TRUE | - |
| Received MSISDN | Text | Read only | TRUE | - |
| Received timestamp | Text | Read only | TRUE | - |
| Wait to receive timestamp | Text | Read only | TRUE | - |
| SMS MT delay | Text | Read only | TRUE | - |
| Parts | Text | Read only | TRUE | - |
| Text | Text | Read only | TRUE | - |
| Received text | Text | Read only | TRUE | - |
| Radio provider MT | Text | Read only | TRUE | - |
| Received GSM bit error rate | Text | Read only | TRUE | - |
| Received GSM signal strength | Text | Read only | TRUE | - |
| PLMN MT | Text | Read only | TRUE | - |
| MT | Link | Read only | TRUE | The "Device details" page will be opened in a new tab |
| City | Text | Read only | TRUE | - |
| Country | Text | Read only | TRUE | - |
| Product type | Text | Read only | TRUE | - |

Scenario execution details

When user selects to see the details of an execution of type "Scenario" the following view will be displayed:

Fig. 12 - Scenario execution details page

The following table presents a description of all the information that the previous screen area will manage:

| "Execution details" area - in this area the details of a "Scenario" execution will be displayed | | | | | | |
|---|---|---|---|---|---|---|
| Field Name | | | Field Type | Field Status | Default Value | Visible | Action |
| Name | | | Text | Read only | - | TRUE | - |
| Type | | | Text | Read only | - | TRUE | - |
| Execution id | | | Text | Read only | - | TRUE | - |
| Priority | | | Text | Read only | - | TRUE | - |
| Start execution | | | Text | Read only | - | TRUE | - |
| Stop execution | | | Text | Read only | - | TRUE | - |
| Execution result | | | Text | Read only | - | TRUE | - |
| Tests table | | Id | Text | Read only | - | TRUE | On row selection the "Execution details" view will be opened in a new tab |
| | | Name | Text | Read only | - | TRUE | |
| | | Type | Text | Read only | - | TRUE | |
| | | Status | Text | Read only | - | TRUE | |
| | MO | City | Text | Read only | - | TRUE | |
| | | Product type | Text | Read only | - | TRUE | |
| | MT | City | Text | Read only | - | TRUE | |
| | | Product type | Text | Read only | - | TRUE | |
| | Fallback | Condition | Text | Read only | - | TRUE | |
| | | Test Id | Text | Read only | - | TRUE | |

Scenarios
List scenarios
The "List scenarios" view will display information about all scenarios and user can view detailed information about the selected scenario.
The "List executions" activity will follow the steps described in the flowchart below:
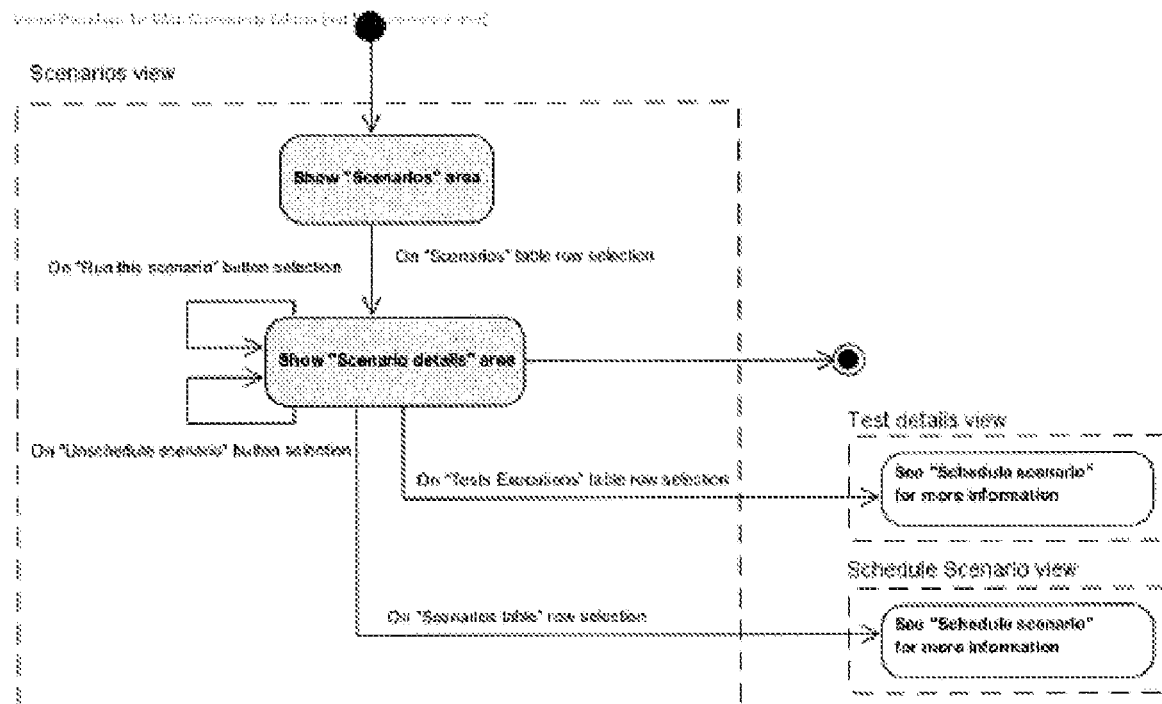
Diagram 5 – List scenarios When user selects the "Scenario > List Scenarios" menu entry, the following view will be displayed:
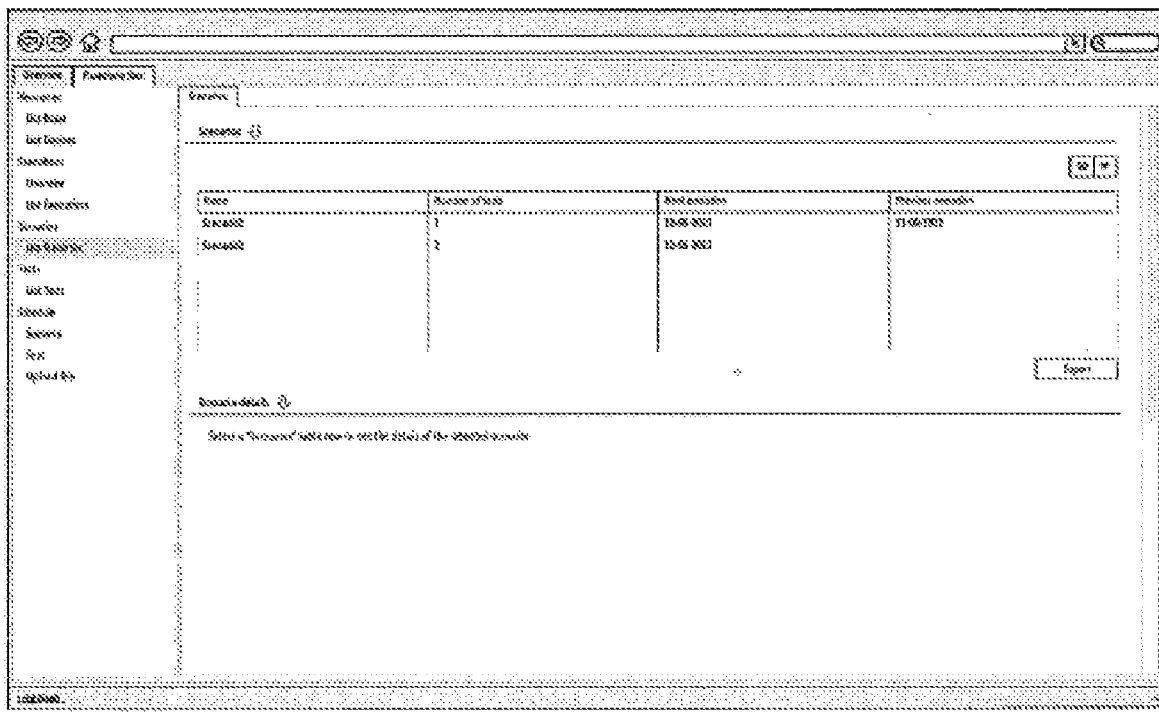
Fig. 13 - Scenarios page The following table presents a description of all the information that the previous screen area will manage:

| "Scenarios" area - in this area all scenarios will be listed | | | | | |
|---|---|---|---|---|---|
| Field Name | | Field Type | Field Status | Visible | Action |
| Scenarios table | Name | Text | RO | TRUE | On row selection, the "Scenario details" area will be refreshed |
| | Number of tests | Text | RO | TRUE | |
| | Next execution | Text | RO | TRUE | |
| | User | Text | RO | TRUE | |
| Export | | Button | - | TRUE | See "ScenarioTests" file |
| "Scenario details" area - in this area the details of a "Scenario" will be displayed | | | | | |
| See "Scenario details" for more information | | | | | |

Scenario details

When user selects to see the details of a selected scenario, the following view will be displayed:

Fig. 14 - Scenario details page

The following table presents a description of all the information that the previous screen area will manage:

| | "Scenario details" area - In this area the details of a "Scenario" will be displayed |
|---|---|---|---|---|---|---|
| colspan="3" | Field Name | Field Type | Field Status | Visible | Action |
| colspan="3" | Name | Text | Read only | TRUE | - |
| colspan="3" | User | Text | Read only | TRUE | - |
| colspan="3" | Description | Text | Read only | TRUE | - |
| Trigger | colspan="2" | Description | Text | Read only | TRUE | - |
| | colspan="2" | Timestamp | Text | Read only | If is a timestamp trigger | - |
| | colspan="2" | Cron | Text | Read only | If is a cron trigger | - |
| Result action table | colspan="2" | Result | Text | Read only | TRUE | - |
| | colspan="2" | To | Text | Read only | TRUE | - |
| | colspan="2" | Subject | Text | Read only | TRUE | - |
| | colspan="2" | Detailed | Check Box | Read only | TRUE | - |
| | colspan="2" | Message | Text | Read only | TRUE | - |
| Tests table | colspan="2" | Id | Text | Read only | TRUE | On row selection, the "Test details" page will be opened in a new tab |
| | colspan="2" | Name | Text | Read only | TRUE | |
| | colspan="2" | Type | Text | Read only | TRUE | |
| | colspan="2" | Status | Text | Read only | TRUE | |
| | MO | City | Text | Read only | TRUE | |
| | | Product type | Text | Read only | TRUE | |
| | MT | City | Text | Read only | TRUE | |
| | | Product type | Text | Read only | TRUE | |
| | Fallback | Condition | Text | Read only | TRUE | |
| | | Test Id | Text | Read only | TRUE | |
| colspan="3" | Run this scenario | Button | - | If scenario is not running and is a "Full access" or "Read and schedule" user If scenario is not running and is a "Read and execute" user and trigger is "Execute now" | Run this scenario |
| colspan="3" | Unschedule this scenario | Button | - | If scenario is schedule and is a "Full access" or "Read and schedule" user | Unschedule this scenario |
| colspan="3" | Close This | Button | - | If scenario is a "Full access" or "Read and schedule" user If is a "Read and execute" user and trigger is "Execute now" | The "Schedule scenario" page will be opened with the information of this scenario |

Tests
List tests
The "Tests" view will display information about all tests, and user can view detailed information about the selected test.
The List tests activity will follow the steps described in the flowchart below:
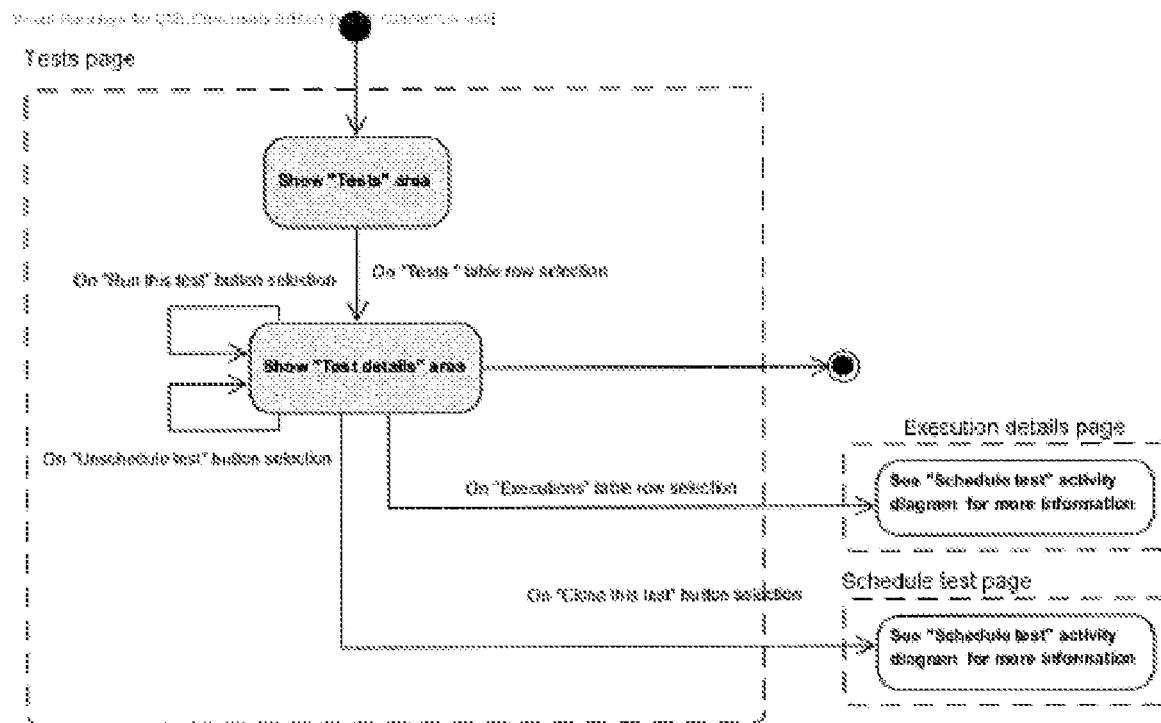
Diagram 6 – Tests activity When user selects "Tests > List Tests" menu entry, the following view will be displayed:
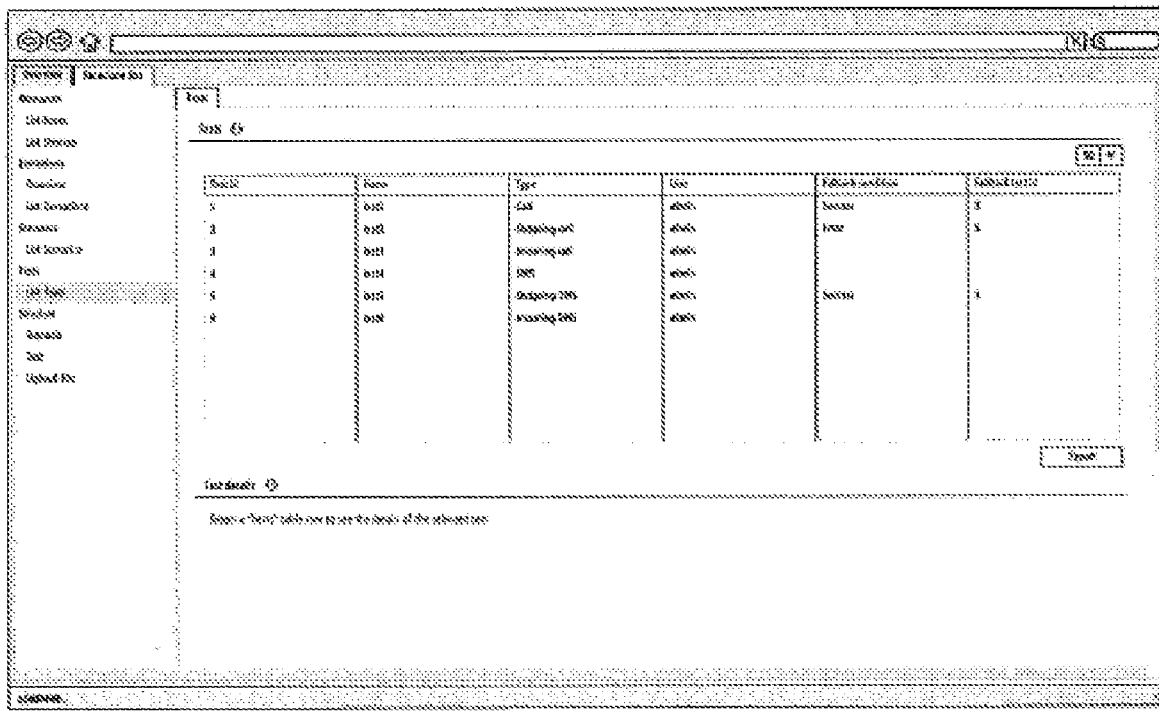
Fig. 15 - Tests page The following table presents a description of all the information that the previous screen area will manage:

| "Tests" area - in this area we will show all tests ||||||
|---|---|---|---|---|---|
| | Field Name | Field Type | Field Status | Visible | Action |
| Tests table | Test id | Text | Read only | TRUE | On row selections, "Test details" area will be refreshed |
| | Name | Text | Read only | TRUE | |
| | Type | Text | Read only | TRUE | |
| | User | Text | Read only | TRUE | |
| | Fallback condition | Text | Read only | TRUE | |
| | Fallback test id | Text | Read only | TRUE | |
| Export | | Button | - | TRUE | See "Scenario\tests" file |
| "Test details" area - in this area we will show a test details ||||||
| See "Test details" for more information ||||||

Test details

This view will display the details of a test that was previously selected.

Call test details page

When user selects to see the details of a test of type "Call" the following view will be displayed:

Fig. 16 - Call test details page

The following table presents a description of all the information that the previous screen area will manage:

| "Test details" area - in this area we will show a test details |||||
|---|---|---|---|---|
| Field Name | Field Type | Field Status | Visible | Action |
| Name | Text | Read only | TRUE | - |
| Type | Text | Read only | TRUE | - |
| User | Text | Read only | TRUE | - |
| Description | Text | Read only | TRUE | - |
| Wait resources timeout | Text | Read only | TRUE | - |
| Duration | Text | Read only | TRUE | - |
| Max dialling delay | Text | Read only | TRUE | - |
| Ringing time | Text | Read only | TRUE | - |
| Max disconnect delay | Text | Read only | TRUE | - |
| MSISDN format | Text | Read only | TRUE | - |
| Disconnect call MO | Text | Read only | TRUE | - |
| Disconnect call MT | Text | Read only | TRUE | - |
| Device selection MO | Text | Read only | TRUE | - |
| Device selection MT | Text | Read only | TRUE | - |
| Fallback: Execute unexistent condition | Text | Read only | TRUE | - |
| Fallback: Result to meet condition | Text | Read only | TRUE | - |
| Fallback: Test Id | Text | Read only | TRUE | - |
| Schedule | Button | - | TRUE | Run this scenario |
| Unschedule | Button | - | TRUE | Unschedule this scenario |
| Close | Button | - | TRUE | The "Schedule test" page will be opened with the information of this test |
| "Executions" area - in this area the executions of this test will be listed |||||
| See "Executions" page for more information |||||

Outgoing call test details page
When user selects to see the details of a test of type "Outgoing call" the following view will be displayed:
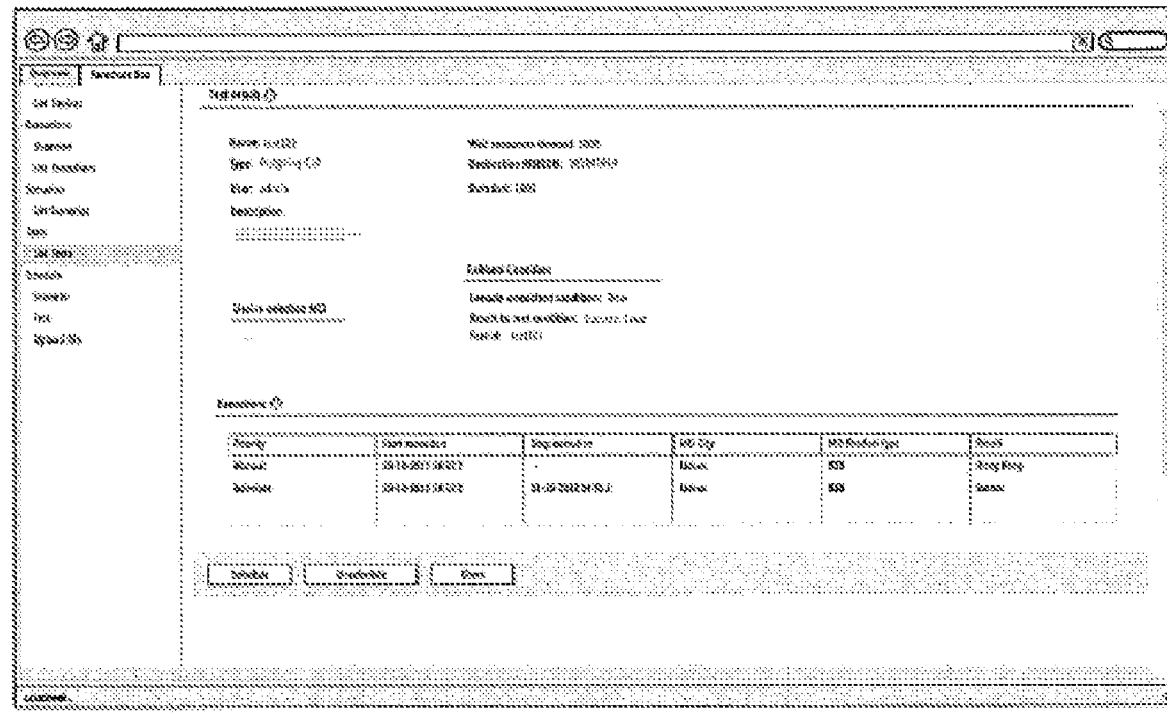
Fig. 17 - Outgoing call test details page The following table presents a description of all the information that the previous screen area will manage:

| "Test details" area - in this area we will show a test details ||||| 
|---|---|---|---|---|
| Field Name | | Field Type | Field Status | Visible | Action |
| Name | | Text | Read only | TRUE | - |
| Type | | Text | Read only | TRUE | - |
| User | | Text | Read only | TRUE | - |
| Description | | Text | Read only | TRUE | - |
| Wait resources timeout | | Text | Read only | TRUE | - |
| Destination MSISDN | | Text | Read only | TRUE | - |
| Duration | | Text | Read only | TRUE | - |
| Device selection MO | | Text | Read only | TRUE | - |
| Fallback | Execute unexistent condition | Text | Read only | TRUE | - |
| | Result to meet condition | Text | Read only | TRUE | - |
| | Test id | Text | Read only | TRUE | - |
| Schedule | | Button | - | TRUE | Run this scenario |
| Unschedule | | Button | - | TRUE | Unschedule this scenario |
| Close | | Button | - | TRUE | The "Schedule test" page will be opened with the information of this test |
| "Executions" area - in this area the executions of this test will be listed ||||| 
| See "Executions" page for more information |||||

Incoming call test details page

When user selects to see the details of a test of type "incoming call" the following view will be displayed:

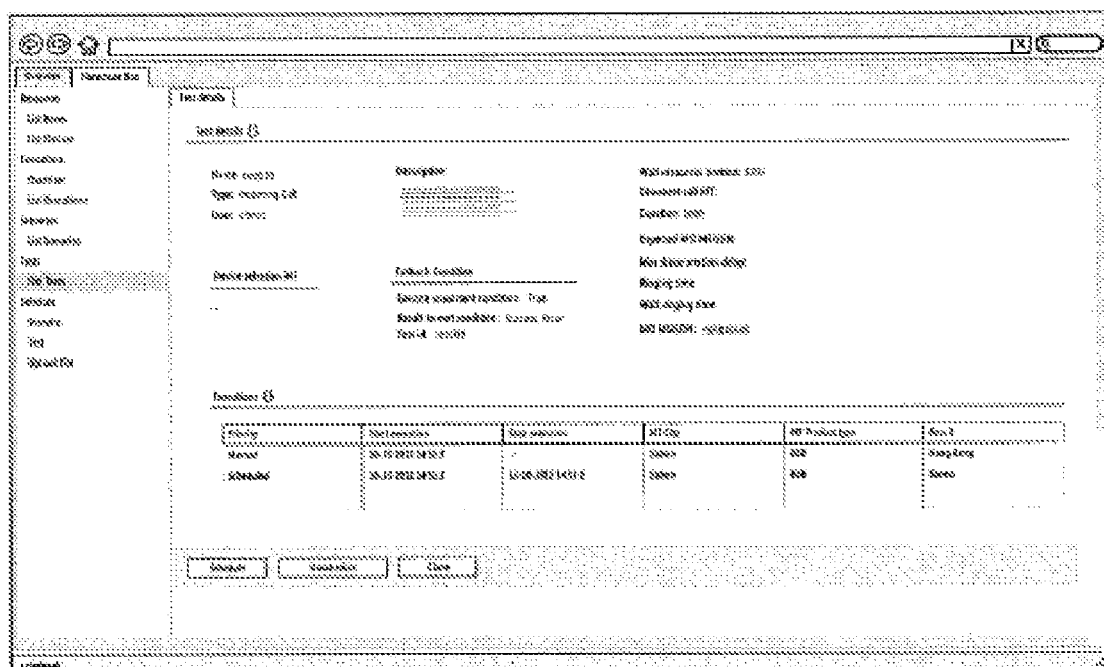

Fig. 18 - Incoming call test details

The following table presents a description of all the information that the previous screen area will manage:

| | "Test details" area - in this area we will show a test details |||||
|---|---|---|---|---|
| Field Name | | Field Type | Field Status | Visible | Action |
| Name | | Text | Read only | TRUE | - |
| Type | | Text | Read only | TRUE | - |
| User | | Text | Read only | TRUE | - |
| Description | | Text | Read only | TRUE | - |
| Wait resources timeout | | Text | Read only | TRUE | - |
| Disconnect call MT | | Text | Read only | TRUE | - |
| Duration | | Text | Read only | TRUE | - |
| Expected MO MSISDN | | Text | Read only | TRUE | - |
| Max disconnection delay | | Text | Read only | TRUE | - |
| Wait ringing time | | Text | Read only | TRUE | - |
| Ringing time | | Text | Read only | TRUE | - |
| MO MSISDN | | Text | Read only | TRUE | - |
| Device selection MT | | Text | Read only | TRUE | - |
| Fallback | Execute unexistent condition | Text | Read only | TRUE | - |
| | Result to met condition | Text | Read only | TRUE | - |
| | Test id | Text | Read only | TRUE | - |
| Schedule | | Button | - | TRUE | Run this scenario |
| Unschedule | | Button | - | TRUE | Unschedule this scenario |
| Close | | Button | - | TRUE | The "Schedule test" page will be opened with the information of this test |
| | "Executions" area - in this area the executions of this test will be listed |||||
| | See "Executions" page for more information |||||

SMS test details page

When user selects to see the details of a test of type "SMS" the following view will be displayed:

Fig. 19 - SMS test details page

The following table presents a description of all the information that the previous screen area will manage:

| "Test details" area - in this area we will show a test details ||||||
|---|---|---|---|---|---|
| Field Name || Field Type | Field Status | Visible | Action |
| Name || Text | Read only | TRUE | - |
| Type || Text | Read only | TRUE | - |
| User || Text | Read only | TRUE | - |
| Description || Text | Read only | TRUE | - |
| Wait resources timeout || Text | Read only | TRUE | - |
| Maximum duration || Text | Read only | TRUE | - |
| Late || Text | Read only | TRUE | - |
| M/SON format || Text | Read only | TRUE | - |
| Test || Text | Read only | TRUE | - |
| Device selection MO || Text | Read only | TRUE | - |
| Device selection MT || Text | Read only | TRUE | - |
| Fallback | Execute unexistent condition | Text | Read only | TRUE | - |
| | Result to met condition | Text | Read only | TRUE | - |
| | Test id | Text | Read only | TRUE | - |
| Schedule || Button | - | TRUE | Run this scenario |
| Unschedule || Button | - | TRUE | Unschedule this scenario |
| Clone || Button | - | TRUE | The "Schedule test" page will be opened with the information of this test |
| "Executions" area - in this area the executions of this test will be listed ||||||
| See "Executions" page for more information ||||||

Outgoing SMS test details

When user selects to see the details of a test of type "Outgoing SMS" the following view will be displayed:

Fig. 20 - Outgoing SMS test details page

The following table presents a description of all the information that the previous screen area will manage:

| Field Name | | Field Type | Field Status | Visible | Action |
|---|---|---|---|---|---|
| "Test details" area - in this area we will show a test details ||||||
| Name | | Text | Read only | TRUE | - |
| Type | | Text | Read only | TRUE | - |
| User | | Text | Read only | TRUE | - |
| Description | | Text | Read only | TRUE | - |
| Wait resources timeout | | Text | Read only | TRUE | - |
| Maximum duration | | Text | Read only | TRUE | - |
| Destination MSISDN | | Text | Read only | TRUE | - |
| Text | | Text | Read only | TRUE | - |
| Device selection MO | | Text | Read only | TRUE | - |
| Fallback | Execute unexistent condition | Text | Read only | TRUE | - |
| | Result to met condition | Text | Read only | TRUE | |
| | Test id | Text | Read only | TRUE | - |
| Schedule | | Button | - | TRUE | Run this scenario |
| Unschedule | | Button | - | TRUE | Unschedule this scenario |
| Clone | | Button | - | TRUE | The "Schedule test" page will be opened with the information of this test |
| "Executions" area - in this area the executions of this test will be listed ||||||
| See "Executions" page for more information ||||||

Incoming SMS test details
When user selects to see the details of a test of type "Incoming SMS" the following view will be displayed:
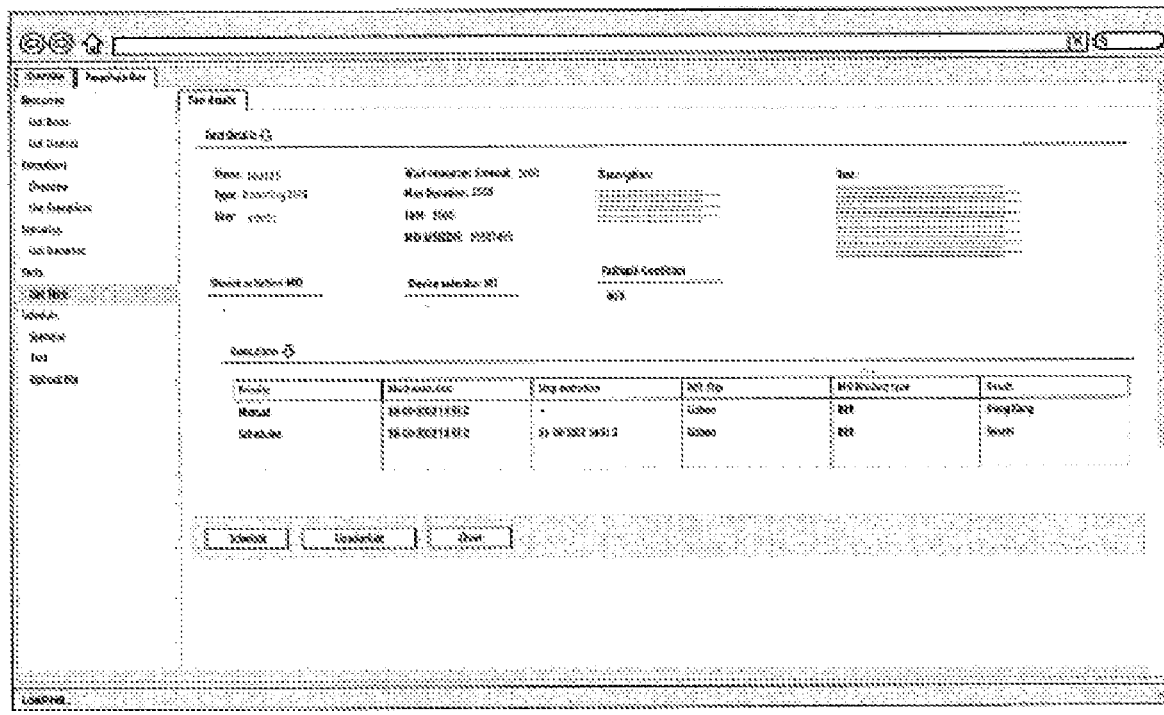
Fig. 23 – Incoming SMS test details page The following table presents a description of all the information that the previous screen area will manage:

| "Test details" area - in this area we will show a test details ||||||
|---|---|---|---|---|---|
| Field Name || Field Type | Field Status | Visible | Action |
| Name || Text | Read only | TRUE | - |
| Type || Text | Read only | TRUE | - |
| User || Text | Read only | TRUE | - |
| Description || Text | Read only | TRUE | - |
| Wait resources timeout || Text | Read only | TRUE | - |
| Maximum duration || Text | Read only | TRUE | - |
| Late time || Text | Read only | TRUE | - |
| MO MSISDN || Text | Read only | TRUE | - |
| Text || Text | Read only | TRUE | - |
| Device selection MT || Text | Read only | TRUE | - |
| Fallback | Execute unexistent condition | Text | Read only | TRUE | - |
| | Result to met condition | Text | Read only | TRUE | |
| | Test id | Text | Read only | TRUE | - |
| Schedule || Button | - | TRUE | Run this scenario |
| Unschedule || Button | - | TRUE | Unschedule this scenario |
| Clone || Button | - | TRUE | The "Schedule test" page will be opened with the information of this test |
| "Executions" area - in this area the executions of this test will be listed ||||||
| See "Executions" page for more information ||||||

Schedule
In "Schedule" menu entry user can schedule a test, scenario or upload a file that will have a group of tests and scenarios.
Schedule scenario
The Schedule test activity will follow the steps described in the flowchart below:
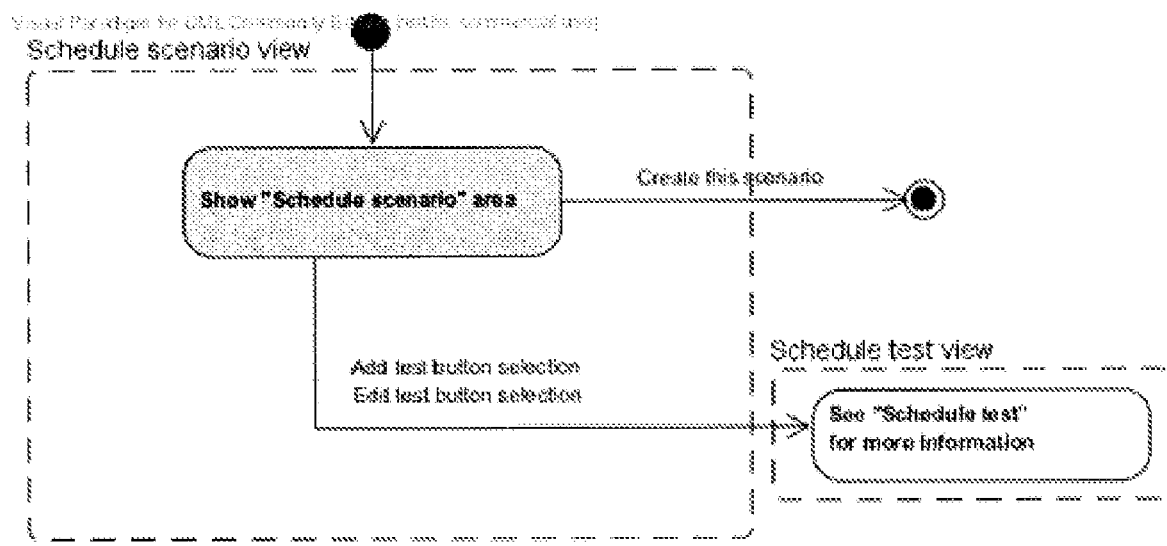
When user selects "Schedule > Scenario" menu entry, the "Schedule Scenario" page view will be displayed:

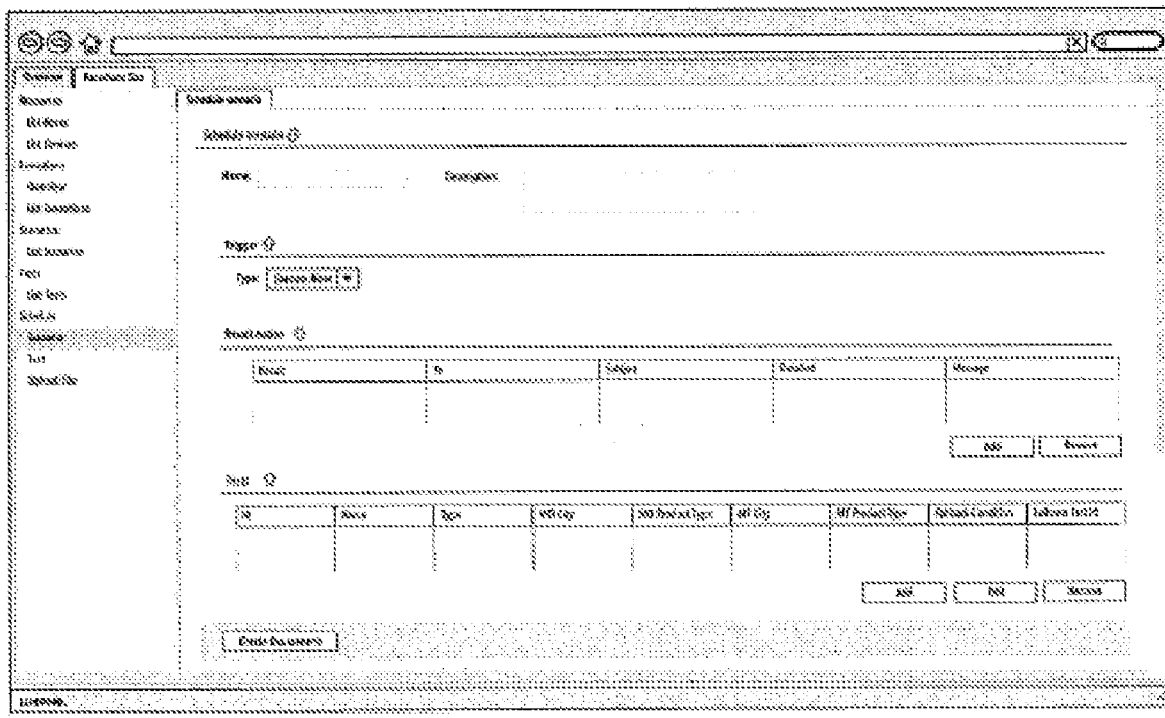
Fig. 22 - Schedule scenario page

The following table presents a description of all the information that the previous screen area will manage:

| | "Schedule Scenario" area - in this area user will input the scenario details | | | | |
|---|---|---|---|---|---|
| | Field Name | Field Type | Field Status | Visible | Action |
| | Name | Text | Write only | TRUE | - |
| | Description | Text | Write only | TRUE | - |
| | Create this scenario | Button | - | TRUE | Create this scenario |
| | "Triggers" sub area - in this area the user can define the trigger that will be associated to this scenario | | | | |
| | See "Triggers" for more information | | | | |
| | "Result action" sub area | | | | |
| | Field Name | Field Type | Field Status | Visible | Action |
| Result Actions table | Result | Text | Write only | TRUE | - |
| | To | Text | Write only | TRUE | - |
| | Subject | Text | Write only | TRUE | - |
| | Detailed | Check Box | Write only | TRUE | - |
| | Message | Text | Write only | TRUE | - |
| Add | | Button | - | TRUE | Create a new empty row in the table |
| Remove | | Button | - | TRUE | Remove the selected row |
| | "Tests" sub area | | | | |
| | Field Name | Field Type | Field Status | Visible | Action |
| Tests table | Id | | Text | Read only | TRUE | - |
| | Name | | Text | Read only | TRUE | - |
| | Type | | Combo box | Read only | TRUE | - |
| | MO | City | Text | Read only | TRUE | - |
| | | Product type | Text | Read only | TRUE | - |
| | MT | City | Text | Read only | TRUE | - |
| | | Product type | Text | Read only | TRUE | - |
| | Fallback | Condition | Text | Write only | TRUE | - |
| | | Test id | Text | Write only | TRUE | - |
| Add | | Button | - | TRUE | The "Schedule test" page will be opened with all fields empty |
| Edit | | Button | - | TRUE | The "Schedule test" page will be opened with the selected Test data |
| Remove | | Button | - | TRUE | Remove the selected row |

Schedule test
The Schedule test activity will follow the steps described in the flowchart below:
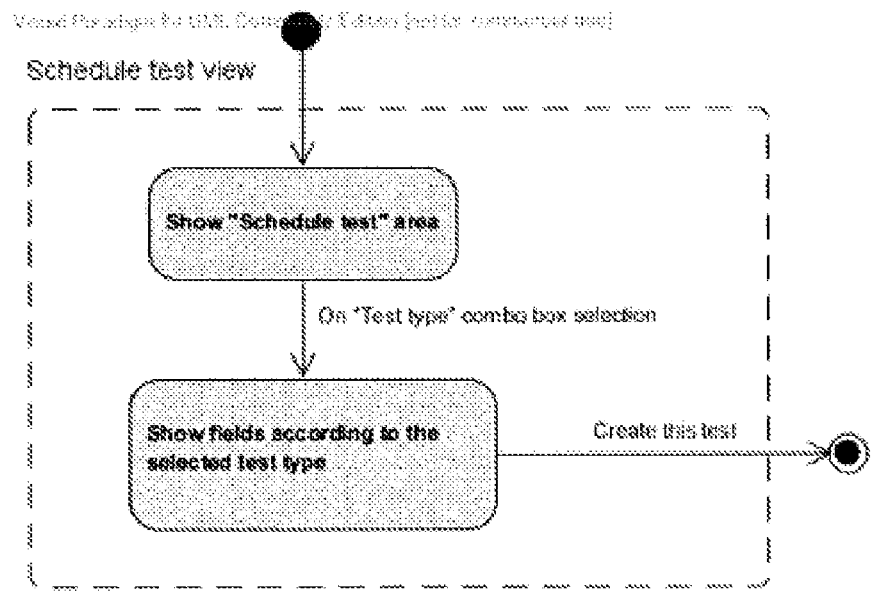
When user selects "Schedule > Test" menu entry, the "Schedule test" page view will be displayed:
Fig. 23 - Schedule test page The following table presents a description of all the information that the previous screen area will manage:

| "Schedule test" area - in this area we will input the test details ||||| 
|---|---|---|---|---|
| Field Name | Field Type | Field Status | Visible | Action |
| Test name | Text | Write only | TRUE | - |
| Test type | Combo box | Write mandatory | TRUE | - |
| Description | Text | Write only | TRUE | - |
| Scenario name | Text | Write only | If is on scenario context | - |
| "Triggers" sub area - in this area the user can define the trigger that will be associated to this test ||||| 
| See "Triggers" for more information ||||| 
| "Result action" sub area ||||| 
| Field Name || Field Type | Field Status | Visible | Action |
| Results actions table | Result | Text | Write only | TRUE | - |
| | To | Text | Write only | TRUE | - |
| | Subject | Text | Write only | TRUE | - |
| | Detailed | Check Box | Write only | TRUE | - |
| | Message | Text | Write only | TRUE | - |
| Add || Button | - | TRUE | Created a new empty row in the table |
| Remove || Button | - | TRUE | Remove the selected row |
| When user selects the "Test type", depending on the type selected, some field will become visible ||||||

Schedule call test

If user selects the test type "Call", the following view will be displayed:

Fig. 24 - Schedule call test page

The following table presents a description of all the information that the previous screen area will manage:

| Field Name | Field Type | Field Status | Default Value | Visible |
|---|---|---|---|---|
| Wait resources timeout | Text | Write mandatory | - | TRUE |
| Duration | Text | Write mandatory | - | TRUE |
| Max dialing delay | Text | Write mandatory | - | TRUE |
| Ringing time | Text | Write mandatory | - | TRUE |
| MO | See "Device selection" for more information | | | |
| MT | | | | |

Schedule outgoing call

If user selects the test type "Outgoing Call", the following view will be displayed:

Fig. 25 - Schedule outgoing call test page

The following table presents a description of all the information that the previous screen area will manage:

| Field Name | Field Type | Field Status | Default Value | Visible |
|---|---|---|---|---|
| Wait resources timeout | Text | Write mandatory | - | TRUE |
| Destination MSISDN | Text | Write mandatory | - | TRUE |
| Duration | Text | Write mandatory | - | TRUE |
| MO | See "Device selection" for more information | | | |

Schedule incoming call

If user selects the test type "Incoming Call", the following view will be displayed:

Fig. 26 - Schedule incoming call test page

The following table presents a description of all the information that the previous screen area will manage:

| Field Name | Field Type | Field Status | Default Value | Visible | Action |
|---|---|---|---|---|---|
| Wait resources timeout | Text | Write Mandatory | - | TRUE | |
| Duration | Text | Write Mandatory | - | TRUE | |
| MO MSISDN | Table | Write Mandatory | - | TRUE | When user inserts one MSISDN, a new row will be created |
| Expected MO MSISDN | Text | Write Mandatory | - | TRUE | |
| Waiting ringing time | Text | Write Mandatory | - | TRUE | |
| Ringing Time | Text | Write Mandatory | - | TRUE | |

Schedule SMS

If user selects the test type "SMS", the following view will be displayed:

Fig. 27 - Schedule SMS test page

The following table presents a description of all the information that the previous screen area will manage:

| Field Name | Field Type | Field Status | Default Value | Visible |
|---|---|---|---|---|
| Max duration | Text | Write mandatory | - | TRUE |
| Late | Text | Write mandatory | - | TRUE |
| Wait resources timeout | Text | Write mandatory | - | TRUE |
| Text | Text | Write mandatory | - | TRUE |
| MO | See "Device selection" for more information | | | |
| MT | | | | |

Schedule outgoing SMS

If user selects the test type "Outgoing SMS", the following view will be displayed:

Fig. 28 - Schedule outgoing SMS test page

The following table presents a description of all the information that the previous screen area will manage:

| Field Name | Field Type | Field Status | Default Value | Visible |
|---|---|---|---|---|
| Max duration | Text | Write mandatory | - | TRUE |
| Wait resources timeout | Text | Write mandatory | - | TRUE |
| Destination MSISDN | Text | Write mandatory | - | TRUE |
| Text | Text | Write mandatory | - | TRUE |
| MO | See "Device selection" for more information | | | |

Schedule incoming SMS

If user selects the test type "Incoming SMS", the following view will be displayed:

Fig. 29 - Schedule Incoming SMS test page

The following table presents a description of all the information that the previous screen area will manage:

| Field Name | Field Type | Field Status | Visible | Action |
|---|---|---|---|---|
| Max duration | Text | Write Mandatory | TRUE | - |
| Late | Text | Write Mandatory | TRUE | - |
| Wait resources timeout | Text | Write Mandatory | TRUE | - |
| Expected MO MSISDN | Text | Write Mandatory | TRUE | - |
| MO MSISDN | Table | Write Mandatory | TRUE | When user inserts one MSISDN, a new row will be created |
| Text | Text | Write Mandatory | TRUE | - |

Upload file
When user selects the "Schedule > Upload file" menu entry, the following view will be displayed:
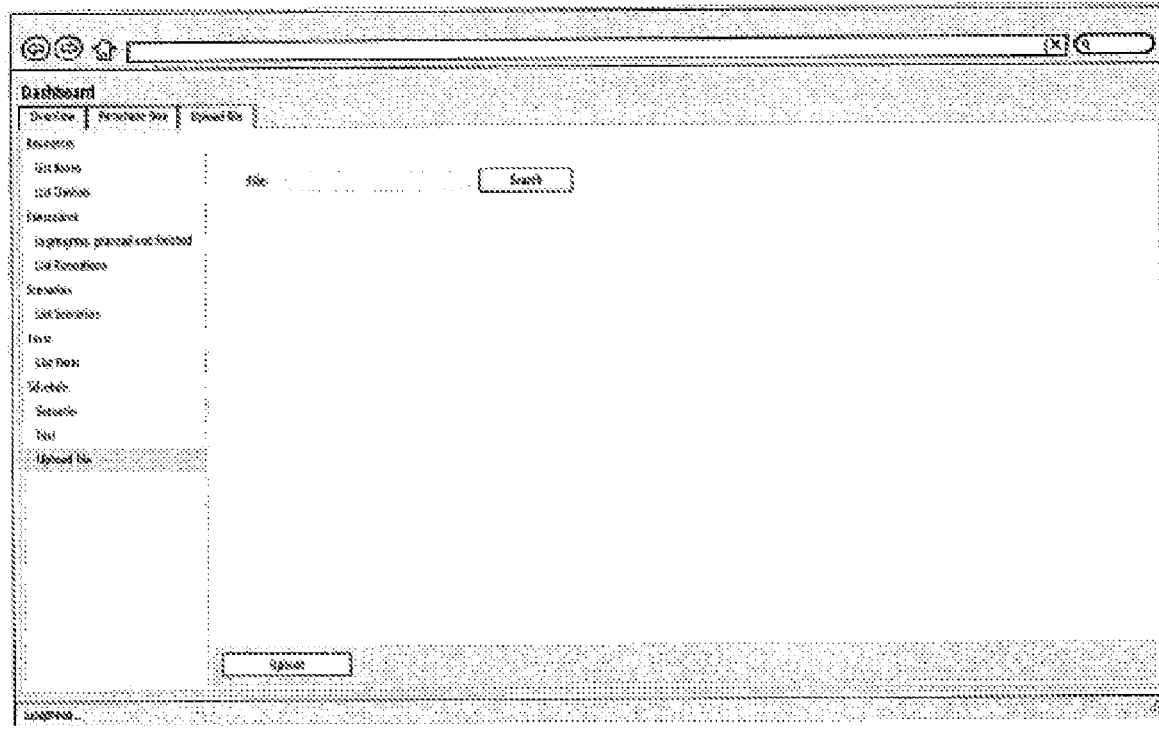
Fig. 30 - Upload file page
In this view, user must select an excel file with tests and scenario.
See "Scenarios/Tests" file for more information.

Triggers sub-area

The "Trigger" area will present the information of the trigger associated to a test or scenario.

The user can choose test/scenario to be executed now, create a new Trigger or use an existent one. By default this will be "Execute Now".

If user selects the type "Add a new timestamp trigger", the following view will be displayed:

If user selects the type "Add a new cron trigger", the following view will be displayed:

If user selects to "Find a Trigger", the following view will be displayed:

The following table presents a description of all the information that the previous screen area will manage the logged user is a "Full access" or "Read and schedule":

| "Triggers" area – in this area the user can define the trigger that will be associated to the test or scenario ||||||
|---|---|---|---|---|---|
| Field Name || Field Type | Field Status | Default Value | Visible |
| Type || Combo Box | Write mandatory | Execute Now | TRUE |
| Description || Text | Write only | – | TRUE |
| Timestamp || Text | Write mandatory | – | If Type is "Add new Timestamp Trigger" |
| Cron || Text | Write mandatory | – | If Type is "Add new Cron Trigger" |
| Triggers table | – | Check box | Write mandatory | – | TRUE |
| | Type | Text | Read only | – | If Type is "Find a Trigger" | TRUE |
| | Description | Text | Read only | – | | TRUE |
| | Cron or Timestamp | Text | Read only | – | | If is a "Date Trigger" |

The following table presents a description of all the information that the previous screen area will manage if the logged user is a "Read and execute" or "Read only":

| "Triggers" area – in this area define the trigger that will be associated to the test or scenario |||||
|---|---|---|---|---|
| Field Name | Field Type | Field Status | Default Value | Visible |
| Type | Combo Box | Read only | Execute Now | TRUE |
| Description | Text | Write only | – | TRUE |

Device selection

In this area, user can choose the device that will be used on the test. User can choose one specific device or select a device based on some characteristics.

If user selects "Specific device selection", the following view will be displayed:

TODO se preencher o nome tem obrigatoriamente que preencnher o ICCID ou Nome ou serial adicionar o IMEI

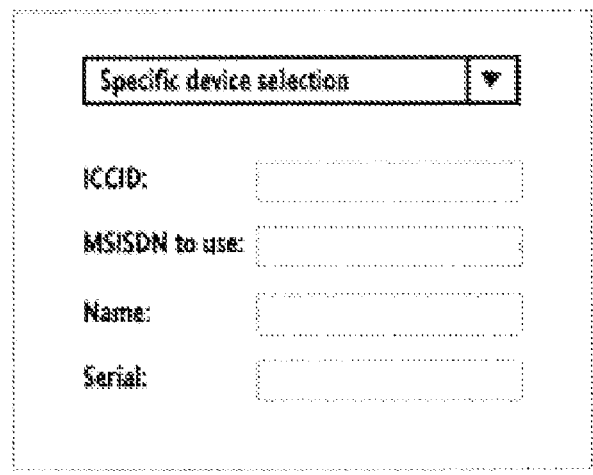

Fig. 31 - Specific device selection area

If user selects "Characteristics device selection", the following view will be displayed:

Fig. 32 - Characteristics device selection area

The following table presents a description of all the information that the previous screen area will manage:

| | Field Name | | Field Type | Field Status | Visible | Action |
|---|---|---|---|---|---|---|
| Specific device selection | ICCID | | Text | WO | If user selects "Specific device selection" | - |
| | IMEI | | Text | WO | | - |
| | MSISDN to use | | Text | WO | | - |
| | Name | | Text | WO | | - |
| | Serial | | Text | WO | | - |
| Characteristics device selection | Location | City | Combo box | WO | If user selects "Characteristics device selection" | - |
| | | Country | Combo box | WO | | - |
| | Radio provider | | Combo box | WO | | - |
| | SIM provider | | Combo box | WO | | - |
| | Product type | | Combo box | WO | | - |
| | Operation system | | Combo box | WO | | - |
| | MSISDN | Country code | Combo box | WO | | When user selects one Country code, a new row will be created in this table |
| | | Primary | Check box | WO | | |

Scenarios/Tests file

When user selects to export a list of tests or scenarios, one excel file will be generated with the following information:

| \"Overview\" sheet | |
|---|---|
| Field name | Description |
| Id | According to the type, this id will reference the execution on the corresponding type sheet |
| Name |  |
| Type | The type can be:<br>. Scenario<br>. Call test<br>. Outgoing call test<br>. Incoming call test<br>. SMS test<br>. Outgoing SMS test<br>. Incoming SMS test |

| Field name | Description |
|---|---|
| "Scenarios" sheet | |
| Id | - |
| Description | . |
| Tests | List of tests:<br>Each item will have the following structure: "test id" # "execution result"<br>The "test id" reference one of the tests on the "Tests" sheet, and if this test will be called depending on the result of previous test, the character "#" followed by condition.<br><br>The condition can be:<br>  UNEXISTING_RESOURCES<br>  UNAVAILABLE_RESOURCE<br>  DISCONNECTED_RESOURCE<br>  DISCARDED<br>  EXPIRED<br>  ABORTED<br>  UNEXPECTED_ERROR<br>  ERROR<br>  LATE<br>  SUCCESS<br>  REBOOTING_RESOURCE<br><br>Example:<br>22<br>20#SUCCESS#ERROR<br>21<br><br>The first test will be the test "22", when this test is finished and the result is "SUCCESS" or "ERROR" the test 20 will be executed, and when this is finished the test 21 will start. |
| Triggers | Empty or one of the Ids on the "Triggers" sheet<br>If this field will be left empty, the trigger will be "Execute now" |
| Result action | One of the Ids on the "Result actions" sheet |

| "Call tests" sheet ||
|---|---|
| Field name | Description |
| Id | According to the type, this id will reference the test on the corresponding type sheet |
| Description | - |
| Wait resources timeout | - |
| Duration | - |
| Max dialing delay | - |
| Ringing time | - |
| MO device selection id | The MO id will reference one device selection id present on "Device selection" sheet |
| MT device selection id | The MT id will reference one device selection id present on "Device selection" sheet |
| Triggers | Empty or one of the ids on the "Triggers" sheet<br>If this field will be left empty, the trigger will be "Execute now" |
| Result action | One of the ids on the "Result actions" sheet |

| "Outgoing call tests" ||
|---|---|
| Field name | Description |
| Id | According to the type, this id will reference the test on the corresponding type sheet |
| Description | - |
| Wait resources timeout | - |
| Destination MSISDN | - |
| Duration | - |
| MO device selection id | The MO id will reference one device selection id present on "Device selection" sheet |
| Triggers | Empty or one of the ids on the "Triggers" sheet<br>If this field will be left empty, the trigger will be "Execute now" |
| Result action | One of the ids on the "Result actions" sheet |

| "Incoming call tests" sheet ||
|---|---|
| Field name | Description |
| Id | According to the type, this id will reference the test on the corresponding type sheet |
| Description | - |
| Wait resources timeout | - |
| Duration | - |
| MO MSISDN | - |
| Expected MO MSISDN | - |
| Wait ringing time | - |
| Ringing time | - |
| MT device selection id | The MT id will reference one device selection id present on "Device selection" sheet |
| Triggers | Empty or one of the Ids on the "Triggers" sheet<br>If this field will be left empty, the trigger will be "Execute now" |
| Result action | One of the Ids on the "Result actions" sheet |

| "SMS tests" sheet ||
|---|---|
| Field name | Description |
| Id | According to the type, this id will reference the test on the corresponding type sheet |
| Description | - |
| Wait resources timeout | - |
| Maximum duration | - |
| Late time | - |
| Text | - |
| MO | The MO id will reference one device id present on "Device selection" sheet |
| MT | The MT id will reference one device id present on "Device selection" sheet |
| Triggers | Empty or one of the Ids on the "Triggers" sheet<br>If this field will be left empty, the trigger will be "Execute now" |
| Result action | One of the Ids on the "Result actions" sheet |

| "Outgoing SMS tests" sheet ||
|---|---|
| Field name | Description |
| Id | According to the type, this id will reference the test on the corresponding type sheet |
| Description | - |
| Wait resources timeout | - |
| Maximum duration | - |
| Destination MSISDN | - |
| Text | - |
| MO device selection id | The MO id will reference one device id present on "Device selection" sheet |
| Triggers | Empty or one of the ids on the "Triggers" sheet<br>If this field will be left empty, the trigger will be "Execute now" |
| Result action | One of the ids on the "Result actions" sheet |

| "Incoming SMS tests" sheet ||
|---|---|
| Field name | Description |
| Id | According to the type, this id will reference the test on the corresponding type sheet |
| Description | - |
| Wait resources timeout | - |
| Maximum duration | - |
| Late time | - |
| MO MSISDN | - |
| Text | - |
| MT device selection id | The MT id will reference one device id present on "Device selection" sheet |
| Triggers | Empty or one of the ids on the "Triggers" sheet<br>If this field will be left empty, the trigger will be "Execute now" |
| Result action | One of the ids on the "Result actions" sheet |

| "Device selection" sheet | | | |
|---|---|---|---|
| Field name | | | Description |
| Id | | | - |
| Specific device selection | ICCID | | - |
| | MSISDN to use | | - |
| | Name | | - |
| | Serial | | - |
| Characteristics device selection | City | | - |
| | Country | | - |
| | Radio provider | | - |
| | SIM provider | | - |
| | Product type | | - |
| | Operation system | | - |
| | MSISDN | Country code | - |
| | | Primary | - |

| "Triggers" sheet | |
|---|---|
| Field name | Description |
| Id | According to the type, this id will reference the test on the corresponding type sheet |
| Description | - |
| Timestamp or cron | - |

| "Result actions" sheet | |
|---|---|
| Field name | Description |
| Id | According to the type, this id will reference the test on the corresponding type sheet |
| Result | - |
| To | - |
| Subject | - |
| Detailed | - |
| Message | - |

Executions file

When user selects to export a list of executions, an excel file will be downloaded. This file will have the following information:

| "Executions" sheet ||
|---|---|
| Field name | Description |
| Execution id | According to the type, this id will reference the execution on the corresponding type sheet |
| Name |  |
| Type | The type can be:<br>. Scenario<br>. Call test<br>. Outgoing call test<br>. Incoming call test<br>. SMS test<br>. Outgoing SMS test<br>. Incoming SMS test |

| "Scenario executions" sheet ||
|---|---|
| Field name | Description |
| Execution id |  |
| Name |  |
| Priority |  |
| Start execution |  |
| Stop execution |  |
| Execution result |  |
| Tests | List of tests<br>Each item will have the following structure: "test id" # "execution result"<br>The "test id" reference one of the tests on the "Tests" sheet, and if this test will be called depending on the result of previous test, the character "#" followed by condition.<br><br>The condition can be:<br>UNEXISTING_RESOURCES<br>UNAVAILABLE_RESOURCE<br>DISCONNECTED_RESOURCE<br>DISCARDED<br>EXPIRED<br>ABORTED<br>UNEXPECTED_ERROR<br>ERROR<br>LATE<br>SUCCESS<br><br>Example:<br><br>22<br>20#SUCCESS#ERROR<br>21<br><br>The first test will be the test "22", when this test is finished and the result is "SUCCESS" or "ERROR" the test 20 will be executed, and when this is finished the test 21 will start. |

| "Call test executions" sheet ||
|---|---|
| Field name | Description |
| Execution id | . |
| Name | . |
| Execution result | . |
| Priority | . |
| Start Execution | . |
| Stop Execution | . |
| Destination MSISDN | . |
| Dialed MSISDN | . |
| Ringing MSISDN | . |
| Ringing timestamp | . |
| Dial timestamp | . |
| Answer timestamp | . |
| Ready answer timestamp | . |
| Disconnect timestamp MO | . |
| Disconnect timestamp MT | . |
| Call setup time | . |
| Radio provider MO | . |
| Radio provider MT | . |
| PLMN MO | . |
| PLMN MT | . |
| MO device id | This id will reference one device on "Devices" sheet |
| MT device id | This id will reference one device on "Devices" sheet |

| "Outgoing call test executions" sheet ||
|---|---|
| Field name | Description |
| Execution id | . |
| Test name | . |
| Priority | . |
| Start Execution | . |
| Stop Execution | . |
| Execution result | . |
| Destination MSISDN | . |
| Dialed MSISDN | . |
| Dial timestamp | . |
| Disconnect timestamp MO | . |
| Radio provider MO | . |
| PLMN MO | . |
| MO device id | This id will reference one device on "Devices" sheet |

| "Incoming call test executions" sheet ||
|---|---|
| Field name | Description |
| Execution id | |
| Test name | |
| Priority | |
| Start execution | |
| Stop execution | |
| Execution result | |
| Ringing MSISDN | |
| Expected MO MSISDN | |
| Ringing timestamp | |
| Answer timestamp | |
| Disconnect timestamp MT | |
| Ready answer timestamp | |
| PLMN MT | |
| Radio provider MT | |
| MT device id | This id will reference one device on "Devices" sheet |

| "SMS test executions" sheet ||
|---|---|
| Field name | Description |
| Execution id | |
| Test name | |
| Priority | |
| Start execution | |
| Stop execution | |
| Execution result | |
| Destination MSISDN | |
| Sent MSISDN | |
| Received MSISDN | |
| Received timestamp | |
| Sent timestamp | |
| Sent intent timestamp | |
| Parts | |
| Text | |
| Sent text | |
| Received text | |
| Radio provider MO | |
| Radio provider MT | |
| PLMN MO | |
| PLMN MT | |
| MO device id | This id will reference one device on "Devices" sheet |
| MT device id | This id will reference one device on "Devices" sheet |

| "Outgoing SMS test executions" sheet ||
|---|---|
| Field name | Description |
| Execution id | - |
| Test name | - |
| Priority | - |
| Start execution | - |
| Stop execution | - |
| Execution result | - |
| Destination MSISDN | - |
| Sent MSISDN | - |
| Sent timestamp | - |
| Sent intent timestamp | - |
| Parts | - |
| Text | - |
| Sent text | - |
| Radio provider MO | - |
| PLMN MO | - |
| MO device id | This Id will reference one device on "Devices" sheet |

| "Incoming SMS test executions" sheet ||
|---|---|
| Field name | Description |
| Execution id | - |
| Test name | - |
| Priority | - |
| Start execution | - |
| Stop execution | - |
| Execution result | - |
| Received MSISDN | - |
| Received timestamp | - |
| Wait to receive timestamp | - |
| Parts | - |
| Text | - |
| Received text | - |
| Radio provider MT | - |
| PLMN MT | - |
| MT device id | This Id will reference one device on "Devices" sheet |

| "Devices" sheet ||
|---|---|
| Field name | Description |
| Device id | - |
| Name | - |
| Radio provider | - |
| Roaming | - |
| Serial | - |
| IMEI | - |
| ADS | - |
| Operation system | - |
| Operation system version | - |
| ICCID | - |
| Product type | - |
| SIM provider | - |
| Country | - |
| City | - |
| IMSI list | - |
| IMSI in use | - |
| MSISDN list | - |
| Primary MSISDN | - |

Formato de datas = DD:MM:YYYY

Formato de horas = HH:MM:SS

The invention claimed is:

1. A remote unit comprising a processor and one or more terminal interfaces, the processor being connected to the one or more terminal interfaces, the terminal interfaces configured for coupling with a set of terminals, wherein the processor is configured to perform quality of service network testing over a first and a second communication network using a first and second terminal of the set of terminals, the first terminal associated with the first network and the second terminal associated with the second network; wherein the quality of service network testing is to verify if the traffic is being treated in a differentiated manner as between the first and second communication network; wherein the remote unit is located in a first geographic region; wherein the processor of the remote unit is further configured to conduct quality of service testing with a second remote unit, located in a second geographic region and comprising interfaces for connecting to a second set of terminals, using one or more of the set of terminals and one or more of the second set of terminals over the first and second communication networks; wherein the processor is further configured to perform end-to-end quality of service testing over one or more communication networks using the first terminal of the set of terminals in communication with a second terminal of the second set of terminals.

2. The remote unit as claimed in claim 1, wherein the processor is further configured to perform end-to-end quality of service testing over the first and second communication networks using at least two terminals of the set of terminals.

3. The remote unit as claimed in claim 1, wherein the processor is further configured to perform an outgoing or incoming call quality of service testing over the first and the second communication network using the first and second terminal of the set of terminals.

4. The remote unit as claimed in claim 1, wherein the processor is further configured to perform an outgoing or incoming text message and/or data message quality of service testing over the first and the second communication network using the first and the second terminal of the set of terminals.

5. The remote unit as claimed in claim 1, wherein the processor is further configured to perform two or more quality of service testing substantially concurrently over the first and the second communication network using a first and second terminal of the set of terminals.

6. The remote unit as claimed in claim 5, wherein the substantially concurrent testing includes testing an outgoing or incoming call and a data message or session substantially concurrently.

7. The remote unit as claimed in claim 6, wherein a data session includes uploading, downloading, messaging, browsing, accessing the internet streaming.

8. The remote unit as claimed in claim 1, wherein the second remote unit is a virtual remote unit, wherein the processor of the remote unit is further configured to conduct quality of service testing with the virtual remote unit using one or more of the set of terminals over the first and second communication networks.

9. The remote unit as claimed in claim 1, wherein the set of terminals include at least one terminal from the group of:
a handset;
a mobile device;
a mobile phone;
a mobile station;
a smartphone;
a user equipment;
original equipment manufacturer terminal;
machine to machine embedded terminal;
a tablet configured to communicate over the first and second communication networks; and a laptop configured to communicate over the first and second communication networks.

10. The remote unit as claimed in claim 1, wherein the set of terminals are off-the-shelf or non-custom made, standardized terminals provided by one or more network operators for use by consumers or subscribers of the first and second communication networks.

11. The remote unit as claimed in claim 1, wherein the remote unit is configured to receive one or more network tests associated with quality of service testing of the first and second communication networks.

12. The remote unit as claimed in claim 1, wherein the quality of service testing includes any one or more of call set up delay, connect/disconnect delay, transmission delay, total failures, call drops, failure to progress, voice quality, video quality, conversation latency, echo, bit rate, error rate, bandwidth, jitter, delay, latency, packet loss, signal strength.

13. The remote unit as claimed in claim 1, wherein the remote unit is configured to send test results from the one or more terminals associated with the quality of service testing to one or more control units for comparing the quality of service performance of the first and second communication networks or one or more terminals associated with said quality of service testing.

14. A computer-implemented method for controlling a network testing system that verifies if the traffic is being treated in a differentiated manner, the network testing system comprising one or more control units and a plurality of remote units, each remote unit comprising one or more terminals, wherein the one or more terminals are configured to communicate over one or more communication networks, wherein a first remote unit located in a first geographic region is configured to conduct quality of service testing with a second remote unit located in a second geographic region, the method, performed by the control unit, comprising:
receiving an input to perform one or more network tests associated with one or more of the communication networks;
generating a list of tests based on the input network tests;
sending the list of tests to one or more of the remote units for use in configuring a first and a second terminal to perform the corresponding network tests and generate test results associated with the corresponding network tests; wherein the corresponding network tests perform end-to-end quality of service testing over the one or more communication networks using a first terminal associated with the first remote unit in communication with a second terminal associated with the second remote unit receiving test results associated with the one or more network tests from one or more of the remote units; and
analysing the test results associated with the one or more network tests for determining the quality of service performance to verify if the traffic is being treated in a differentiated manner as between one or more of the communication networks or one or more terminals associated with said network tests.

15. A computer implemented method for performing network testing in a network testing system that verifies if the traffic is being treated in a differentiated manner, the network testing system comprising a control unit and a plurality of remote units, each remote unit comprising one or more terminals, wherein the one or more terminals are configured to communicate over one or more communication networks, wherein a first remote unit located in a first geographic region is configured to conduct quality of service testing with a second remote unit located in a second geographic region, the method, performed by a remote unit, comprising:

- receiving a list of tests based on one or more network tests associated with one or more of the communication networks;
- configuring a first and second terminal of the terminals of the remote unit to operate in the one or more communication networks in accordance with the list or tests, wherein the first and second terminals are further configured to generate test results associated with the list of tests; wherein the corresponding network tests perform end-to-end quality of service testing over the one or more communication networks using a first terminal associated with the first remote unit in communication with a second terminal associated with the second remote unit;
- receiving test results from the first and second terminals of the remote unit;
- sending test results associated with the one or more network tests towards the control unit for determining the quality of service performance to verify if the traffic is being treated in a differentiated manner as between the communication networks associated with said network tests.

16. A computer implemented method for performing network testing in a network testing system that verifies if the traffic is being treated in a differentiated manner, the network testing system comprising a control unit and a plurality of remote units, each remote unit comprising a first and second terminal, wherein the first and second terminals are configured to communicate over one or more communication networks wherein a first remote unit located in a first geographic region is configured to conduct quality of service testing with a second remote unit located in a second geographic region, the method, performed by the first and second terminal, comprising:

- receiving configuration data representative of a list of tests based on one or more network tests associated with one or more of the communication networks; wherein the network tests perform end-to-end quality of service testing over the one or more communication networks using a first terminal associated with the first remote unit in communication with a second terminal associated with the second remote unit configuring the terminal to operate in the one or more communication networks in accordance with the configuration data;
- generating test results associated with the list of tests based on operating the first and second terminal in the one or more communication networks in accordance with the configuration data; and sending the test results towards the control unit for determining the quality of service performance to verify if the traffic is being treated in a differentiated manner as between the communication networks or the first and second terminals associated with said network tests.

* * * * *

UNITED STATES PATENT AND TRADEMARK OFFICE
CERTIFICATE OF CORRECTION

| | | |
|---|---|---|
| PATENT NO. | : 10,771,990 B2 | Page 1 of 1 |
| APPLICATION NO. | : 15/518101 | |
| DATED | : September 8, 2020 | |
| INVENTOR(S) | : James Peter Tagg et al. | |

It is certified that error appears in the above-identified patent and that said Letters Patent is hereby corrected as shown below:

On the Title Page

Item (73) incorrectly lists "Kyocera Document Solutions, Inc." as the assignee and the residence as Japan. The correct assignee should be "TRUPHONE LIMITED" and the residence as United Kingdom (UK).

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*